United States Patent
Ray et al.

(10) Patent No.: US 9,203,548 B2
(45) Date of Patent: Dec. 1, 2015

(54) AUTOMATED BANKING MACHINE THAT OUTPUTS INTERFERENCE SIGNALS TO JAM READING ABILITY OF UNAUTHORIZED CARD READER DEVICES

(71) Applicant: Diebold Self-Service Systems, division of Diebold, Incorporated, North Canton, OH (US)

(72) Inventors: Gregory S. Ray, North Canton, OH (US); David N. Lewis, Canal Fulton, OH (US); Randall Jenkins, Orrville, OH (US); James Block, North Lawrence, OH (US); Songtao Ma, Wadsworth, OH (US); Natarajan Ramachandran, Uniontown, OH (US); Jeffery Enright, Akron, OH (US); James E. Pettitt, Canton, OH (US)

(73) Assignee: Diebold Self-Service Systems Division of Diebold, Incorporated, North Canton, OH (US)

( * ) Notice: Subject to any disclaimer, the term of this patent is extended or adjusted under 35 U.S.C. 154(b) by 0 days.

(21) Appl. No.: 14/092,676

(22) Filed: Nov. 27, 2013

(65) Prior Publication Data
US 2014/0158768 A1    Jun. 12, 2014

Related U.S. Application Data

(60) Provisional application No. 61/730,319, filed on Nov. 27, 2012.

(51) Int. Cl.
| | | |
|---|---|---|
| G06K 7/08 | (2006.01) | |
| G06Q 40/00 | (2012.01) | |
| G07F 19/00 | (2006.01) | |
| H04K 3/00 | (2006.01) | |

(52) U.S. Cl.
CPC ............. *H04K 3/825* (2013.01); *G06K 7/087* (2013.01); *H04K 3/45* (2013.01); *H04K 3/86* (2013.01); *H04K 3/42* (2013.01); *H04K 3/65* (2013.01); *H04K 2203/20* (2013.01)

(58) Field of Classification Search
CPC .. G06Q 20/18; G06Q 20/341; G07F 19/2055; G07F 19/211; G07F 19/207; G07F 19/20; G07F 19/201; G07F 7/1008; G07F 7/0873; G07F 7/082; G06K 7/082; G06K 19/06206
See application file for complete search history.

(56) References Cited

U.S. PATENT DOCUMENTS

| | | | |
|---|---|---|---|
| 3,947,847 A | * | 3/1976 | Felsenthal, Jr. ................. 342/16 |
| 7,118,031 B2 | | 10/2006 | Ramachandran |
| 7,240,827 B2 | | 7/2007 | Ramachandran |
| 7,316,348 B2 | | 1/2008 | Ramachandran |
| 7,971,780 B2 | | 7/2011 | Jenkins |

(Continued)

*Primary Examiner* — Thien T Mai
(74) *Attorney, Agent, or Firm* — Black McCuskey Souers & Arbaugh, LPA

(57) ABSTRACT

A banking system is controlled responsive to data read from data bearing records. The system comprises an automated banking machine. The machine includes at least one type of data reader, which includes a card reader. The machine also includes an anti-fraud arrangement that can deter effective operation of unauthorized devices attached to the machine. Such unauthorized devices may include a fraudulent card reader placed adjacent to a card entry slot that leads to the card reader. The arrangement can sense a fraudulent card reader installed on the machine. The arrangement can additionally emit jamming signals that interfere with an ability of a sensed fraudulent card reader to accurately read card data.

34 Claims, 56 Drawing Sheets

(56) References Cited

U.S. PATENT DOCUMENTS

| | | |
|---|---|---|
| 8,002,176 B2 | 8/2011 | Jenkins |
| 8,028,899 B2 | 10/2011 | Ramachandran |
| 8,186,579 B2 | 5/2012 | Ramachandran |
| 8,225,993 B2 | 7/2012 | Jenkins |
| 8,397,991 B2 * | 3/2013 | Mueller ........................ 235/450 |
| 8,556,168 B1 | 10/2013 | Lewis |
| 8,760,007 B2 * | 6/2014 | Joannopoulos et al. ....... 307/104 |
| 2006/0237527 A1 * | 10/2006 | Ramachandran et al. .... 235/379 |
| 2008/0020867 A1 * | 1/2008 | Manwaring ................... 473/407 |
| 2010/0311490 A1 * | 12/2010 | Miller et al. .................... 463/16 |
| 2013/0062410 A1 * | 3/2013 | Mitchell ........................ 235/449 |

\* cited by examiner

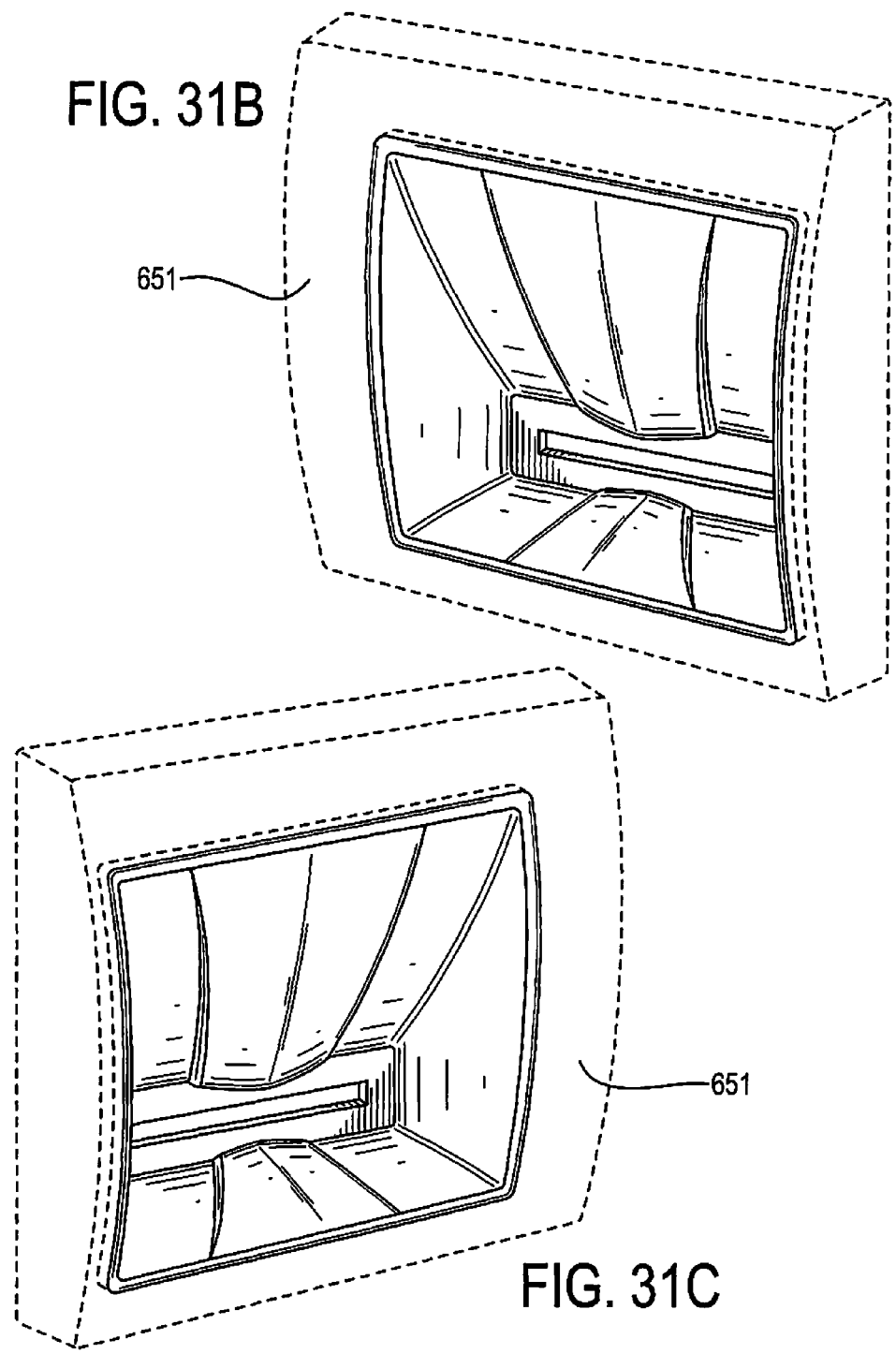

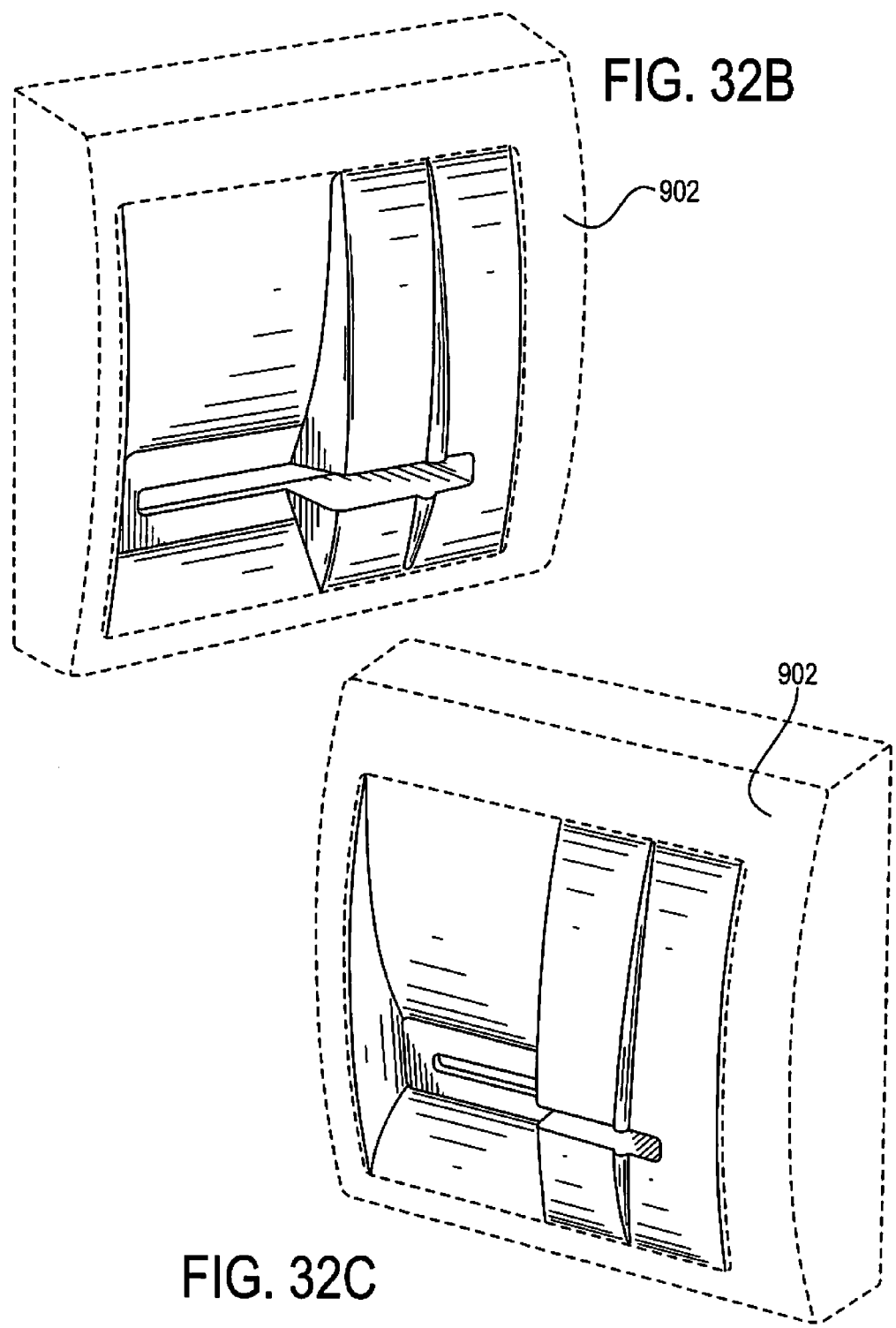

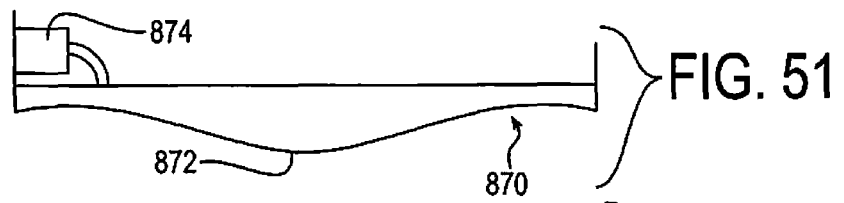
FIG. 51
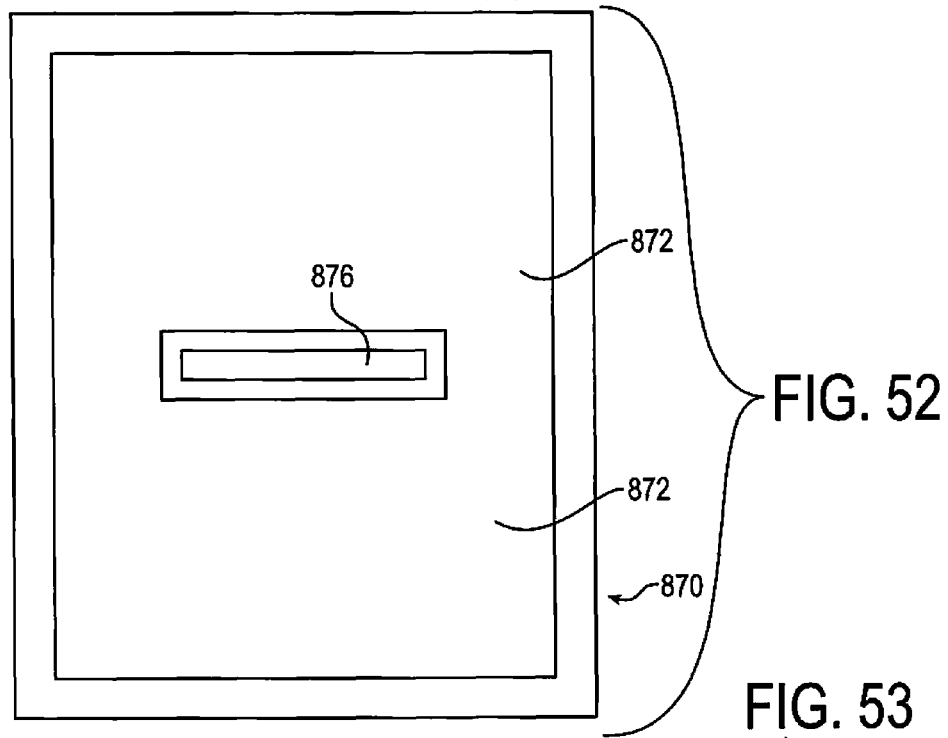
FIG. 52
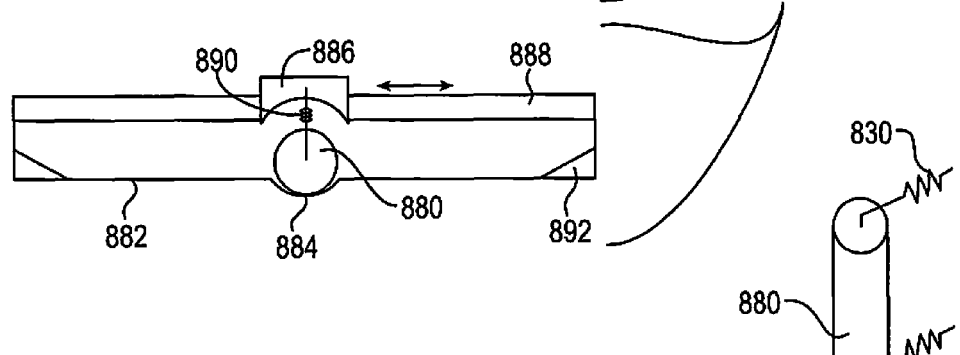
FIG. 53
FIG. 54

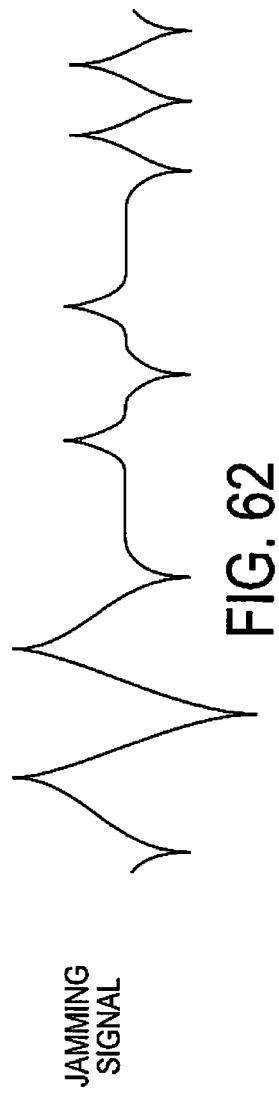
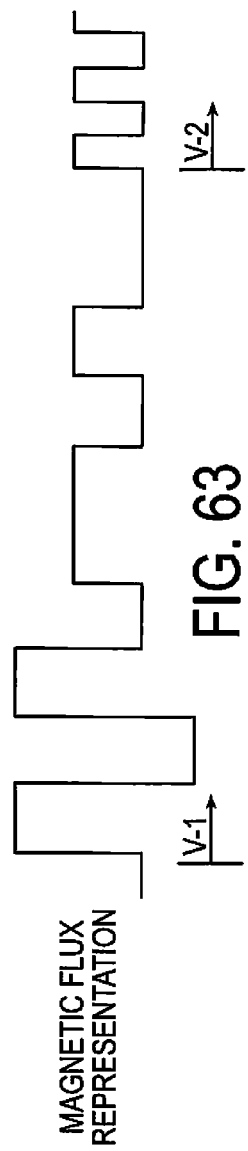
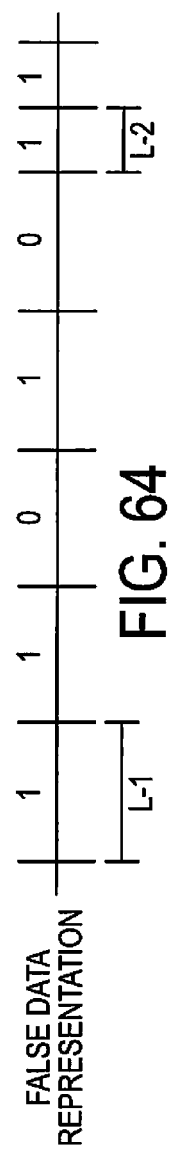
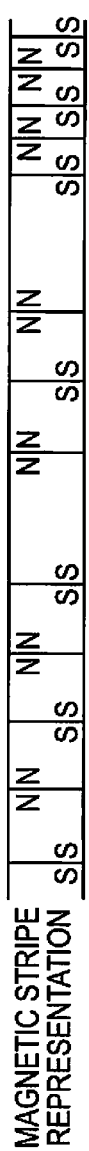

AUTOMATED BANKING MACHINE THAT OUTPUTS INTERFERENCE SIGNALS TO JAM READING ABILITY OF UNAUTHORIZED CARD READER DEVICES

CROSS-REFERENCE TO RELATED APPLICATIONS

This application claims benefit pursuant to 35 U.S.C. §119 (e) of U.S. Provisional Application 61/730,319 filed Nov. 27, 2012.

TECHNICAL FIELD

This disclosure generally relates to a banking system machine with a card reader.

BACKGROUND OF INVENTION

Automated banking machines may include a card reader that operates to read data from a bearer record such as a user card. The automated banking machine may operate to cause the data read from the card to be compared with other computer stored data related to the bearer. The machine operates in response to the comparison determining that the bearer is an authorized system user to carry out at least one transaction which is operative to transfer value to or from at least one account. A record of the transaction is also commonly printed through operation of the automated banking machine and provided to the user. A common type of automated banking machine used by consumers is an automated teller machine. An automated teller machine reads customer cards and enables customers to carry out banking transactions. Banking transactions carried out using automated teller machines may include the dispensing of cash, the making of deposits, the transfer of funds between accounts and account balance inquiries. The types of banking transactions a customer can carry out are determined by the capabilities of the particular banking machine and the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of service provider transactions. For purposes of this disclosure an automated banking machine, automated transaction machine, or an automated teller machine (ATM) shall be deemed to include any machine that may be used to automatically carry out transactions involving transfers of value.

OVERVIEW OF EXAMPLE EMBODIMENTS

In an example embodiment, there is described herein an automated banking machine which comprises an automated teller machine (ATM). The machine includes a plurality of transaction function devices. The plurality of transaction function devices include a card reader that is operative to read data included on cards of machine users. In an example embodiment the transaction function devices include input and output devices which are part of a user interface. In an example embodiment, the transaction function devices also include devices for carrying out types of banking transactions such as a currency dispenser device and a deposit accepting device. The example machine described herein may also include a computer which may referred to herein as a processor or controller, that is operative to cause the operation of the transaction function devices in the machine. In an example embodiment, the ATM is capable of detecting devices such as unauthorized card reader that may be coupled with the ATM's card reader. The ATM is further capable of implementing defensive measures to impair the functionality of the unauthorized card reader that are described in examples embodiments herein.

BRIEF DESCRIPTION OF DRAWINGS

FIGS. 31 A, 31 B, and 31 C show different views of a bezel that is similar to the bezel shown in FIG. 31.

FIGS. 32A, 32B, and 32C show different views of a bezel that is similar to the bezel shown in FIG. 32.

FIGS. 37 A, 37B, and 37C show different views of a bezel that is similar to the bezel shown in FIG. 37.

FIG. 51 shows a top view of a bezel's flexible outer surface in an expanded condition.

FIG. 52 shows a front view of the bezel shown in FIG. 51.

FIG. 53 shows a top view of an example arrangement that uses physical contact to outwardly stretch a portion of a bezel's flexible outer surface to create a moving dislodging wave across the surface.

FIG. 54 shows an angled view of a wave creating component used in FIG. 53.

FIG. 62 shows an example of a waveform representation caused by generation by an example jamming signal.

FIG. 63 shows magnetic flux reversals caused by the example jamming signal.

FIG. 64 shows false card data generated by the example jamming signal.

FIG. 65 shows the false magnetic stripe segment which is imitated in the example jamming signal.

DESCRIPTION OF EXAMPLE EMBODIMENTS

The following applications are incorporated herein by reference in their entirety: U.S. application Ser. No. 12/288,333 filed Oct. 17, 2008; Ser. No. 13/134,654 filed Jun. 13, 2011; Ser. No. 13/199,106 filed Aug. 19, 2011; Ser. No. 11/975,375 filed Oct. 19, 2007; Ser. No. 11/454,257 filed Jun. 16, 2006; Ser. No. 10/832,960 filed Apr. 27, 2004; and Ser. No. 10/601,813 filed Jun. 3, 2003; and U.S. Provisional Applications 61/000,215 filed Oct. 24, 2007; 61/000,335 filed Oct. 25, 2007; 60/429,478 filed Nov. 26, 2002; 60/560,674 filed Apr. 7, 2004; 60/853,098 filed Oct. 20, 2006; 61/628,513 filed Nov. 1, 2011; and 61/629,900 filed Nov. 30, 2011.

Figure 1:
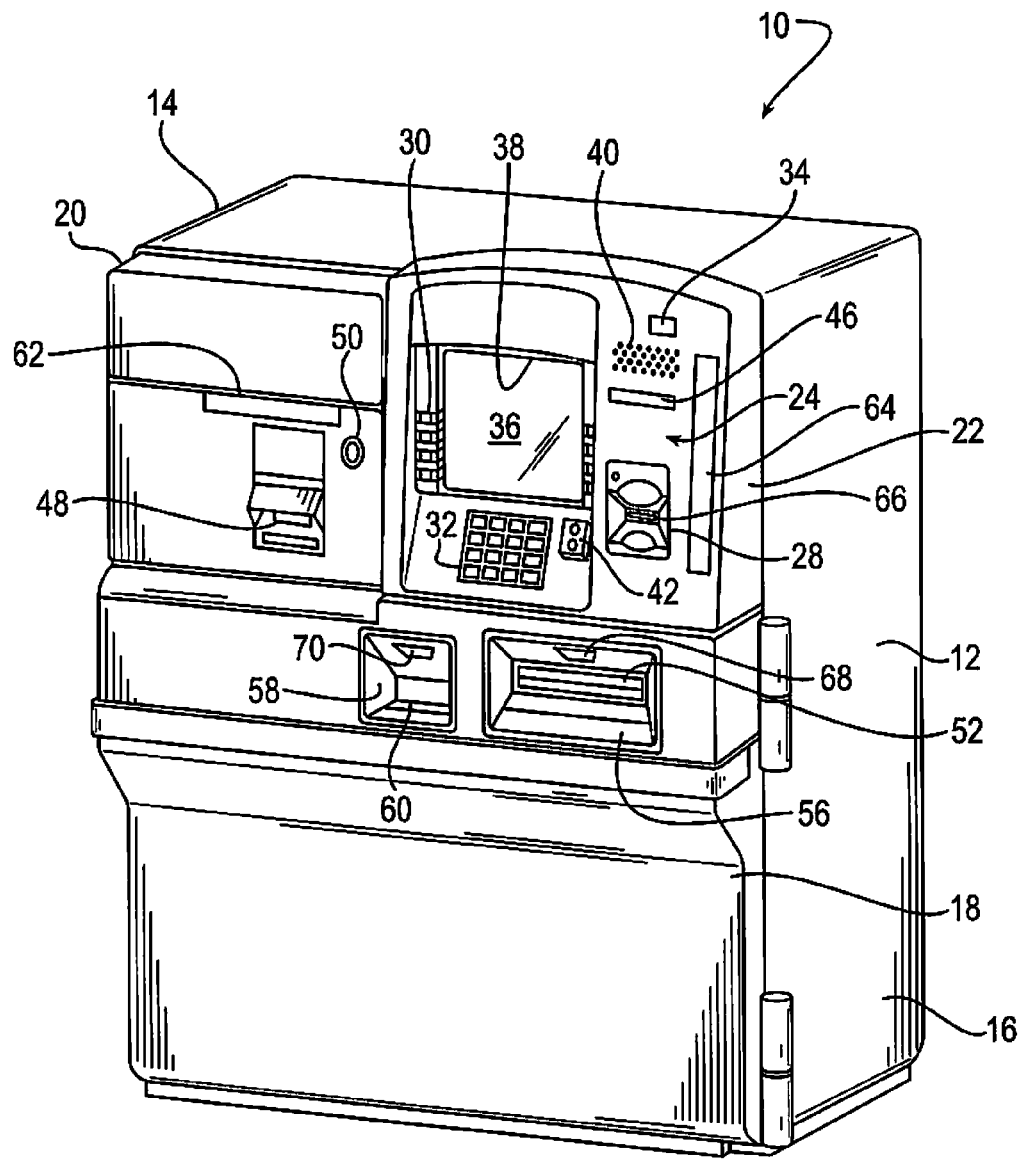
FIG. 1 is an isometric external view of an example automated banking machine which incorporates some aspects and features of embodiments described in the present application.

Referring now to the drawings and particularly to FIG. 1, there is shown therein an example embodiment of an automated banking machine generally indicated 10. In an example embodiment automated banking machine 10 is a drive up ATM, however the features described and claimed herein are not necessarily limited to machines of this type. The example machine includes a housing 12. Housing 12 includes an upper housing area 14 and a secure chest area 16 in a lower portion of the housing. Access to the chest area 16 is controlled by a chest door 18 which when unlocked by authorized persons in the manner later explained, enables gaining access to the interior of the chest area.

The example machine 10 further includes a first fascia portion 20 and a second fascia portion 22. Each of the fascia portions is movably mounted relative to the housing as later explained, which in an example embodiment facilitates servicing.

The machine includes a user interface generally indicated 24. The example user interface includes input devices such as a card reader 26 (shown in FIG. 3) which is in operative connection with a card reader slot 28 (FIG. 1) which extends in the second fascia portion. The card reader slot 28 can lead to a card accepting area (e.g., a card entrance or opening) of the card reader 26. The card reader 26 is operative to read data bearing records presented by machine users. Such records can include data corresponding to at least one of the associated user, one or more user financial accounts, and/or other data. In some example embodiments the card reader may read the data from magnetic stripe cards. In other example embodiments the card reader may be operative to read data from other card or record types such as contactless cards. Of course these approaches are example.

The user interface 24 can also include other reader devices, such as a biometric reader. A biometric reader can read user biometric data. For example, user biometric information may involve one or more of a fingerprint, thumbprint, hand scan (e.g., palm print or back of hand), iris scan, retina scan, fingernail print, spoken password, voice print, voice (speech) recognition, image data, face topography data, facial recognition, DNA scan, etc., or combinations thereof. Read biometric data (or indicia) can be used for purposes of identifying a particular user and/or their account. For example, biometric data can be used to verify that a person is authorized to use a cash dispensing automated banking machine. Read biometric data can also be compared to read card data. Correlation of biometric data and card data can result in customer authorization.

Other input devices of the example user interface 24 include function keys 30 and a keypad 32. The example machine 10 also includes a camera 34 which also may serve as an input device for biometric features and the like. The example user interface 24 also includes output devices such as a display 36. Display 36 is viewable by an operator of the machine when the machine is in the operative condition through an opening 38 in the second fascia portion 22. Further output devices in the example user interface include a speaker 40. A headphone jack 42 also serves as an output device. The headphone jack may be connected to a headphone provided by a user who is visually impaired to provide the user with voice guidance in the operation of the machine. The example machine further includes a receipt printer 44 (see FIG. 3) which is operative to provide users of the machine with receipts for transactions conducted. Transaction receipts are provided to users through a receipt delivery slot 46 which extends through the second fascia portion. Example receipt printers that may be used in some embodiments are shown in U.S. Pat. No. 5,729,379 and U.S. Pat. No. 5,850,075, the disclosures of which are incorporated by reference herein in their entirety. It should be understood that these input and output devices of the user interface 24 are example and in other embodiments, other or different input and output devices may be used.

In an example embodiment the second fascia portion has included thereon a deposit envelope providing opening 48. Deposit envelopes may be provided from the deposit envelope providing opening to users who may place deposits in the machine. The second fascia portion 20 also includes a fascia lock 50. Fascia lock 50 is in operative connection with the second fascia portion and limits access to the portion of the interior of the upper housing behind the fascia to authorized persons. In an example embodiment fascia lock 50 comprises a key type lock. However, in other embodiments other types of locking mechanisms may be used. Such other types of locking mechanisms may include for example, other types of mechanical and electronic locks that are opened in response to items, inputs, signals, conditions, actions or combinations or multiples thereof.

The example machine 10 further includes a delivery area 52. Delivery area 52 is in connection with a currency dispenser device 54 which is alternatively referred to herein as a cash dispenser, which is positioned in the chest portion and is shown schematically in FIG. 3. The delivery area 52 is a transaction area on the machine in which currency sheets are delivered to a user. In an example embodiment the delivery area 52 is positioned and extends within a recessed pocket 56 in the housing of the machine.

Machine 10 further includes a deposit acceptance area 58. The deposit acceptance area is an area through which deposits such as deposit envelopes to be deposited by users are placed in the machine. The deposit acceptance area 58 is in operative connection with a deposit accepting device positioned in the chest area 16 of the machine. Example types of deposit accepting devices are shown in U.S. Pat. No. 4,884,769 and U.S. Pat. No. 4,597,330, the disclosures of which are incorporated herein by reference in their entirety.

In an example embodiment the deposit acceptance area serves as a transaction area of the machine and is positioned and extends within a recessed pocket 60. It should be understood that while an example embodiment of machine 10 includes an envelope deposit accepting device and a currency sheet dispenser device, other or different types of transaction function devices may be included in automated banking machines. These may include for example, check and/or money order accepting devices, ticket accepting devices, stamp accepting devices, card dispensing devices, money order dispensing devices and other types of devices which are operative to carry out transaction functions.

In this example embodiment the machine 10 includes certain illuminating devices which are used to illuminate transaction areas, some of which are later discussed in detail. First fascia portion 20 includes an illumination panel 62 for illuminating the deposit envelope providing opening. Second fascia portion 22 includes an illumination panel 64 for illuminating the area of the receipt delivery slot 46 and the card reader slot 28. Further, an illuminated housing 66 later discussed in detail, bounds the card reader slot 28. Also, in an example embodiment an illuminating window 68 is positioned in the recessed pocket 56 of the delivery area 52. An illuminating window 70 is positioned in the recessed pocket 60 of the deposit acceptance area 58. It should be understood that these structures and features are example and in other embodiments other structures and features may be used.

Figure 3:
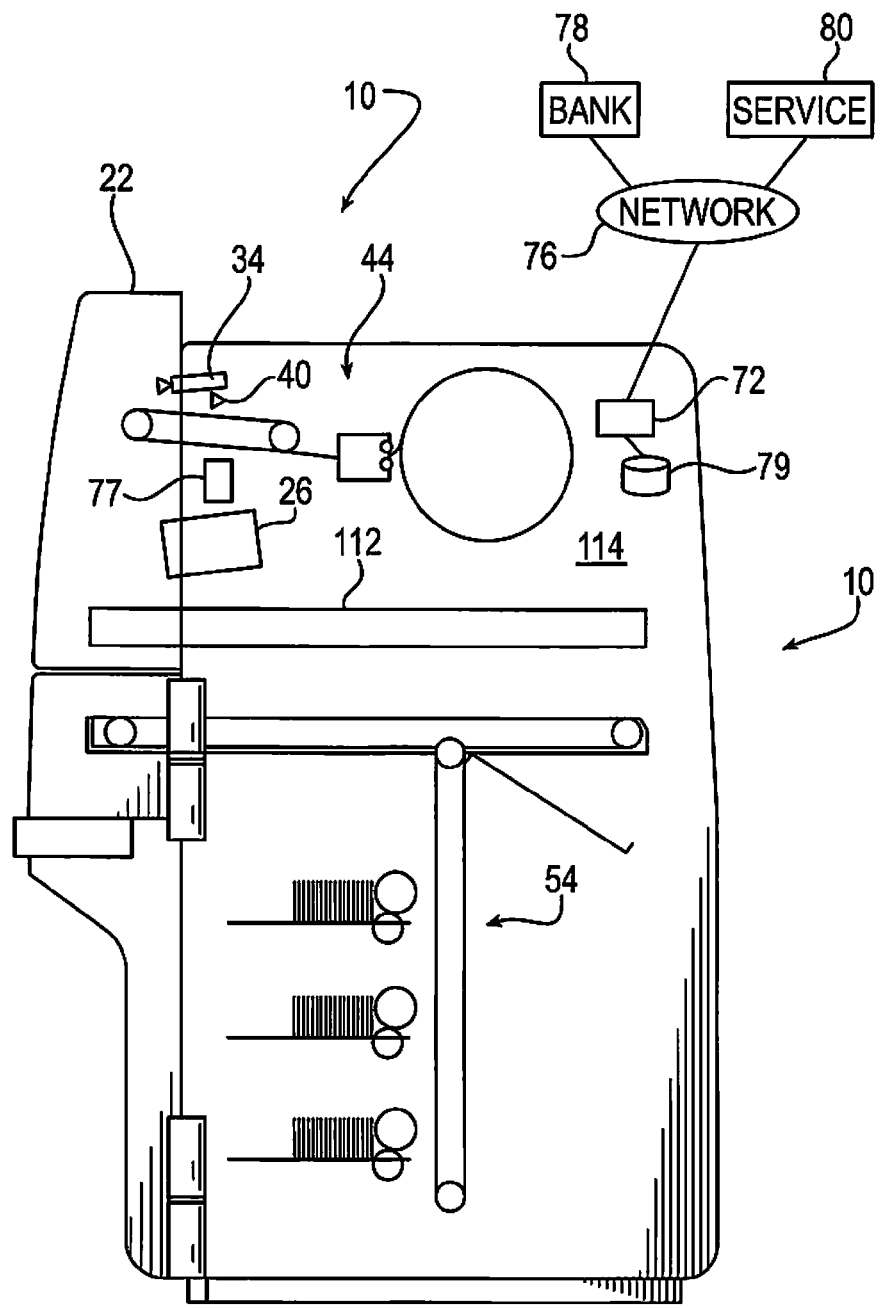
FIG. 3 is a transparent side view showing schematically some internal features of the machine.

As schematically represented in FIG. 3, the machine 10 includes one or more internal computers which are alternatively referred to herein as controllers. Such internal computers include one or more processors. Such processors may be alternatively referred to herein as computers. Such processors may be in operative connection with one or more data stores. In some embodiments processors may be located on certain devices within the machine so as to individually control the operation thereof. Examples such as multi-tiered processor systems are shown in U.S. Pat. No. 6,264,101 and U.S. Pat. No. 6,131,809, the disclosures of which are incorporated herein by reference in their entirety. Alternatively in other embodiments, the at least one processor associated with the machine may operate in a remote server which is remotely located from the machine. Such a remote server may operate a virtual machine and control the devices thereof in the manner described in U.S. patent application Ser. No. 13/066,272 filed Apr. 11, 2011, the disclosure of which is incorporated herein by reference in its entirety.

For purposes of simplicity, an example embodiment will be described as having a single controller which controls the operation of devices within the machine. However it should be understood that such reference shall be construed to encompass multicontroller and multiprocessor systems as well as remote systems as may be appropriate in controlling the operation of a particular machine. As a result, the example machine is associated with at least one computer, which can include an internal and/or an external (e.g., remote) computer(s).

In FIG. 3 a machine controller is schematically represented 72. As schematically represented, the controller is in operative connection with one or more data stores 79. Such data stores in an example embodiment are operative to store program instructions, values, and other information used in the operation of the machine. Although a controller 72 is schematically shown in the upper housing portion of the machine 10, it should be understood that in alternative embodiments controllers may be located within various portions of the machine.

In order to conduct transactions the example machine 10 communicates with remote computers. The remote computers are operative to exchange messages with the machine and authorize and record the occurrence of various transactions. This is represented in FIG. 3 by the communication of the machine through a network with a bank 78, which has at least one computer which is operative to exchange messages with the machine through a network. For example, the bank 78 may receive one or more messages from the machine requesting authorization to allow a customer to withdraw $200 from the customer's account. The remote computer at the bank 78 will operate to determine that such a withdrawal is authorized and will return one or more messages to the machine through the network authorizing the transaction. In example embodiments at least one processor in the machine is operative to cause the communication of data corresponding to data read from a user's card from the machine to the remote computer as part of one or more messages. The machine may also communicate other data corresponding to user inputs such as a personal identification number (PIN) and requested transaction data to the remote computer. The remote computer operates to compare the data corresponding to card data and/or PIN data to data corresponding to authorized users and/or financial accounts stored in at least one data store associated with the remote computer. Responsive to the data corresponding to an authorized user or financial account and a permissible transaction request, the remote computer communicates at least one message to the machine which corresponds to authorization to carry out the requested transaction. After the machine conducts the functions to accomplish a transaction such as dispensing cash, the machine will generally send one or more messages back through the network to the bank indicating that the transaction was successfully carried out. Of course these messages are merely example.

It should be understood that in some embodiments the machine may communicate with other entities and through various networks. For example as schematically represented in FIG. 3, the machine will communicate with computers operated by service providers 80. Such service providers may be entities to be notified of status conditions or malfunctions of the machine as well as entities who are to be notified of corrective actions. An example of such a system for accomplishing this is shown in U.S. Pat. No. 5,984,178, the disclosure of which is incorporated herein by reference in its entirety. Other third parties who may receive notifications from example machines include entities responsible for delivering currency to the machine to assure that the currency supplies are not depleted. Other entities may be responsible for removing deposit items from the machine. Alternative entities that may be notified of actions at the machine may include entities which hold marketing data concerning consumers and who provide messages which correspond to marketing messages to be presented to consumers. Various types of messages may be provided to remote systems and entities by the machine depending on the capabilities of the machines in various embodiments and the types of transactions being conducted.

Figure 4:
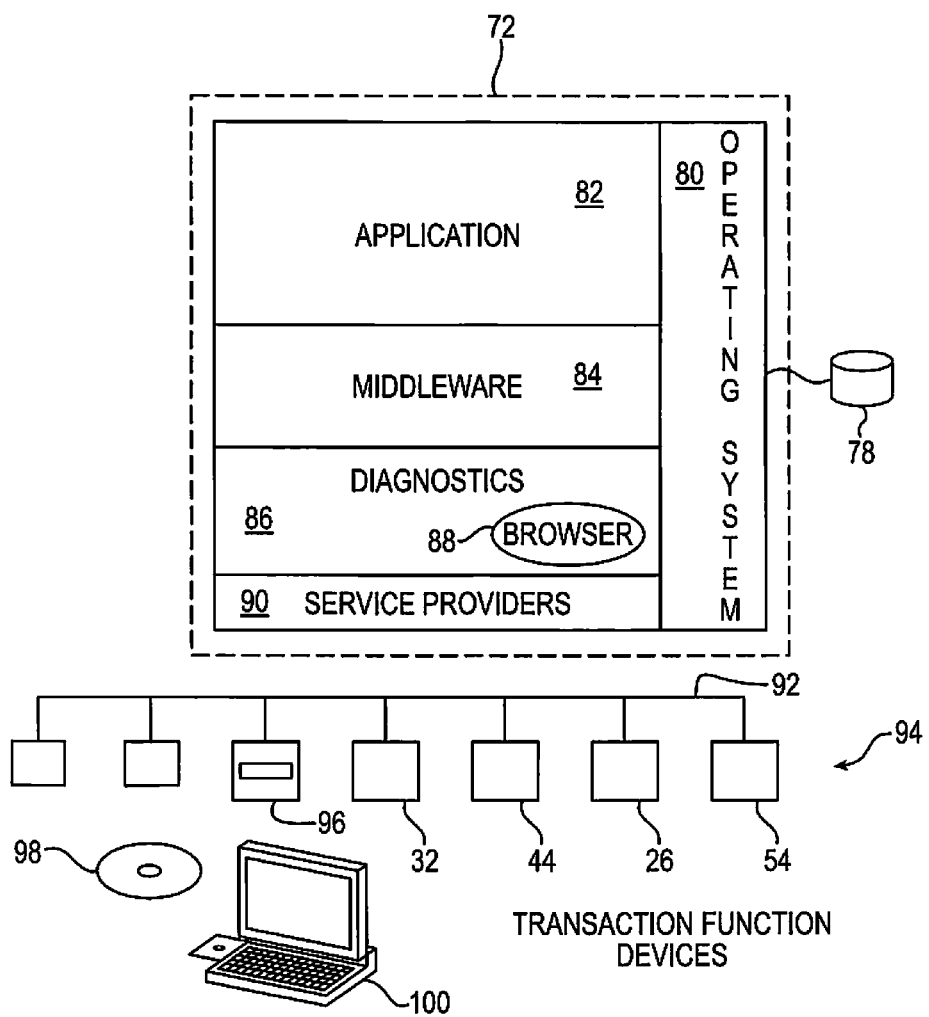
FIG. 4 is a schematic view representative of the software architecture of an example embodiment.

FIG. 4 shows schematically an example software architecture which may be operative in the controller 72 of machine 10. The example software architecture includes an operating system such as for example Microsoft® Windows, IBM OS/2® or Linux. The example software architecture also includes an ATM application 82. The example application includes the instructions for the operation of the automated banking machine and may include, for example, an Agilis® 91× application that is commercially available from Diebold, Incorporated which is a cross vendor software application for operating ATMs. Further examples of software applications which may be used in some embodiments are shown in U.S. Pat. Nos. 6,289,320 and 6,505,177, the disclosures of which are incorporated herein by reference in their entirety.

In an example embodiment middleware software schematically indicated 84 is operative in the controller. In an example embodiment the middleware software operates to compensate for differences between various types of automated banking machines and transaction function devices used therein. The use of a middleware layer enables the more ready use of an identical software application on various types of machine hardware. In an example embodiment the middleware layer may be Involve® software produced by Nexus Software, or middleware software produced by Korala Associates Limited of Scotland.

The example software architecture further includes a diagnostics layer 86. The diagnostics layer 86 is operative as later explained to enable accessing and performing various diagnostic functions of the devices within the machine. In an example embodiment the diagnostics operate in conjunction with a browser schematically indicated 88.

The example software architecture further includes a service provider layer schematically indicated 90. The service provider layer may include software such as WOSA XFS service providers or J/XFS service providers which present a standardized interface to the software layers above and which facilitate the development of software which can be used in conjunction with different types of machine hardware. Of course this software architecture is example and in other embodiments other architectures may be used.

As schematically represented in FIG. 4, a controller 72 is in operative connection with at least one communications bus 92. The communications bus may in some example embodiments be a universal serial bus (USB) or other standard or nonstandard type of bus architecture. The communications bus 92 is schematically shown in operative connection with transaction function devices 94. The transaction function devices include devices in the machine which are used to carry out transactions. These may include for example the currency dispenser 54, card reader 26, receipt printer 44, keypad 32, as well as numerous other devices which are operative in the machine and controlled by the controller to carry out transactions.

Furthermore, communication between the controller and the transaction function devices can be encrypted. For example, encryption codes (or keys) can be stored in a data store associated with the transaction function device (e.g., a card reader). The transaction function device (e.g., a card reader) can authenticate itself to the controller, and vice versa. Thus, the use of encryption allows data read from a card to be protected during a transaction with the machine. An encrypted read head can be used in the card reader. Examples of encryption applications which may be used in some embodiments are shown in U.S. patent application Ser. No. 12/802,496 filed Jun. 8, 2010, the disclosure of which is herein incorporated by reference in its entirety.

In an example embodiment one of the transaction function devices in operative connection with the controller is a diagnostic article reading device 96 which may be operative to read a diagnostic article schematically indicated 98 which may provide software instructions useful in servicing the machine. Alternatively and/or in addition, provision may be made for connecting the bus 92 or other devices in the machine computer device 100 which may be useful in performing testing or diagnostic activities related to the machine.

Figure 5:
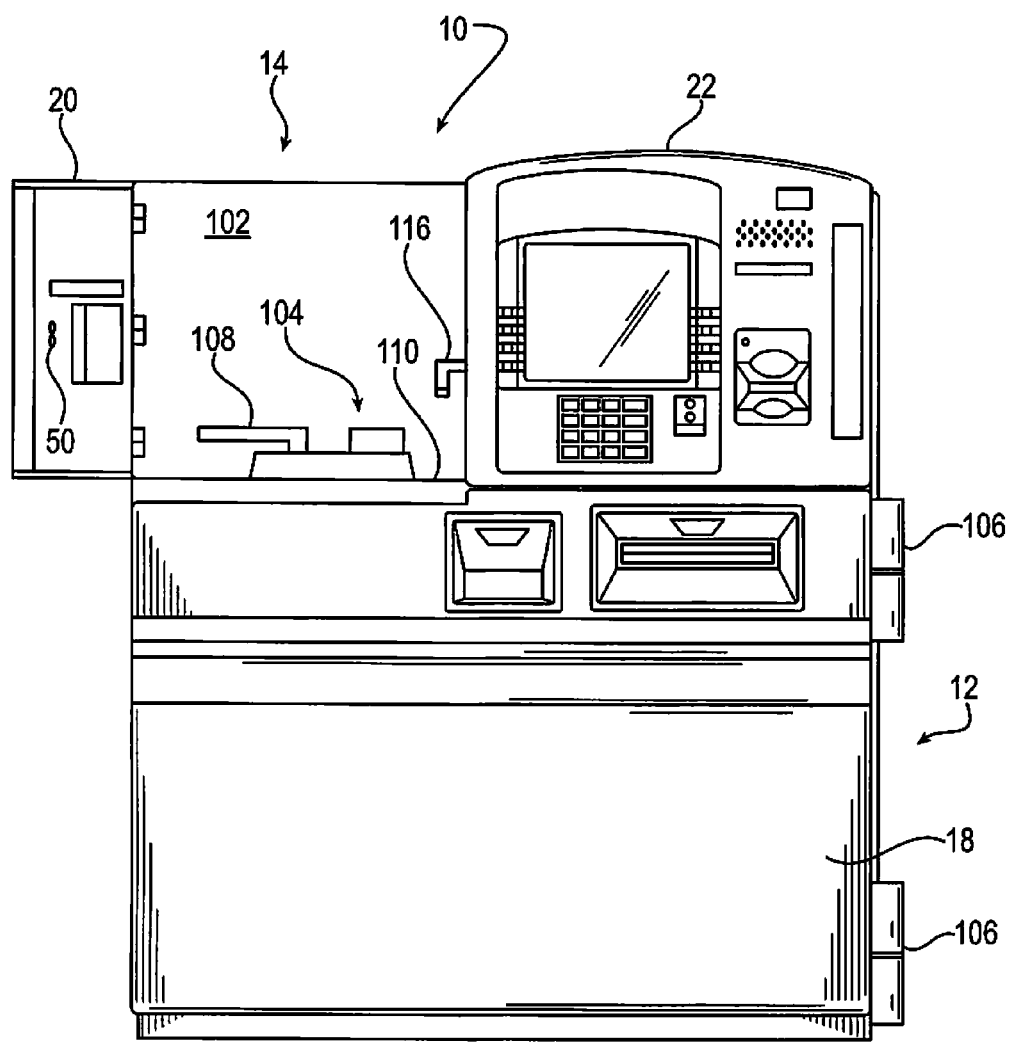
FIG. 5 is a front view showing the fascia portion moved to access a first portion of an upper housing of the machine.

In an example embodiment of machine 10 the first fascia portion 20 and the second fascia portion 22 are independently movably mounted on the machine housing 12. This is accomplished through the use of hinges attached to fascia portion 20. The opening of the fascia lock 50 on the first fascia portion 20 enables the first fascia portion to be moved to an open position as shown in FIG. 5. In the open position of the first fascia portion an authorized user is enabled to gain access to a first portion 102 in the upper housing area 14. In an example embodiment there is located within the first portion 102 a chest lock input device 104. In this embodiment the chest lock input device comprises a manual combination lock dial, electronic lock dial or other suitable input device through which a combination or other unlocking inputs or articles may be provided. In this embodiment, input of a proper combination enables the chest door 18 to be moved to an open position by rotating the door about hinges 106. In an example embodiment the chest door is opened once the proper combination has been input by manipulating a locking lever 108 which is in operative connection with a boltwork. The boltwork which is not specifically shown, is operative to hold the chest door in a locked position until the proper combination is input. Upon input of the correct combination the locking lever enables movement of the boltwork so that the chest door can be opened. The boltwork also enables the chest door to be held locked after the activities in the chest portion have been conducted and the chest door is returned to the closed position. Of course in other embodiments other types of mechanical or electrical locking mechanisms may be used. In an example embodiment the chest lock input device 104 is in supporting connection with a generally horizontally extending dividing wall 110 which separates the chest portion from the upper housing portion. Of course this housing structure is example of machine housing structures and in other embodiments other approaches may be used.

An authorized servicer who needs to gain access to an item, component or device of the machine located in the chest area may do so by opening the fascia lock and moving the first fascia portion 20 so that the area 102 becomes accessible. Thereafter the authorized servicer may access and manipulate the chest lock input device to receive one or more inputs, which if appropriate enables unlocking of the chest door 18. The chest door may thereafter be moved relative to the housing and about its hinges 106 to enable the servicer to gain access to items, devices or components within the chest. These activities may include for example adding or removing currency, removing deposited items such as envelopes or checks, or repairing mechanisms or electrical devices that operate to enable the machine to accept deposited items or to dispense currency. When servicing activity within the chest is completed, the chest door may be closed and the locking lever 108 moved so as to secure the boltwork holding the chest door in a closed position. Of course this structure and service method is example and in other embodiments other approaches may be used.

In an example embodiment the second fascia portion 22 is also movable relative to the housing of the machine. In an example embodiment the second fascia portion 22 is movable in supporting connection with a rollout tray 112 schematically shown in FIG. 3. The rollout tray is operative to support components of the user interface thereon as well as the second fascia portion. The rollout tray enables the second fascia portion to move outward relative to the machine housing thereby exposing components and transaction function devices supported on the tray and providing access to a second portion 114 within the upper housing and positioned behind the second fascia portion. Thus as can be appreciated, when the second fascia portion is moved outward, the components on the tray are disposed outside the housing of the machine so as to facilitate servicing, adjustment and/or replacement of such components. Further components which remain positioned within the housing of the machine as the rollout tray is extended become accessible in the second portion as the second fascia portion 22 is disposed outward and away from the housing.

Figure 2:
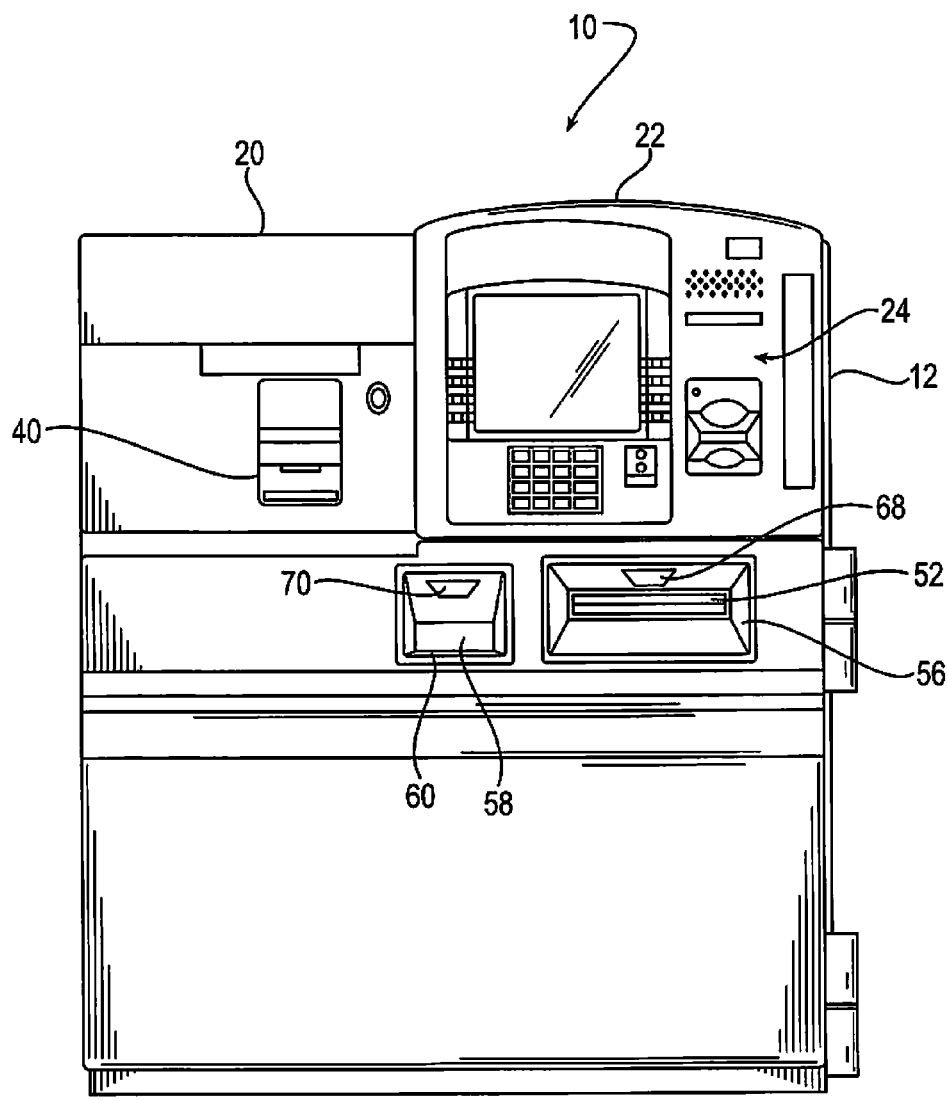
FIG. 2 is a front plan view of the machine shown in FIG. 1.

In an example embodiment the rollout tray 112 is in operative connection with a releasable locking device. The locking device is generally operative to hold the tray in a retracted position such that the second fascia portion remains in an operative position adjacent to the upper housing area as shown in FIGS. 1, 2 and 3. This releasable locking mechanism may comprise one or more forms of locking type devices. In an example embodiment the releasable locking mechanism may be released by manipulation of an actuator 116 which is accessible to an authorized user in the first portion 102 of the upper housing 14. As a result an authorized servicer of the machine is enabled to move the second fascia portion outward for servicing by first accessing portion 102 in the manner previously discussed. Thereafter by manipulating the actuator 116 the second fascia portion is enabled to move outward as shown in phantom in FIG. 8 so as to facilitate servicing components on the rollout tray. Such components may include for example a printer or card reader. After such servicing the second fascia portion may be moved toward the housing so as to close the second portion 114. Such movement in an example embodiment causes the rollout tray to be latched and held in the retracted position without further manipulation of the actuator. However, in other embodiments other types of locking mechanisms may be used to secure the rollout tray in the retracted position. It should be understood that this approach is example and in other embodiments other approaches may be used.

Figure 6:
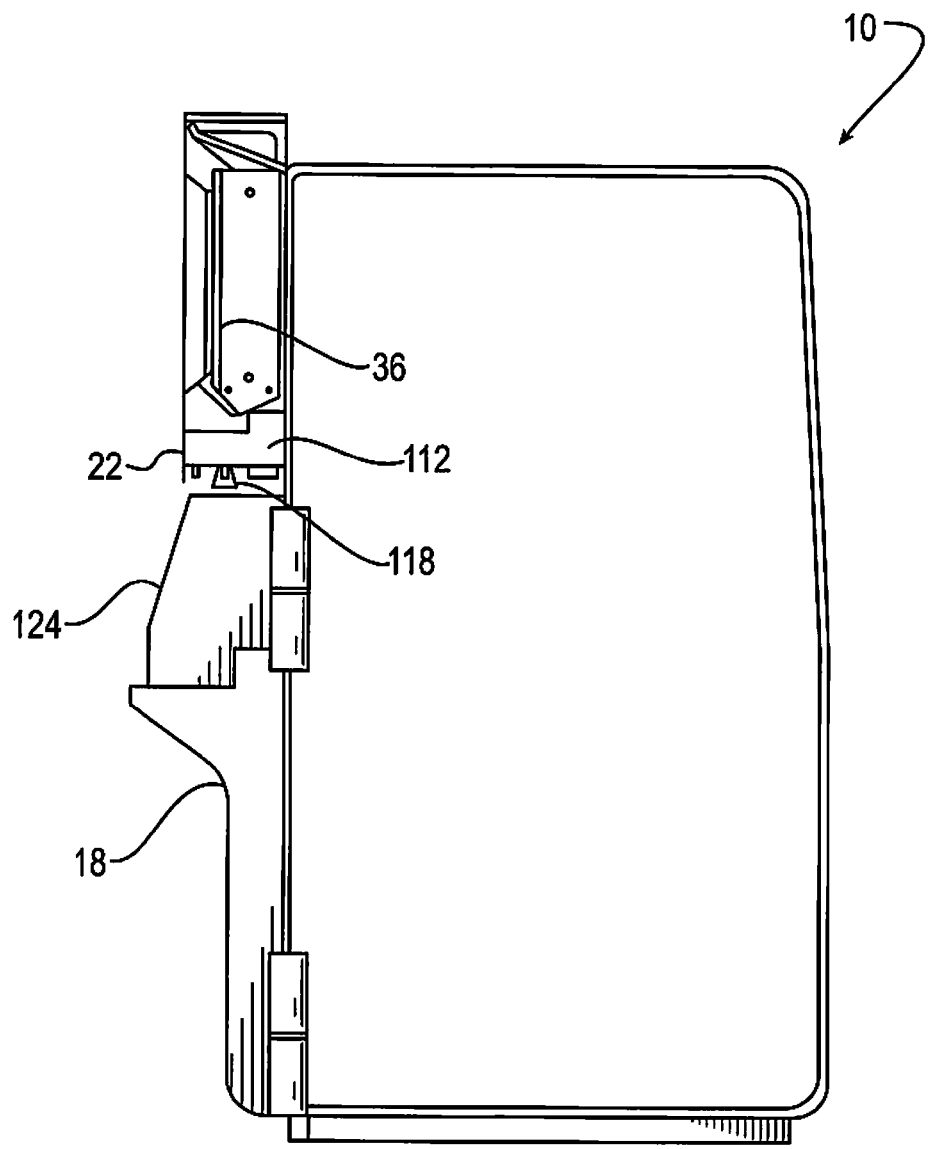
FIG. 6 is a partially transparent side view of the machine.
Figure 7:
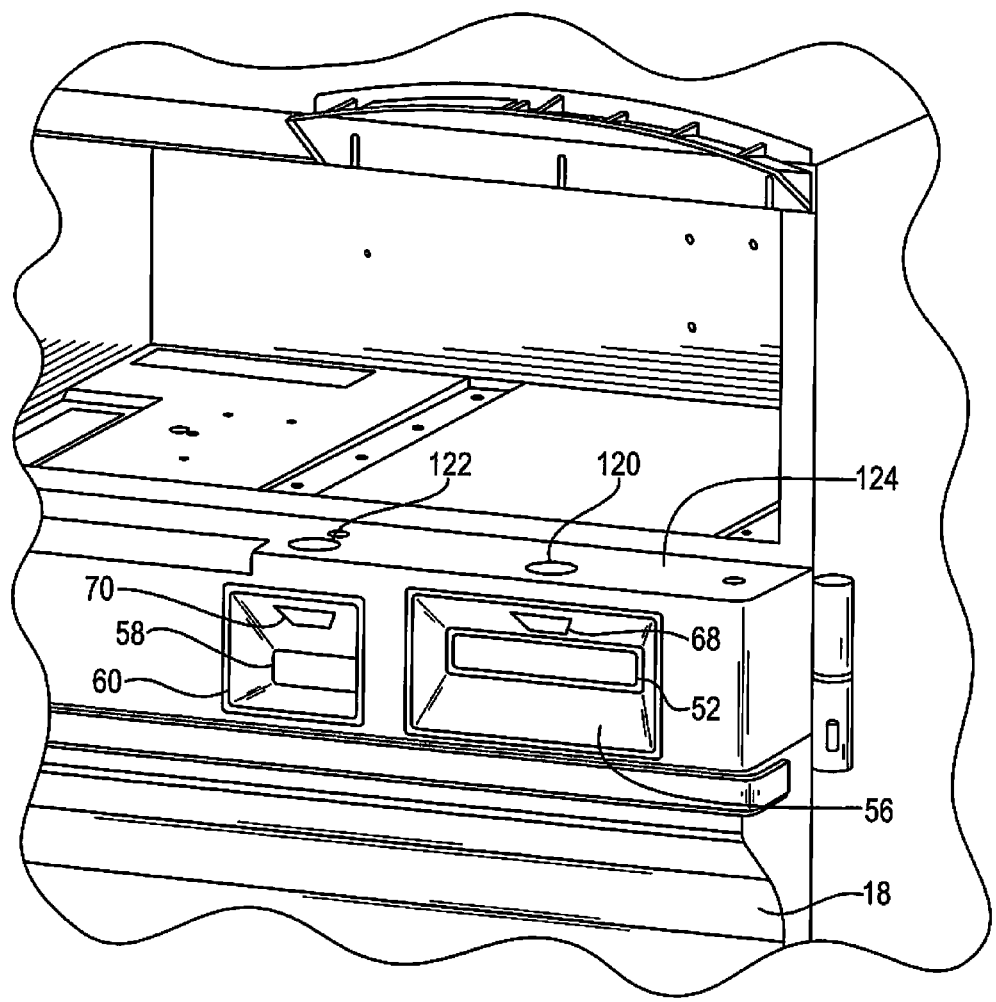
FIG. 7 is an isometric view of the machine shown in FIG. 1 with the components of the upper housing portion removed.
Figure 10:
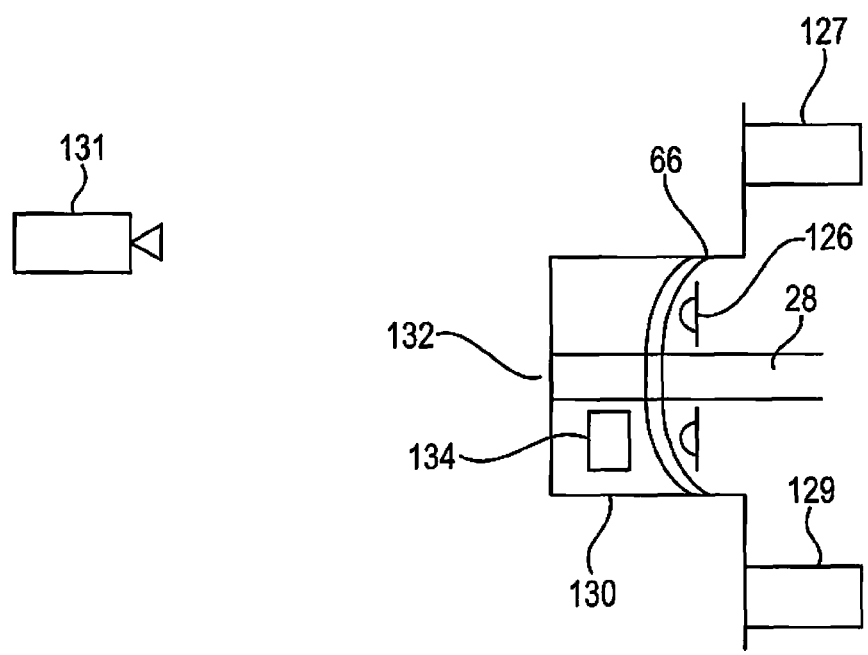
FIG. 10 is a schematic side view of an unauthorized card reading device in operative connection with a housing of the anti-fraud sensor.

As best shown in FIG. 7 in which the components supported in the upper housing are not shown, the delivery area 52 and the deposit acceptance area 58 are in supporting connection with the chest door 18. As such when the chest door 18 is opened, the delivery area 52 and the deposit acceptance area 58 will move relative to the housing of the machine. An example embodiment shown facilitates servicing of the machine by providing for the illumination for the transaction areas by illumination sources positioned in supporting connection with the rollout tray 112. As best shown in FIG. 6, these illumination sources 118 are movable with the rollout tray and illuminate in generally a downward direction. In the operative position of the second fascia portion 22 and the chest door 18, the illumination sources are generally aligned with apertures 120 and 122 which extend through the top of a cover 124 which generally surrounds the recessed pockets 60 and 56. As shown in FIG. 10 aperture 120 is generally vertically aligned with window 68 and aperture 122 is generally aligned with window 70. In an example embodiment, apertures 120 and 122 each have a translucent or transparent lens positioned therein to minimize the risk of the introduction of dirt or other contaminants into the interior of the cover 124.

Figure 8:
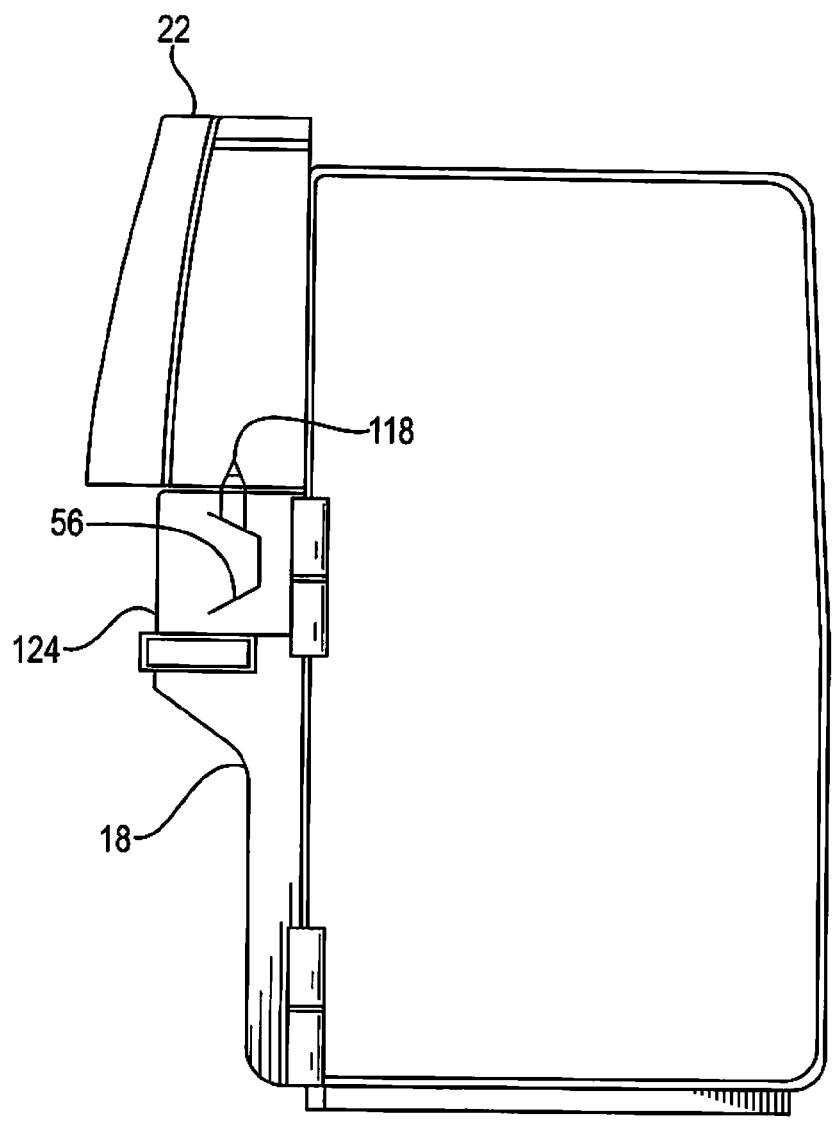
FIG. 8 is a schematic side view of the housing showing schematically the illumination system for the transaction areas and representing in phantom the movement of the upper fascia portion so as to provide access for servicing.

As can be appreciated from FIGS. 6 and 8, when the chest door 18 is closed and the second fascia portion 22 is moved to the operative position, the illumination sources 118 are positioned in generally aligned relation with apertures 120 and 122. As a result the illumination of the illumination devices is operative to cause light to be transmitted through the respective aperture and to illuminate the transaction area within the corresponding recessed pocket.

In operation of an example embodiment, the controller executes programmed instructions so as to initiate illumination of each transaction area at appropriate times during the conduct of transactions. For example in an example embodiment if the user is conducting a cash withdrawal transaction, the controller may initiate illumination of the delivery area 52 when the cash is delivered therein and is available to be taken by a user. Such illumination draws the user's attention to the need to remove the cash and will point out to the user that the cash is ready to be taken. In an example embodiment the controller is programmed so that when the user takes the cash the machine will move to the next transaction step. After the cash is sensed as taken, the controller may operate to cease illumination of the delivery area 56. Of course these approaches are example.

Likewise in an example embodiment if a user of the machine indicates that they wish to conduct a deposit transaction, the controller may cause the machine to operate to initiate illumination of the deposit acceptance area 58. The user's attention is drawn to the place where they must insert the deposit envelope in order to have it be accepted in the machine. In an example embodiment the controller may operate to also illuminate the illumination panel 62 to illuminate the deposit envelope providing opening 48 so that the user is also made aware of the location from which a deposit envelope may be provided. In an example embodiment the controller may operate to cease illumination through the window 70 and/or the illumination panel 62 after the deposit envelope is indicated as being sensed within the machine.

In alternative embodiments other approaches may be taken. This may include for example drawing the customer's attention to the particular transaction area by changing the nature of the illumination in the recessed pocket to which the customer's attention is to be drawn. This may be done for example by changing the intensity of the light, flashing the light, changing the color of the light or doing other actions which may draw a user's attention to the appropriate transaction area. Alternatively or in addition, a sound emitter, vibration, projecting pins or other indicator may be provided for visually impaired users so as to indicate to them the appropriate transaction area to which the customer's attention is to be drawn. Of course these approaches are example and in other embodiments other approaches may be used.

Figure 9:
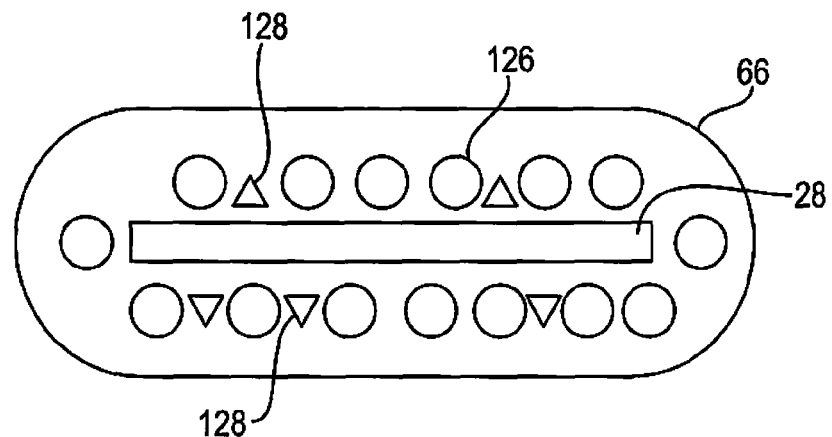
FIG. 9 is a schematic view of an illumination and anti-fraud sensing device which bounds a card reader slot of an example embodiment.

As previously discussed an example embodiment of machine 10 is also operative to draw a user's attention at appropriate times to the card reader slot 28. Machine 10 also includes features to minimize the risk of unauthorized interception of card data by persons who may attempt to install a fraud device such as an unauthorized card reading device on the machine. As shown in FIG. 9, the example card slot 28 extends through a card slot housing 66 which extends in generally surrounding relation of the card slot. It should be understood that although the housing 66 generally bounds the entire card slot, in other embodiments the principles described herein may be applied by bounding only one or more sides of a card slot as may be appropriate for detecting unauthorized card reading devices. Further, it should be understood that while an example embodiment is described in connection with a card reader that accepts a card into the machine, the principles being described may be applied to types of card readers that do not accept a card into the machine, such as readers where a user draws the card through a slot, inserts and removes a card manually from a slot, and other card reading structures.

In an example embodiment the housing 66 includes a plurality of radiation emitting devices 126. The radiation emitting devices emit visible radiation which can be perceived by a user of the machine. However, in other embodiments the radiation emitting devices may include devices which emit invisible radiation such as infrared radiation, but which nonetheless can be used for sensing the presence of unauthorized card reading devices adjacent to the card slot. In an example embodiment the controller operates to illuminate the radiation emitting devices 126 at appropriate times during the transaction sequence. This may include for example times during transactions when a user is prompted to input the card into the machine or alternatively when a user is prompted to take the card from the card slot 28. In various embodiments the controller may be programmed to provide solid illumination of the radiation emitting devices or may vary the intensity of the devices as appropriate to draw the user's attention to the card slot.

In an example embodiment the card slot housing 66 includes therein one or more radiation sensing devices 128. The radiation sensing devices are positioned to detect changes in at least one property of the radiation reflected from the emitting devices 126. The sensing devices 128 are in operative connection with the controller. The controller is operative responsive to its programming to compare one or more values corresponding to the magnitude and/or other properties of radiation sensed by one or more of the sensors, to one or more stored values and to make a determination whether the comparison is such that there is a probable unauthorized card reading device installed on the fascia of the machine. In some embodiments the controller may be operative to execute fuzzy logic programming for purposes of determining whether the nature of the change in reflected radiation or other detected parameters are such that there has been an unauthorized device installed and whether appropriate personnel should be notified.

FIG. 10 shows a side view of the housing 66. An example of a fraud device which comprises unauthorized card reading device 130 is shown attached externally to the housing 66. The unauthorized card reading device includes a slot 132 generally aligned with slot 128. The device 130 also includes a sensor shown schematically as 134 which is operative to sense the encoded magnetic flux reversals which represent data on the magnetic stripe of a credit or debit card. As can be appreciated, an arrangement of the type shown in FIG. 10 enables the sensor 134 if properly aligned adjacent to the magnetic stripe of a card, to read the card data as the card passes in and out of slot 128. Such an unauthorized reading device may be connected via radio frequency (RF) or through inconspicuous wiring to other devices which enable interception of the card data. In some situations criminals may also endeavor to observe the input of the user's PIN corresponding to the card data so as to gain access to the account of the user.

As can be appreciated from FIG. 10 the installation of the unauthorized card reading device 130 changes the amount of radiation from emitting devices 126 and that is reflected or otherwise transmitted to the sensors 128. Depending on the nature of the device and its structure, the amount or other properties of radiation may increase or decrease. However, a detectable change will often occur in the magnitude or other properties of sensed radiation between a present transaction and a prior transaction which was conducted prior to an unauthorized card reading device being installed. Of course the sensing of the magnitude of radiation is but one example of a property of radiation that may be sensed as having changed so as to indicate the presence of an unauthorized reading device.

Figure 11:
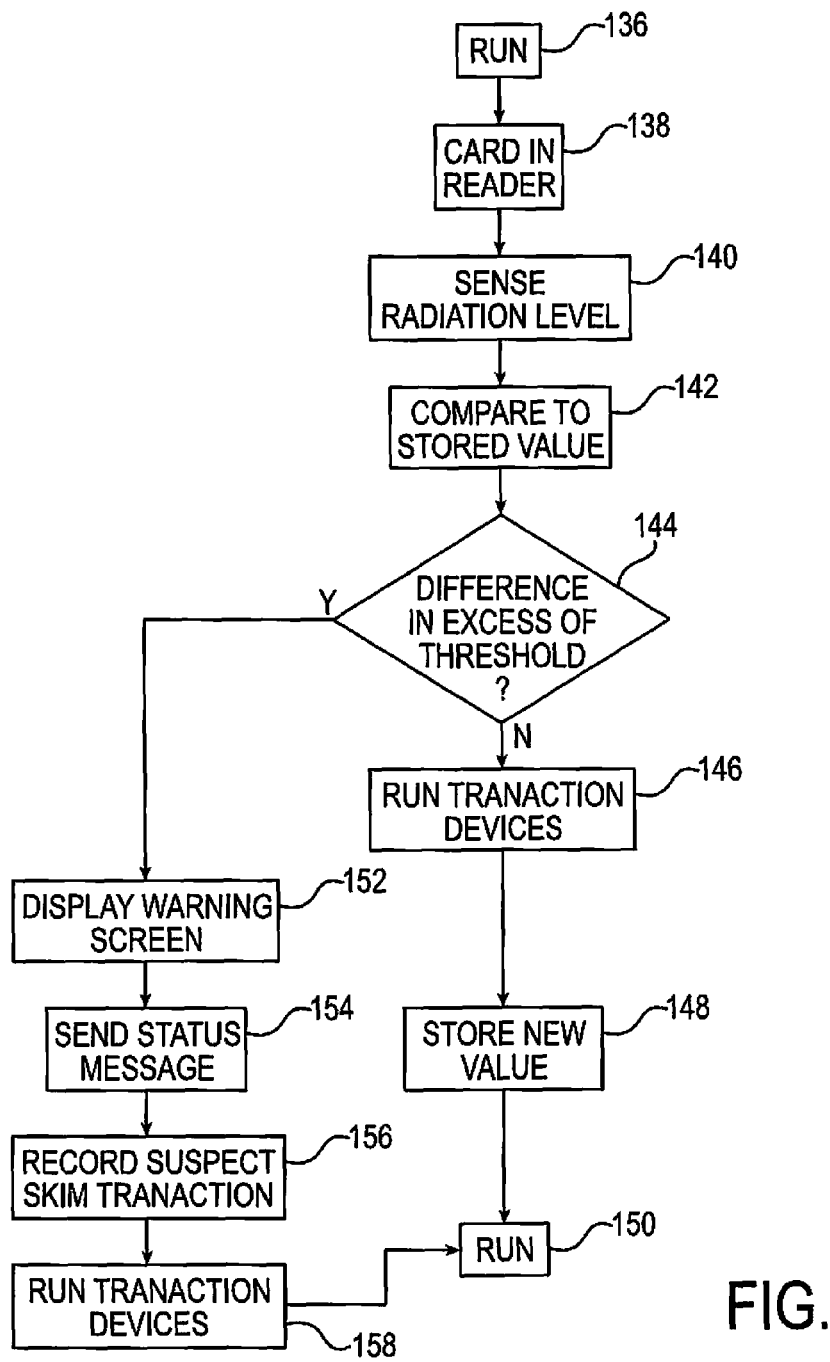
FIG. 11 is a schematic view of example logic for purposes of detecting the presence of an unauthorized card reading device in proximity to the card reader during operation of the machine.

FIG. 11 demonstrates an example simplified logic flow executed by a controller for detecting the installation of an unauthorized card reading device. It should be understood that this transaction logic is part of the overall operation of the machine to carry out transactions. The example logic flow is carried out through the execution of software instructions by at least one processor. The software instructions may be resident on any form of article which includes computer readable instructions such as a hard disk, floppy disk, semiconductor memory, flash memory, CD, DVD, ROM or other article. In this example logic flow the machine operates to carry out card reading transactions in a normal manner and to additionally execute the represented steps as a part of such logic each time a card is read. From an initial step 136 the controller in the machine is operative to sense that a card is in the reader within the machine in a step 138. Generally in these circumstances the controller will be operating the radiation emitting devices 126 as the user has inserted their card and the card has been drawn into the machine. In this example embodiment the controller continues to operate the radiation emitting devices and senses the radiation level or levels sensed by one or more sensors 128. This is done in a step 140.

The controller is next operative to compare the signals corresponding to the sensed radiation levels to one or more values in a step 142. This comparison may be done a number of ways and may in some embodiments execute fuzzy logic so as to avoid giving false indications due to acceptable conditions such as a user having the user's finger adjacent to the card slot 28 during a portion of the transaction. In the case of a user's finger for example, the computer may determine whether an unauthorized reading device is installed based on the nature, magnitude and changes during a transaction in sensed radiation, along with appropriate programmed weighing factors. Of course various approaches may be used within the scope of the concept discussed herein. However, based on the one or more comparisons in step 142 the controller is operative to make a decision at step 144 as to whether the sensed value(s) compared to stored value(s) compared in step 142 have a difference that is in excess of one or more thresholds which suggest that an unauthorized card reading device has been installed.

If the comparison does not indicate a result that exceeds the threshold(s) the transaction devices are run as normal as represented in a step 146. For example, a customer may be prompted to input a PIN, and if the card data and PIN are valid, the customer may be authorized to conduct a cash dispensing transaction through operation of the machine. Further, in an example embodiment the controller may operate to adjust the stored values to some degree based on the more recent readings. This may be appropriate in order to compensate for the effects of dirt on the fascia or loss of intensity of the emitting devices or other factors. This is represented in a step 148. In step 148 the controller operates the machine to conduct transaction steps in the usual manner as represented in a step 150.

If in step 144 the difference between the sensed and stored values exceeds the threshold(s), then this is indicative that an unauthorized card reading device may have been installed since the last transaction. In an example embodiment when this occurs, the controller is operative to present a warning screen to the user as represented in a step 152. This warning screen may be operative to advise the user that an unauthorized object has been sensed adjacent to the card reader slot. This may warn a user for example that a problem is occurring. Alternatively if a user has inadvertently placed innocently some object adjacent to the card reader slot, then the user may withdraw it. In addition or in the alternative, further logic steps may be executed such as the machine prompting a user to indicate whether or not they can see the radiation emitting devices being illuminated adjacent to the card slot and prompting the user to provide an input to indicate if such items are visible. Additionally or in the alternative, the illuminating devices within the housing 66 may be operative to cause the emitting devices to output words or other symbols which a user can indicate that they can see or cannot see based on inputs provided as prompts from output devices of the machine. In some alternative embodiments, sensors or cameras may be utilized to observe the outputs through the fascia, and are connected to processors including suitable programming to determine if particular outputs are not sensed or perceivable. The absence of the ability to perceive such signals may be indicative of the installation of an unauthorized interception device. This may enable the machine to determine whether an unauthorized reading device has been installed or whether the sensed condition is due to other factors. It may also cause a user to note the existence of the reading device and remove it. Of course various approaches could be taken depending on the programming of the machine.

If an unauthorized reading device has been detected, the controller in an example embodiment will also execute a step 154 in which a status message is sent to an appropriate service provider or other entity to indicate the suspected problem. This may be done for example through use of a system like that shown in U.S. Pat. No. 5,984,178 the disclosure of which is incorporated herein by reference in its entirety. Alternatively messages may be sent to system addresses in a manner like that shown in U.S. Pat. No. 6,289,320 the disclosure of which is also incorporated herein by reference in its entirety. In a step 156 the controller will also operate to record data identifying for the particular transaction in which there has been suspected interception of the card holder's card data. In addition or in the alternative, a message may be sent to the bank or other institution alerting them to watch for activity in the user's card account for purposes of detecting whether unauthorized use is occurring. Alternatively or in addition, some embodiments may include card readers that change, add, or write data to a user's card in cases of suspected interception. Such changed data may be tracked or otherwise used to assure that only a card with the modified data is useable thereafter. Alternatively or in addition, in some embodiments the modified card may be moved in translated relation, moved irregularly, or otherwise handled to reduce the risk that modified data is intercepted as the card is output from the machine.

In other example embodiments, card readers may be provided which include features for reading a card inserted in a direction that is generally transverse to the direction of the extending magnetic stripe of the card. That is, instead of inserting a short edge of a card into a card input slot, a long edge of the card can be inserted first into the card slot. The card slot is wider than a typical slot, and the card reader read head is horizontally movable. This may be done in a manner described in U.S. Provisional Patent Application Ser. No. 61/446,744 filed Feb. 25, 2011 and Ser. No. 61/574,594 filed Aug. 5, 2011, the disclosures of each of which are herein incorporated by reference in their entirety. Of course these approaches are example of many that may be employed.

In an example embodiment the machine is operated to conduct a transaction even in cases where it is suspected that an unauthorized card reading device has been installed. This is represented in a step 158. However, in other embodiments other approaches may be taken such as refusing to conduct the transaction. Other steps may also be taken such as capturing the user's card and advising the user that a new one will be issued. This approach may be used to minimize the risk that unauthorized transactions will be conducted with the card data as the card can be promptly invalidated. Of course other approaches may be taken depending on the programming of the machine and the desires of the system operator. In addition while the fraud device shown is an unauthorized card reading device, the principles described may also be used to detect other types of fraud devices such as for example false fascias, user interface covers and other devices.

In some embodiments additional or alternative features and methods may be employed to help detect the presence of unauthorized card reading devices or other attempted fraud devices in connection with the machine. For example in some embodiments an oscillation sensor may be attached to the machine to detect changes in frequency or vibration that result from the installation of unauthorized devices on the machine. FIG. 10 shows schematically an oscillator 127 attached to the interior surface of the machine fascia. Oscillator 127 may be operative responsive to the controller and suitable vibration circuitry to impart vibratory motion to the fascia in the vicinity of the card reader slot. A sensor 129 is in operative connection with the fascia and is operative to sense at least one parameter of the motion imparted to the fascia by the oscillator 127. Although oscillator 127 and sensor 129 are shown as separate components, it should be understood that in some embodiments the functions of the components may be performed by a single device.

The sensor 129 is in operative connection with the controller of the machine through appropriate circuitry. The controller selectively activates the oscillator and the sensor 129 is operative to sense the resulting movement of the fascia caused by the oscillation. The installation of an unauthorized card reading device or other fraud device on the machine will generally result in a change in at least one property being sensed by the sensor 129. This may include changes in amplitude, frequency or both. Alternatively or in addition, some embodiments may provide for the oscillator to impart vibration characteristics of various types or vibratory motion through a range of frequencies and/or amplitudes. Sensed values for various oscillatory driving outputs may then be compared through operation of the controller to one or more previously stored values. Variances from prior values may be detected or analyzed through operation of the controller and notifications given in situations where a change has occurred which suggests the installation of an unauthorized device.

In some embodiments the controller may cause the oscillator and sensor to operate periodically to sense for installation of a possible unauthorized device. Alternatively, the controller may cause such a check to be made during each transaction. Alternatively in some embodiments oscillation testing may be conducted when a possible unauthorized device is detected by sensing radiation properties. The controller may operate to take various actions in response to sensing a possible unauthorized reading device through vibration, radiation or both. For example detecting a possible fraud device by both radiation and oscillation may warrant taking different actions than only detecting a possible fraud device through only one test or condition.

In some embodiments the controller may be programmed to adjust the thresholds or other limits used for resolving the presence of a possible fraud device for responses to changes that occur over time at the machine. This may include for example adjusting the thresholds for indicating possible fraud conditions based on the aging of the oscillator or the sensor. Such adjustments may also be based on parameters sensed by other sensors which effect vibration properties. These may include for example, the fascia temperature, air temperature, relative humidity and other properties. Of course readings from these and other sensors may be used to adjust thresholds of the oscillation sensor, radiation sensor or other fraud device sensors. Various approaches may be taken depending on the particular system.

In some embodiments the oscillator may additionally or alternatively be used to prevent the unauthorized reading of card reader signals. This may be done for example when the banking machine has a device which takes a user card into the machine for purposes of reading data on the card. In such embodiments the controller may operate to vibrate the area of the fascia adjacent to the card reader slot when a user's card is moving into and/or out of the slot. In such cases the vibration may be operative to cause the generation of noise or inaccurate reading by an unauthorized card reading sensor so as to make it more difficult to intercept the card stripe data using an unauthorized reading device. In some embodiments such vibration may also serve to disclose or make more apparent the presence of unauthorized card reading devices. Of course these approaches are example and in other embodiments other approaches may be used.

In some example embodiments provision may be made for detecting the presence of unauthorized input sensing devices for sensing a user's inputs through the keypad on the machine. Such unauthorized input sensing devices may be used by criminals to sense the PIN input by the user. Detecting unauthorized devices may be accomplished by providing appropriate sensing devices in or adjacent to the keypad. Such sensing devices may be operative to detect that a structure has been placed over or adjacent to the keypad. Such sensors may be in operative connection with the controller in the machine or other devices which are operative to determine the probable installation of such an unauthorized input sensing device. In response to determining the probable installation of such a device, the controller may be operative in accordance with its programming to provide notification to appropriate entities, modify the operation of the machine such as to disable operation or prevent certain operations, or to take other appropriate actions.

Figure 12:
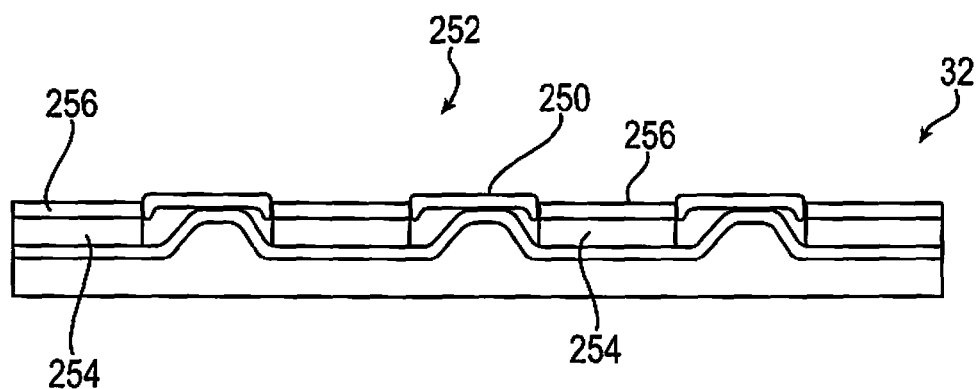
FIG. 12 is an example side, cross sectional view of a machine keypad.

FIG. 12 shows the cross-sectional view of example keypad 32. Keypad 32 is shown schematically, and it should be understood that not all of the components of the keypad are represented. Keypad 32 includes a plurality of keys 250. Keys 250 are moveable responsive to pressure applied by a user's finger to provide an input corresponding to alphabetical or numerical characters. Extending between some of the keys 250 are areas or spaces 252. Extending in spaces 252 are sensors 254. In an example embodiment the sensors 254 are radiation type sensors, but as previously discussed, in other embodiments other approaches may be used. Overlying the sensors 254 is an outer layer 256. In an example embodiment, layer 256 is translucent or otherwise comprised of material so as to partially enable the transmission of radiation from the sensors therethrough.

Figure 13:
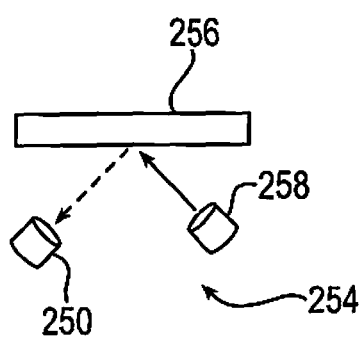
FIG. 13 is a schematic representation of a sensor for sensing whether an unauthorized key input sensing device has been placed adjacent to the keypad.

As represented in FIG. 13, the example sensors 254 include a radiation emitter 258 and a radiation receiver 260. During operation the radiation emitter is operative to output radiation that is at least partially reflected from the inner surface of layer 256. The reflected radiation is received by the receiver 260. Corresponding electrical signals are produced by the receiver, and such signals are transmitted through appropriate circuitry so as to enable the controller to detect the changes in signals that correspond to probable presence of an unauthorized reading device.

Figure 14:
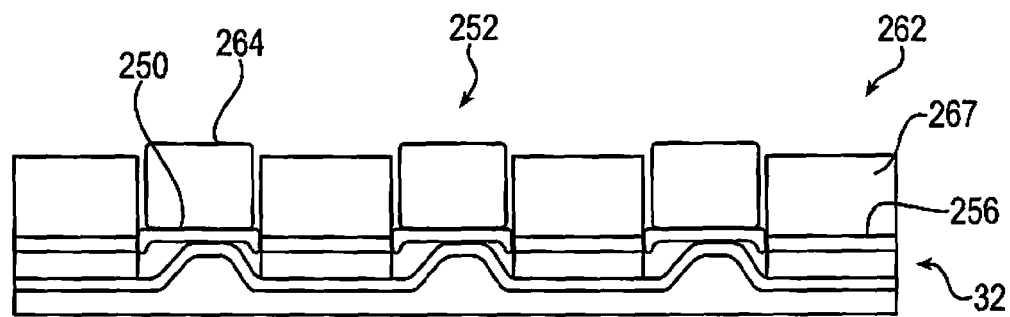
FIG. 14 is a view of a keypad similar to FIG. 12 but with an unauthorized key input sensing device attached.

FIG. 14 is a schematic view of an unauthorized input intercepting device 262 that has been positioned in overlying relation of a keypad 32. The input intercepting device 262 includes false keys 264 which are moveable and which are operatively connected to the corresponding keys 250 of the keypad. In an example embodiment, input intercepting device 262 includes sensors which are operative to detect which of the false keys 264 have been depressed by a user. Because the depression of the false keys is operative to actuate the actual keys 250, the machine is enabled to operate with the device 262 in place. Input intercepting device 262 in example embodiments may include a wireless transmitter or other suitable device for transmitting the input signals to a criminal who may intercept such inputs.

Figure 15:
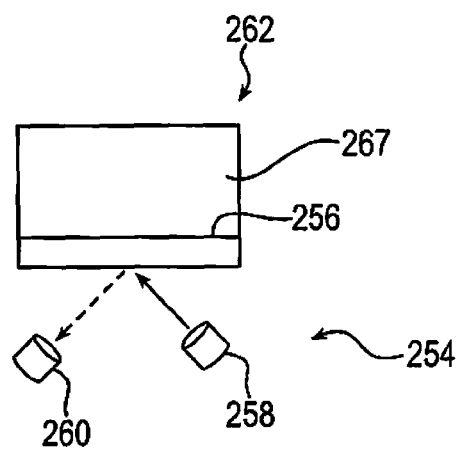
FIG. 15 is a schematic representation similar to FIG. 13, but representing the change in reflected radiation resulting from the attachment of the unauthorized key input sensing device.
Figure 19:
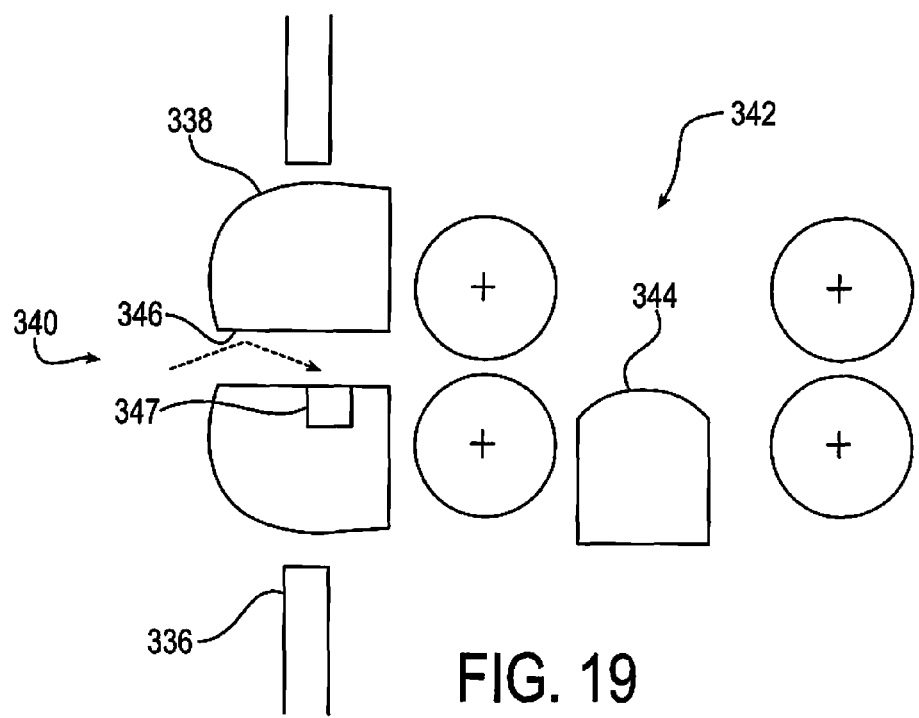
FIG. 19 is a schematic view of yet a further alternative embodiment of an anti-fraud device.

As represented in FIG. 19, the input intercepting device 262 includes portions 267 which extend in the areas 252 in overlying relation of layer 256. As represented in FIG. 15, the portion of the input intercepting device extending in overlying relation of the layer 256 is operative to cause a change in the amount of radiation from the emitter 258 that is reflected and sensed by the receiver 260 of the sensor. This is because the overlying portion will have different radiation reflecting or absorbing characteristics which will change the radiation reflective properties of the layer 256 compared to when no such input intercepting device is present. Thus the installation of the unauthorized input intercepting device can be detected.

In some example embodiments the controller may be operative to sense the level of reflected radiation at the sensors periodically. This may be done, for example, between transactions when a user is not operating the terminal. This may avoid giving a false indication that an unauthorized input intercepting device has been installed when a user is resting a hand or some other item adjacent to the keypad during a transaction. Of course in other embodiments sensor readings can be taken and compared during transactions to prior values stored in a data store to determine if a change lasting longer than normal has occurred which suggests that an unauthorized input intercepting device has been installed rather than a user has temporarily placed their hand or some other item adjacent to the keypad. For example, in some example embodiments the controller may not resolve that there is a probable unauthorized input intercepting device on the machine until a significant change from a prior condition is detected in the radiation properties adjacent to the keypad on several occasions both during a transaction and thereafter. Alternatively or in addition, a controller may be operative to determine that an improper device has been installed as a result of changes that occur during a time when no transactions have occurred. Alternatively in other embodiments, the controller may operate to sense and analyze signals from the sensors responsive to detecting inputs from other sensors, such as for example an ultrasonic sensor which senses that a person has moved adjacent to the machine but has not operated the machine to conduct a transaction. Of course these approaches are merely example of many approaches that may be used.

It should be understood that although in an example embodiment radiation type sensors are used for purposes of detection, in other embodiments other types of sensors may be used. These include, for example, inductance sensors, sonic sensors, RF sensors, or other types of sensing approaches that can be used to detect the presence of material in locations that suggest an unauthorized input intercepting device being positioned adjacent to the keypad. Further, in some embodiments the controller or other circuitry associated with the sensors may be operative to make adjustments for normal changes that may occur at the machine. These may include, for example, changes with time due to aging of emitters, the build up of dirt in the area adjacent to the keypad, weather conditions, moisture conditions, scratching of the surface of the sensing layer, or other conditions which may normally occur. Appropriate programs may be executed by the controller or other circuitry so as to recalibrate and/or compensate for such conditions as may occur over time while still enabling the detection of a rapid change which is sufficiently significant and of such duration so as to indicate the probable installation of an unauthorized input intercepting device. Of course these approaches are example of many approaches that may be used.

In other embodiments other or additional approaches to detecting fraudulent reading or other improper activities may be used. For example, in some embodiments the fascia of the banking machine may be subject to observation within a field of view of one or more imaging devices such as camera 131 schematically represented in FIG. 10. Camera 15 may be in operative connection with an image capture system of the type shown in U.S. Pat. No. 6,583,813, the disclosure of which is incorporated herein by reference in its entirety.

In some embodiments the controller and/or an image capture system may be operative to execute sequences of activities responsive to triggering events that may be associated with attempts to install or operate fraud devices. For example, the presence of a person in front of the banking machine may be sensed through image analysis, weight sensors, sonic detectors or other detectors. The person remaining in proximity to the machine for a selected period or remaining too long after a transaction may constitute a triggering event which is operative to cause the system to take actions in a programmed sequence. Such actions may include capturing images from one or more additional cameras and/or moving image data from one or more cameras from temporary to more permanent storage. The sequence may also include capturing image data from the fascia to try to detect tampering or improper devices. Radiation or vibration tests may also be conducted as part of a sequence. Notifications and/or images may also be sent to certain entities or system addresses. Of course these actions are example.

In some example embodiments the controller of the machine or other connected computers may be operatively programmed to analyze conditions that are sensed and to determine based on the sensed conditions that a fraud device is installed. Such a programmed computer may be operative to apply certain rules such as to correlate the repeated sensing of abnormal conditions with a possible fraud or tampering condition and to conduct tests for the presence of fraud devices. Such events may constitute soft triggers for sequences or other actions to detect and reduce the risk of fraud devices. Of course these approaches are merely example and in other embodiments other approaches may be used.

In some embodiments the machine may include sensors adapted to intercept signals from unauthorized card readers or customer input intercepting devices. For example, some fraud devices may operate to transmit RF signals to a nearby receiver operated by a criminal. The presence of such RF signals in proximity to the machine may be indicative of the installation of such a device. Such signals may be detected by appropriate circuitry and analyzed through operation of the machine controller or other processor, and if it is determined that it is probable that such a device is installed, programmed actions may be taken.

For example, in some embodiments suitable RF shielding material may be applied to or in the fascia to reduce the level of RF interference from devices within the machine at the exterior of the fascia. Antennas or other appropriate radiation sensing devices may be positioned adjacent to or installed on the fascia. A change in RF radiation in the vicinity of the fascia exterior may result upon the installation of an unauthorized device. The RF signals can be detected by receiver circuitry, and signals or data corresponding thereto input to a processor. In some embodiments the circuitry may also determine the frequency of the radiation sensed to be used in resolving if it is within the range emitted by legitimate devices such as cell phones of users operating the machine. In other embodiments the circuitry may analyze the signals to determine if they are varying, and the circuitry and/or the processor may evaluate whether the changes in signal correspond to the input of a PIN or a card to the machine.

In response to the sensed signal data, the processor may operate in accordance with its programming to evaluate the nature and character of the intercepted signals. For example, if the signals do not correspond to a legitimate source, such as a cell phone, the processor may operate to take actions such as to wholly or partially cease operation of the machine, capture images with a camera and digital video recorder, and/or notify an appropriate remote entity through operation of the machine. Alternatively, the processor may compare the sensed RF signals to transaction activity at the machine. If the sensed signals are determined to be varying in ways that correspond in a pattern or relationship to card or PIN inputs, for example, the processor may operate in accordance with its programming to cause the machine or other devices to take appropriate programmed steps.

In still other example embodiments the processor may be in operative connection with a RF emitter. The processor may operate in accordance with its programming to cause the emitter to generate RF signals that interfere with the detected signals. This can be done on a continuing basis or alternatively only at times during user operation of the machine when user inputs are likely to be intercepted. For example, the processor controlling the emitter may operate the machine or be in communication with a controller thereof. In such situations, the processor may operate to control the emitter to produce outputs at times when a user's card is moving into or out of a card slot, and/or when the machine is accepting a user's PIN or other inputs. Thus, the emitter may be operative to produce interfering signals during relatively brief periods so as to not disrupt RF transmissions for an extended period in the event an incorrect determination is made and the RF signals are from a legitimate source.

In some embodiments an emitter may be a type that transmits on a plurality of frequencies intended to disrupt transmissions within the expected range of frequencies for a fraud device. In other embodiments the emitter may be controlled responsive to the processor to match the frequency or frequencies of suspect signals that have been detected. Of course these approaches are example of approaches that may be used.

Figure 41:
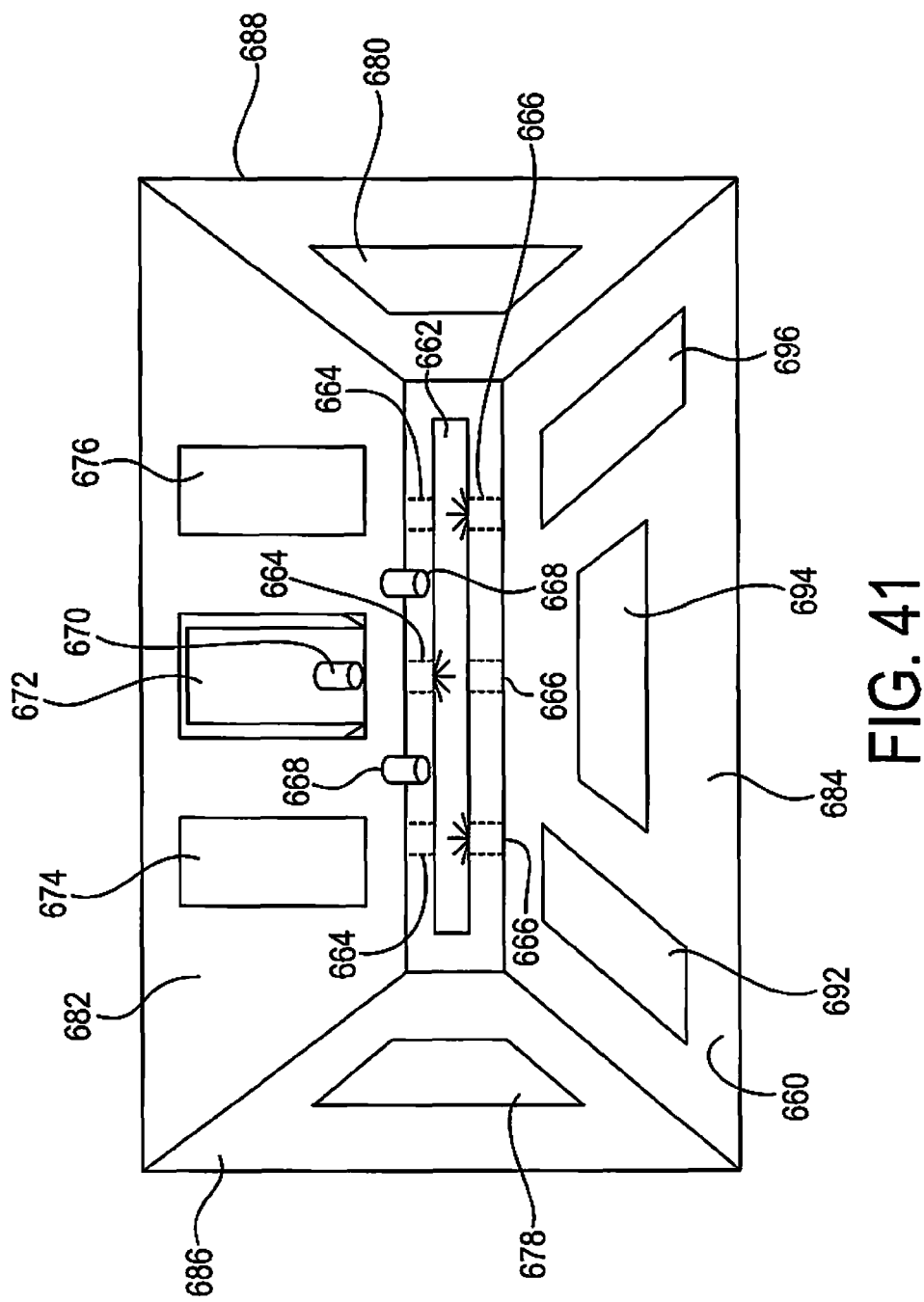
FIG. 41 shows a front view of an example card reader bezel with a particular contour.

In alternative example embodiments, the radiation may be generated so as to disrupt sensors that may attempt the reading of a magnetic stripe of a card as it passes through a card reader slot. This may be accomplished, for example, through the use of a suitable electrical coil or other device which produces electromagnetic radiation in the area adjacent to the exterior of the card slot where a skimming device would likely be located. Suitable driving circuitry may operate to produce radiation in the form of electromagnetic pulses which will be sensed as signals by a read head of the skimming device. Driving circuitry may operate to cause such electromagnetic radiation to be produced by a toroid or similar structure adjacent to the slot. In some example embodiments, the toroid may surround the card slot on the inside of the machine fascia and be configured so that the electromagnetic radiation is generally directed toward an area outside of the machine and adjacent to the slot. Further in example embodiments, suitable shielding material may be provided to further assure that the radiation acts in the area where a skimmer may be positioned and does not interfere with the operation of other devices in or on the machine. FIG. 41 shows an example of a card reader bezel 660. Upper radiation emitters 664 are located adjacent to an upper portion of the card reader entry slot 662 of the bezel. Lower radiation emitters 666 are located adjacent to a lower portion of the slot 662.

In example embodiments, the strength of the radiation may be limited to a level that does not damage the data recorded within the magnetic stripe of a card. For magnetic cards used in financial applications, generally the high coercivity stripe media will not be adversely impacted provided that the electromagnetic pulse that is produced is at or below 4,000 Gauss. Of course it should be understood that in other applications and particularly when other card types are used, different approaches may be taken.

In example systems suitable driving circuitry may operate to cause radiation to be output from the toroid or other emitter at a frequency that will generally interfere with the signals that an unauthorized reading head would generate when sensing the magnetic stripe on a card. Such frequency will generally be of sufficiently high strength and at a frequency so as to produce so much noise in the signal from the unauthorized reader head that the information encoded on the magnetic stripe of the card cannot be determined from the signals. Alternatively or in addition, the driving circuitry may operate so as to vary the pulse frequency and duration in a random or otherwise programmed manner so as to further attempt to interfere with the signals that would be generated by an unauthorized stripe reading device. Such signals may be varied, for example, in response to variations in speed and/or direction of the card as it is moved through the reader slot of the fascia. Thus, for example, in a system that varies the speed and/or direction of the card, a suitable processor programmed to receive signals indicative of the operation of card reader motors or other moving devices, may operate to vary the interference radiation that is output so as to try to achieve the maximum interference to prevent the unauthorized interception of card data.

The pulse frequency of interfering electromagnetic radiation which is intentionally output can be varied in a predetermined programmed pattern. The at least one processor of the machine, by knowing the pattern, can cause the card reader to read the stripe data when the interfering noise is not being emitted. Alternatively, the at least one processor can resolve the actual magnetic stripe data from the total data read by the card reader. For example, the at least one processor can act to remove the data attributed to the generated noise from the total read data.

Further, in some example embodiments, the output of electromagnetic radiation can be operative to cause the inducement of changes to data encoded on counterfeit cards which may have magnetic stripe materials that are more readily modified than genuine cards. Thus, for example, in some embodiments the circuitry associated with the card reader may operate to determine if the data read from the card varies in ways that suggest that the radiation output has modified data written on the card. Thus, for example, the effect of the electromagnetic noise from the toroid or other emitter may have resulted in the recording of such noise on the stripe of a counterfeit card. Such noise may have impacted the recorded data on the card such that the magnetic flux reversals which correspond to the card data are substantially reduced or even substantially erased. Further, an area of a counterfeit card which have been exposed to the radiation for a longer period of time may have the level of noise included in the stripe increased for those areas having such extended exposure. Thus, for example, the last portion of the card to enter the card reader may exhibit the effects of more exposure to noise on the data encoded on the stripe. Thus through analyzing the signals that are received from the magnetic read head within the card reader, a low quality counterfeit card that has had its magnetic properties modified through operation of the anti-skim device can be detected. Thus for example in some embodiments, the signals from the read heads of the machine card reader, including, for example, noise levels, the magnitude of the flux reversals, and other properties, may be analyzed for areas along the length of the stripe through operation of at least one processor to identify conditions which correspond to a counterfeit card. In response to detecting signals which suggest that the card may be counterfeit, the at least one processor may operate in accordance with its programming to not cause the requested transaction to be conducted. This may include, for example, not processing the transaction, capturing the card, or taking other appropriate steps.

Further in some alternative embodiments, the detection of one or more conditions that correspond to a suspect counterfeit card may cause the at least one processor to operate the machine to operate the card reader to cause the card to be passed back out through the slot at least some distance so that it is exposed again to the radiation. The card can then be returned into the machine and read by the card reader so the effects of this additional exposure can be analyzed. The changes in the signals read from the card may further confirm that the card is a counterfeit. Of course these approaches are example and in other embodiments, other approaches may be used.

As can be seen, an example embodiment employs electromagnetic radiation to jam skimmers. An example system can cause electromagnetic radiation to be output (directed) into the area of the card slot when a card is (expected to be) moving into or out of the machine. This electromagnetic radiation output can prevent a skimming device, which has been fraudulently attached to the outside of a machine at a position adjacent to the card input slot, from being able to read data that is encoded on the magnetic stripe of a card.

As previously discussed, an example embodiments also allow for modification of a counterfeit card's stripe data by outputting electromagnetic radiation. A counterfeit card may be made using materials that are not as high quality as regular (genuine) cards. As a result, the magnetic stripe used on a card that is readily programmable by counterfeiters may be subject to having its encoded data changed by virtue of the outputted electromagnetic radiation designed to jam the signals from a counterfeit read head.

As previously described, the output of electromagnetic radiation by a machine can be viewed as providing "noise". This noise can begin to change or reduce the signal strength that can be detected from a counterfeit card. If the radiation exposure is long enough then it may even serve to effectively erase data that was encoded on the counterfeit card's magnetic stripe. By analyzing the magnetic flux reversals that can be read from the card, and by determining that the signals produced by the read head from flux data has been reduced or modified as a result of exposure to the noise, a counterfeit card can be identified. In addition, if a suspect card is identified, the card reader can operate to send the card back out of the card slot part way, so that it is further exposed to the damaging electromagnetic radiation. The card can then be pulled back into the machine and reviewed again to see if the further (additional) exposure to the electromagnetic radiation has further effectively impacted the data on the card's magnetic stripe. By effectively determining that the encoded data on the magnetic stripe was readily modified by outputted electromagnetic radiation that was intended to jam a card skimmer, the low (poor) quality of the magnetic stripe on a card can identify it as a potentially counterfeit card.

The same electromagnetic radiation output by a machine can serve several (e.g., at least three) fraud prevention functions. First, the electromagnetic radiation can function to jam operation of a fraudulent card reader device. Second, this same electromagnetic radiation can function to modify data on a counterfeit card's (low quality) magnetic stripe, enabling the machine to detect the counterfeit card. Third, because the counterfeit card's magnetic stripe data was damaged (modified) by the radiation, the physically (structurally) damaged card can be prevented from future successful use. That is, not only can the machine deny acceptance of the card for the currently attempted transaction, but the machine can also cause the card to be denied use in future transactions attempted at other machines. Thus, the example arrangement provides for prevention of future fraud.

In still other example embodiments, the automated banking machine can include an image capture device such as a small camera or similar sensors adjacent to the card slot. Such a camera can operate to capture images of the front and/or back of the card as the card passes through the card slot. Alternatively, such a camera or other sensor device suitable for capturing images on the cards may be positioned inside the machine or within the card reader itself. The image capture device can operate to capture visible images of the front and/or back of the card that is being and/or has been received by the machine. FIG. 41 also shows an example of cameras 668 located adjacent the card entry slot 662. Another camera 670 is located in at least part of a projection member 672 that extends outwardly from the face of the bezel 660.

The camera or other suitable image capture device can be in operative connection with one or more processors which operate to produce data corresponding to images captured through operation of the image capture device. Such images will correspond to the visible appearance of the face of the card toward which the camera is directed. The image data captured can be analyzed through the operation of at least one processor for the presence of one or more features which identify the particular card as a genuine card. Such features can include, for example, alphanumeric characters corresponding to the name of the person to which the card is issued and/or the card (account) number. Such features can also correspond to the presence of certain words, logos, or trademarks. Such features can also relate to the specific locations of image data and/or text data that is normally present on a genuine card but is likely not to be present on a counterfeit card. Such image data and/or text data may correspond to logos, holograms, trademarks, symbols, text, patterns, colors, bar codes, or other information.

In example embodiments image data can be compared to magnetic stripe data to determine if there is substantial correspondence (e.g., an acceptable amount of data matches). For example, the at least one processor can operate character recognition software which is operative to identify letters, numbers, symbols, or other items that are found in captured images that correspond to the face (or a portion thereof) of a card. Such character recognition software is available from commercial sources such as A2ia and Carreker.

For example, the at least one processor can be programmed to identify the letters included in the name of the individual that is on the card face. The at least one processor can then operate to compare the letters of the individual's name on the card face with data encoded on the card's magnetic stripe which corresponds to the user's name. The at least one processor can also operate to have the name data resolved from other stripe data, such as from an account number that is correlated in a data store with the name data. The magnetic stripe data can be read through operation of a card reader.

In some embodiments certain types of genuine cards can include embossed (e.g., raised) numeric data. The at least one processor can operate to determine if a card has embossed numeric data. If so, then the at least one processor can further operate to determine if the embossed numeric data includes an account number which corresponds to the account number data encoded on the magnetic stripe. A failure to have data of either type (e.g., raised, account number on face, account number on stripe) correspond may indicate that the card is not genuine.

In alternative embodiments, the at least one processor can operate to analyze the image data to detect the presence of certain symbols such as bank logos, card network logos, holograms, or other visually identifiable items. The absence of such items (or the presence of items that are not appropriate for the particular circumstances) may cause the at least one processor to operate in accordance with its programming to identify the card as suspect counterfeit.

An example embodiments also provide for situations where counterfeit cards are (visually) blank cards or substantially blank. For example, a face of a card may only be of a single constant color (e.g., white). The at least one processor can operate in accordance with its programming to identify that images captured from a card contain little or no visible indicia (or differences in color). The existence of such conditions may cause the card to be identified as a suspect counterfeit card. In response to making such a determination, example embodiments of one or more processors can operate in accordance with their associated programming to prevent the carrying out of a transaction using the card. Further, the card may be captured, images of the particular user may be captured and identified through the use of external cameras or other devices, notifications may be given remotely to bank employees or law enforcement authorities, operation of the machine may be suspended or other appropriate steps taken depending on the programming associated with the particular machine.

As can be seen, an example embodiments allow for the use of visual reading of card data to detect a counterfeit card. An example embodiment enables the detection of counterfeit cards which have a magnetic stripe but little or no other data printed thereon. This includes detection of a card that was originally produced for one purpose, but a criminal erased the card's image data and encoded different data onto the card's magnetic stripe.

As previously discussed, one way of identifying a counterfeit card is to capture an image of the front and/or back of the card, and then compare data included in the captured image to data read from the card's magnetic stripe. For example, an account number embossed on the front of a card can be resolved from an image captured by a small camera. The camera can be s positioned on the inside the machine adjacent to the card slot or positioned within the card reader. At least one processor can analyze the image data, and determine if the account number data read visually from the card corresponds to the account number data read from the magnetic stripe by the magnetic read head. If the account numbers do not substantially correspond (or no visually perceivable account number can be determined), then the card can be determined as counterfeit.

As previously discussed, another way of identifying a counterfeit card is to look for the name of the card holder. The name is normally visibly embossed on the exterior surface of the card. The name is also normally magnetically recorded on the card at magnetic stripe track 1. By comparing the name data from different locations and/or data formats (or by finding that the card's visual appearance does not include such name data), a counterfeit card can be identified.

As previously discussed, a further way of identifying a counterfeit card is to do a visual analysis for logos, holograms, or other data that would normally be present on a genuine card. This might include, for example, looking for the presence of a Visa or MasterCard logo. It might also include looking for a hologram in an appropriate place (e.g., a specific expected location on a card face). Such analysis can also involve searching for the name of a particular bank on the card face, and determining whether the name of the bank (on the card face) corresponds with the bank account data that can be read from the magnetic stripe. Similar comparable data features may also be resolved from using the back side of the card. Also, correspondence between data on the front and the back of the card as read visually can also help to identify counterfeit cards. An alternative or additional approach includes visually reading (or otherwise sensing) whether a card has many (or any) visible markings on it at all. A visible marking can involve colors, scratches, etc. For example, determination of a totally white card can be equated as an indication that the card is counterfeit. A card having no (or a very small amount of) scratches can also be associated with a counterfeit card, or be an indication that additional scrutiny should be undertaken. As previously discussed, all of these approaches can be implemented through appropriate programming of at least one processor associated with the machine (e.g., a computer within the machine and/or a computer in operative connection with the machine) to analyze the visual data that can be read from a card. Furthermore, it should be understood that the various methods described herein for determining whether a card is genuine or counterfeit can be used in combination with each other.

It should be understood that an example embodiments allow for use of card data that is stored in data storage formats other than a magnetic stripe. Such card data storage formats can include (but are not limited to) smart card chip features, radio frequency identification (RFID) tags, near field communication (NFC) chips, infrared (IR), wireless type cards, wireless communication, bar codes, electronic ink, etc. For example, specific image data (e.g., a name, account number, etc.) read from a face of a card can be compared to similar data (e.g., a name, account number, etc.) read from a RFID tag (or bar code, NFC chip, etc.) of the same card.

Figure 16:
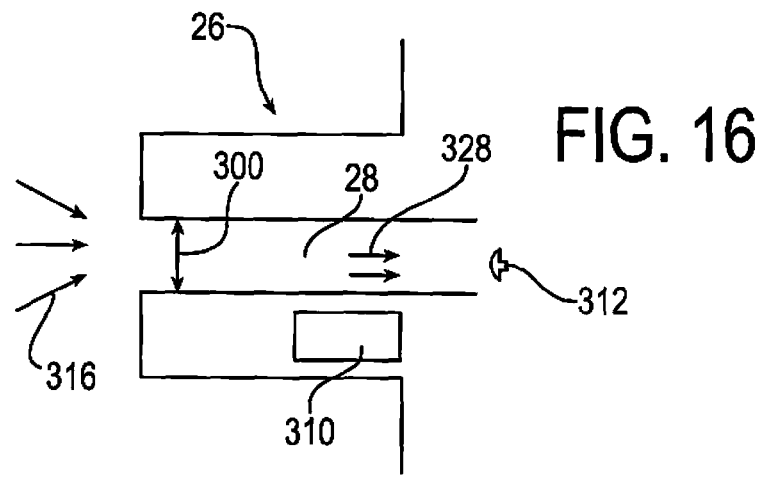
FIG. 16 is a schematic view of an anti-fraud device disposed within a slot of a card reader.
Figure 17:
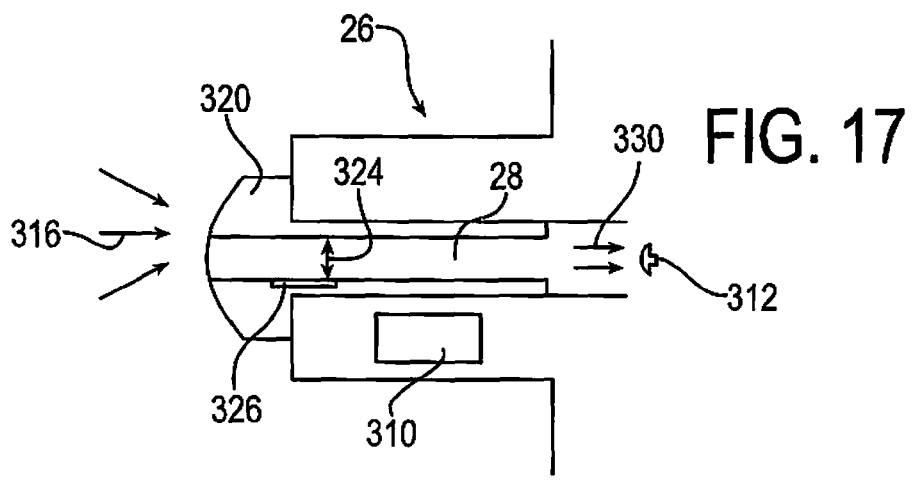
FIG. 17 is a schematic view of an unauthorized card reading device mounted adjacent the card reader.

An alternate example embodiment is described with particular reference to FIGS. 16 and 17. In an example embodiment, card reader 26, also shown schematically in FIG. 3, includes a card reader slot 28 defining a predetermined opening as indicated by arrow 300. The card reader includes component 310, such as a magnetic read head, operative to read data included on the magnetic stripe of a card such as a debit or credit card. The embodiment shown in FIG. 16 is merely example, and it should be understood that the principles described herein are applicable to card readers that accept a card into the machine and to card readers that do not accept a card into the machine.

At least one sensing device also referred to as a sensor, schematically indicated 312, is positioned within an interior of the machine adjacent the card slot 28. In one example embodiment, the sensing device 312 is able to sense at least one property of radiation passing through the card reader slot 28 to the interior of the machine and reaching the sensing device. For example, the sensing device 312 may be positioned so as to sense the intensity of ambient light that enters the slot from outside the machine housing, as indicated by arrows 316. Of course it should be understood that the positioning of the sensing device is schematic only and in some embodiments the sensing device may comprise multiple sensing devices and may be located outside the card path. Alternatively, one or more radiation sensors may be mounted on a moving member that moves into the card path when a card is not present.

As represented in FIG. 17, in the event that an unauthorized card reading device 320 is positioned adjacent the card reader 26, the property sensed by the sensing device 312 will be altered. For example, a sensing device enabled to sense the intensity of ambient light entering the slot will detect a change in that property.

The unauthorized card reading device 320 may be positioned such that at least a portion of the unauthorized device extends in the slot 28 which effectively narrows the opening defined by the card reader slot 28, as illustrated by arrow 324. In the illustrated embodiment, the unauthorized card reading device 320 includes a fraudulent magnetic read head 326 used to skim data from a passing card stripe. The unauthorized card reading device 320 defines a narrower opening than the legitimate card slot 28 to cause the inserted card to be kept close to the fraudulent magnetic read head 326.

The narrowed opening reduces the amount of ambient light entering the slot 28, and ultimately the amount of light that passes through the slot and is detected by sensing device 312. The decrease in intensity of ambient light detectable by the sensing device is illustrated in FIGS. 16 and 17 by arrows 328, 330, respectively. In an example embodiment, the sensing device 312 includes at least one photocell which is used to sense light as an integrator over area. The example sensor configuration is generally not sensitive to dust due to its position within the machine interior. Of course, in other embodiments other approaches may be used.

In other embodiments an unauthorized card reading device may not necessarily have a narrower slot than the machine's card reader slot. However the placement of the unauthorized card reading device will often result in a greater distance between the card opening to the unauthorized device outside the machine, and the at least one sensor inside the banking machine housing. This increased distance of the overall card slot, and longer light path results in the amount of light reaching the at least one sensor being reduced. Such a reduction in ambient light or other radiation can be monitored and sensed between transactions or at other times to detect when such a device is installed, for example. Of course, these approaches are example.

Figure 18:
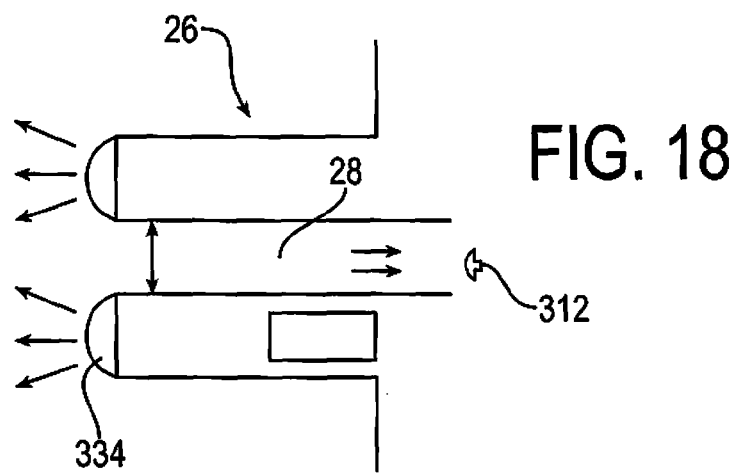
FIG. 18 is a schematic view of an alternate embodiment utilizing radiation emitters to emit radiation detectable by an anti-fraud device.

In an alternate embodiment, illustrated in FIG. 18, the property sensed by the sensing device 312 may be intensity of radiation emitted by one or more radiation emitters 334, such as LEDs, which are positioned to enable radiation emitted thereby to enter the slot 28 and be detected by sensing device 312. As will be readily appreciated, placement of an unauthorized card reading device adjacent the card reader impacts the detectable radiation.

The one or more radiation emitters 334 may operate substantially continuously, intermittently, or in accordance with transaction instructions as previously described. For example, the radiation emitters 334 may emit radiation responsive to operation of at least one controller in the machine when a user is instructed by the machine to insert a card into the card reader. The radiation is sensed by the sensing device. If an unauthorized card reading device has been positioned adjacent the card reader slot subsequent to a prior transaction, there is a detectable change in the property sensed by the sensing device. Further, in some embodiments a radiation guide, such as a fiber optic strand may extend from an area adjacent at least one emitter to an area adjacent the detector. Having the outside end of the strand located in the area where an unauthorized device would be attached may result in a greater change in sensed radiation to indicate the installation of an unauthorized card reading device. Of course this approach is example.

In an example embodiment, the sensing device 312 is in operative connection with at least one controller in the machine, as in previously described embodiments. With reference again to FIG. 11, the controller is operative responsive to its programming to compare one or more values corresponding to the sensed property to one or more stored values and make a determination as to the probability that an unauthorized card reading device 320 has been installed on the machine. Numerous factors and conditions may be used in making the determination. If an unauthorized card reading device is likely present, the controller generates at least one signal or otherwise enables the machine to take at least one action responsive to a change in the sensed property, as previously described. In an example embodiment, the responsive action may include the activation of an oscillator 127, as shown in FIG. 10 and previously described. Alternatively, the controller may sense for an unauthorized source of Radio Frequency (RF) signals at the machine. Of course this is merely example.

In still other embodiments the automated banking machine may include at least one light operated externally, such as a fascia light. The fascia light may provide a light level that is used to calculate a threshold of minimum light that can be expected to pass through the card slot when no card is present in the slot. The threshold can be used by the at least one controller to determine if the amount of radiation reaching the sensor is below the threshold. In such circumstances the at least one controller may be operative in accordance with its programming to generate at least the signal which can be used to indicate the likely presence of an unauthorized card reading device.

Of course in some embodiments the programming of the at least one controller is operative to compare the amount of light received at different times, such as between card reading transaction steps, to detect a change that corresponds to installation of an unauthorized card reading device. Alternately or in addition, the at least one controller may operate to monitor signals from the at least one sensor at times between transactions for changes which correspond to the installation of an unauthorized card reading device. In still other embodiments the at least one controller may be programmed to not identify certain changes as corresponding to the installation of an unauthorized reading device. This may include, for example, changes in radiation for card insertion, changes due to fingers placed against the slot by a user, such as a blind user, and other conditions that may cause a temporary drop in radiation sensed. In some embodiments the programming of the controller may disregard certain conditions based on the then-current operational status of the machine, such as receiving or delivering a card, for example. In some embodiments the at least one controller may execute fuzzy logic to determine events that correspond to installation of an unauthorized card reading device. Of course these approaches are merely example.

In still other embodiments the card slot may be bounded by one or more light reflecting surfaces. Such light reflecting surfaces may be configured to facilitate detecting the installation of an unauthorized card reading device. For example, in some embodiments, multiple opposed side surfaces bounding a card slot may be comprised of reflective material. Such material may be operative to normally conduct more radiation through the slot from outside the machine to the at least one sensor within the machine housing. Therefore, in some embodiments this configuration may cause a greater reduction in radiation reaching the at least one sensor when an unauthorized card reading device is installed.

In still other embodiments the reflective surfaces may be tapered or otherwise contoured to facilitate detection of changes in radiation that result from an unauthorized card reading device. For example, in some embodiments one or more reflective surfaces may be contoured to increase the amount of light that passes through the card slot to the at least one sensor. However, in some embodiments one or more reflective surfaces may be contoured to reflect at least some light falling on the card slot so it does not reach the sensor. This may be useful in embodiments where the card slot is subject to exposure to a wide range of radiation levels, and restricting the radiation that reaches the at least one sensor facilitates identifying a change that indicates the installation of an unauthorized card reading device. In still other embodiments, reflective surfaces may facilitate directing radiation to at least one sensor within the machine. This may include using a contoured mirror surface that focuses visible radiation for example.

Further, in some embodiments a mirror surface may be used on only one side of the slot. This may be done, for example, to provide reflection of radiation on a side of a slot opposite the slot side adjacent magnetic stripes of cards. Thus an unauthorized card reading device is likely to be positioned at least on the slot side opposite of the reflective surface, which may reduce radiation reading the reflective surface. This may help in detecting certain types of unauthorized card reading devices. An example is shown in FIG. 19 which includes a fascia surface 336 through which a card reader housing 338 extends. The card reader housing includes a card slot 340 through which cards pass. The card reader includes within the machine, a card reader mechanism 342, which includes a read head 344. The mechanism operates responsive to at least one controller to selectively move magnetic stripe cards by engagement with the rollers shown, so that data in the stripe is read by the read head.

In this example embodiment, at least one reflective surface 346 is positioned on a side of the slot opposed of the side of the slot which is adjacent the stripe on cards which pass through the slot. At least one sensor 347 is positioned on the side of the slot opposite the reflective surface. As can be appreciated, an unauthorized reading device will generally be positioned ahead of the opening to the card slot and will extend at least on the side of the slot on which magnetic stripes of cards are positioned. As can be appreciated from the arrow shown in phantom, an unauthorized card reading device in this position will generally reduce the amount of light reflected from surface 346 to the sensing device. As a result, signals from the sensing device can be used by at least one controller to determine when an unauthorized card reading device has been installed. Of course these approaches are merely example of approaches that may be used.

Figure 20:
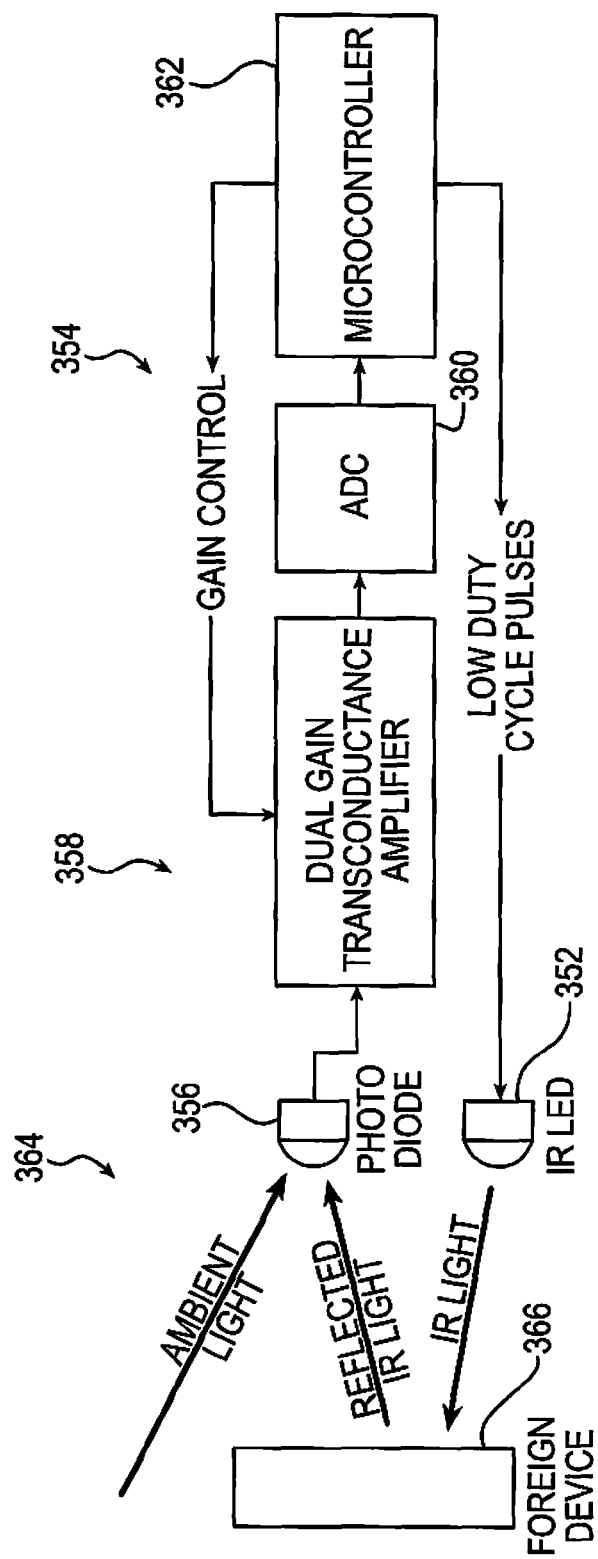
FIG. 20 is a schematic view of an example apparatus for detecting the presence of an unauthorized device in connection with a machine.

FIG. 20 shows an alternative embodiment which includes apparatus for detecting the presence of an unauthorized device adjacent a user transaction location on an automated banking machine. In some embodiments the user transaction location may include the area adjacent the card reader slot as previously discussed. Alternatively or in addition, the user transaction location may include all or a portion of a keypad on the automated banking machine. In still other embodiments the user transaction location monitored may include a cash outlet of the cash dispenser in the machine and through which cash is delivered to users. Other example user transaction locations monitored may include a deposit opening through which deposits, envelopes, checks, cash or other items are accepted into the machine. In still other embodiments other user transaction locations may be monitored through use of the example apparatus for the presence of an unauthorized device. Various user transaction locations on the automated banking machine that are monitored may include locations where items are input to the machine by users or delivered from the machine to users.

The example apparatus 350 shown in FIG. 20 includes a radiation output device 352. The radiation output device emits radiation responsive to signals from control circuitry schematically indicated 354. In an example embodiment the radiation output device includes an infrared (IR) light emitting diode (LED). It should be understood that although one radiation output device is shown which is of a particular type, alternative embodiments may include multiple radiation output devices of their type or radiation output devices of other types.

The apparatus also includes a radiation sensing device 356. In an example embodiment the radiation sensing device comprises a photo diode suitable for sensing IR radiation. Of course it should be understood that in other embodiments other types and numbers of radiation sensing devices may be used.

The radiation sensing device 356 is also in operative connection with control circuitry 354. In an example embodiment the control circuitry includes gain control circuitry schematically indicated 358. As discussed later in greater detail, the example gain control circuitry is operative to amplify signals from the radiation sensing device in a manner which provides greater signal amplification when lower ambient light levels are being sensed. The example control circuitry also includes circuitry 360 which is operative to convert the amplified analog signals to digital signals. The example control circuitry also includes at least one controller 362. The controller includes at least one processor that operates in accordance with its associated programming. In some embodiments the controller may cause operation of other devices in the machine while in other embodiments the controller may be associated only with the radiation detection functions. Of course it should be understood that the gain control circuitry 354 is example and in other embodiments other approaches may be used.

In an example embodiment the infrared LED 352 in the photo diode 356 are positioned on the machine physically close to each other and both face outward from the surface of the machine at the user transaction location generally indicated 364. In an example embodiment the control circuitry operates to cause the LED to output infrared pulses which have a duration of about 20 to 100 milliseconds. In an example embodiment these pulses are output on an intermittent and regular periodic basis. Of course in other embodiments other approaches may be used.

In operation the example control circuitry is operative to determine data corresponding to a level of radiation sensed by the photo diode 356 when the LED is off. The control circuitry is also operative to determine data corresponding to the magnitude of radiation that reaches the photo diode when the LED 352 is on. In this particular arrangement the amount of radiation generated by the LED 352 that is reflected to the photo diode 356 increases when an unauthorized device, schematically indicated 366 is installed on the machine. Such a device may include for example an unauthorized card reading device of the types previously discussed.

If an unauthorized device is present, the radiation pulses are generally reflected from the unauthorized device and are sensed by the photo diode. The amount of radiation reflected is often dependent on the distance that the unauthorized device is disposed from the radiation output device. The amount of reflected radiation is often also dependent on the material reflectivity of the unauthorized device as well as the particular geometry of the unauthorized device in the area adjacent the user transaction location. As a general proposition the closer the unauthorized device is positioned to the photo diode, the more infrared radiation that will be reflected to the photo diode. The greater magnitude of reflected radiation results in a larger output from the radiation sensing device 356.

In an example embodiment the probable presence of the unauthorized device is determined by the control circuitry comparing the magnitude of the signal that results from the reflected radiation pulse, as well as such signal having an elevated magnitude that continues through a plurality of cycles and/or for at least a set time. In an example embodiment if the elevated level of reflected radiation continues for a predetermined time period, then the control circuitry is operative to cause the automated banking machine to take at least one action. These actions may be of the type previously described, such as to conduct further analysis as to whether an unauthorized device is present. Alternatively or in addition, the control circuitry may be operative to provide at least one output indicative of an abnormal condition at the automated banking machine. Of course it should be understood that these approaches are example.

Figure 22:
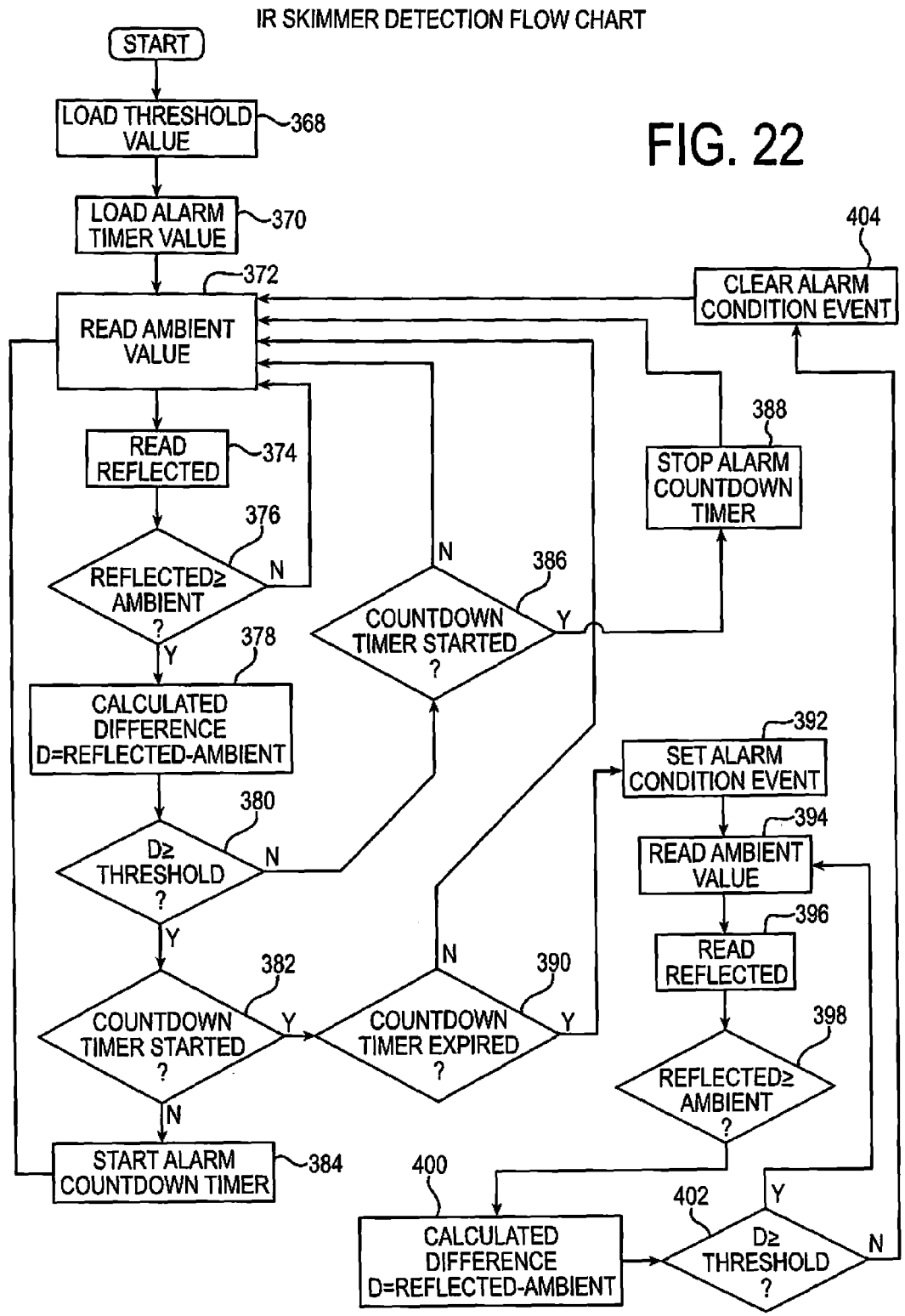
FIG. 22 is a schematic view of example logic flow carried out in connection with the apparatus of FIG. 20.

FIG. 22 shows an example schematic logic flow executed through operation of the at least one processor that is included with the control circuitry. The processor operates responsive to computer executable instructions. Prior to operation the at least one processor has stored in a memory associated therewith, at least one threshold value. This at least one threshold value is indicative of the level of radiation being reflected to the radiation sensing device relative to the ambient level of radiation, corresponding to a probable abnormal condition. The programming of this at least one threshold value is represented by a step 268. Also prior to operation, the memory associated with the at least one processor is programmed to include at least one timer value. This at least one time value corresponds to at least one time period. If during this time period the level of reflected IR radiation relative to the level of ambient IR radiation exceeds a threshold, the control circuitry is operative to determine that there is an abnormal condition which corresponds to the probable installation of a fraud device. This is represented in a step 370. Of course it should be understood that these steps are examples, and in other embodiments data corresponding to radiation sensed by the radiation sensing device may be compared to multiple threshold values or conditions. Likewise in other embodiments other or additional time periods or logic values may be used to determine the probable presence of an abnormal condition. In still other embodiments time periods and threshold values may be variable and calculated by the at least one processor responsive to one or more sensed values or parameters.

In an example embodiment, after loading the initial values in the memory the control circuitry operates in the manner discussed. The control circuitry determines data that corresponds to the level of ambient radiation reaching the photo diode at a time when the LED is not operating. This is represented in a step 372. The control circuitry through this step is operative to determine data at a first level that corresponds to the then current level of ambient radiation. The control circuitry then is operative to determine data that corresponds to the level of reflected radiation at a time while the LED is operated. This is represented by a step 374. The control circuitry then operates to determine in a step 376 if the data corresponding to the reflected radiation is at least as great as the level of ambient radiation. If not, the at least one processor returns to the logic flow step 372.

If in step 376 the level of radiation determined when the LED is operating is at least as great as the level of ambient radiation sensed, the control circuitry is operative to calculate a difference value. This is represented in a step 378. In an example embodiment the difference value corresponds to the data corresponding to the level of radiation when the LED is operating minus the value corresponding to the level of radiation when the LED is not operating. In an example embodiment, the calculation is done using the two immediately preceding values. However, it should be understood that in other embodiments other approaches may be used such as using averages of a plurality of preceding cycles, using a portion of the difference in magnitude values and/or using adjusted values that discard certain single abnormal data points (for example) for purposes of carrying out the calculation which corresponds to the difference in the radiation sensed compared to the level of ambient radiation.

In an example embodiment the difference value calculated in step 378 is then compared to the programmed threshold stored in connection with the control circuitry in step 368. This comparison is executed in a step 380. In the example step 380 the at least one processor is operative to determine if the difference value is at least as great as the threshold value. If so the at least one processor of the control circuitry checks in a step 382, to determine if a countdown timer function has been started. If not, the control circuitry operates to start the countdown timer in a step 384. In an example embodiment the countdown timer is operative to determine if the difference value remains at least as great as the threshold for the stored set period of time. If it does then the control circuitry is operative to determine that an abnormal condition likely exists. Of course it should be understood that while in an example embodiment time values are used for purposes of determining an abnormal condition. In other embodiments other approaches may be taken. These may include for example counting the number of cycles during which one or more difference values exceed one or more thresholds. These approaches may include for example a number of consecutive radiation output cycles, or alternatively the determination could be based on radiation values during a number of cycles within a given sample being in excess of a particular threshold. Also as previously discussed determinations may be based on multiple different thresholds and/or other parameters. Of course these approaches are example.

As shown in FIG. 22, if in step 380 the difference value is not at least as great as the threshold, the control circuitry determines in a step 386 if the countdown timer has been started. If not, the process repeats and the ambient value is again determined. However, if in step 386 the countdown timer has been previously started and the different value is not above the threshold, a step 388 is executed in which the countdown timer is stopped. In these circumstances the control circuitry is no longer calculating a time period in which a condition exists continuously which suggests an abnormal condition. For example, it can be appreciated that in cases where users are operating devices on an automated banking machine, the user's fingers or other objects may cause radiation levels that are sensed to vary during relatively limited periods of time. However, in general these conditions which effect the sensed radiation levels are soon removed and the sensed radiation levels will return to a level consistent with normal operation of the machine. An example embodiment of the control circuitry is able to deal with such circumstances by providing that a suspect condition must exist for a sufficient period of time before an abnormal condition at the machine is indicated. Of course this approach is example.

In circumstances where in step 380 the difference value is at least as great as the threshold value, it is determined in step 382 that the countdown timer has already been started. In response to this condition a step 390 is carried out. In step 390 the control circuitry is operative to determine if the time period which corresponds to an abnormal condition has been reached. If not, the sensing process continues. However, if the difference value has been at least as great as the threshold value for the set time period as determined in step 390, the control circuitry is operative to set an alarm condition event. This is represented in a step 392. In an example embodiment step 392 also includes the control circuitry operating to cause the machine to take at least one action. The at least one action may include for example, causing the at least one controller in the machine to take steps to determine if an improper device has been attached to the machine. Alternatively and/or in addition the control circuitry may operate to generate one or more signals which cause the banking machine to provide at least one output to indicate an abnormal condition. This at least one output may include for example, taking steps to make the machine inoperative or provide one or more outputs to inform users of the presence of a possible fraud device. Alternatively or in addition the at least one output may include the machine sending a message to another location or to an operator such as a bank or to a servicer entity that there is a problem with the machine. Of course these approaches are example.

In operation of the example control circuitry, even after an abnormal condition has been indicated, the control circuitry continues to operate to evaluate the radiation levels reaching the radiation sensing device. This is represented by a step 394. Thereafter the control circuitry is operative to determine a value corresponding to the level of radiation sensed while the LED is operating. This is represented in a step 396.

In an example embodiment the control circuitry continues to operate to compare the data corresponding to the ambient values and the values while the emitter operates to determine if the data corresponding to the reflected value is at least as great as the ambient value. This is indicated in a step 398. A difference value is then calculated in a step 400 through subtraction of the data corresponding to the ambient value from the data corresponding to the sensed value when the LED is operating. Thereafter the difference value is compared to the threshold value to determine if the difference value is at least as great as the threshold. This is represented in a step 402.

In an example embodiment the control circuitry is operative to provide at least one output to indicate that the abnormal condition which was previously determined has been cleared responsive to a negative determination in step 402. This is represented in a step 404. Of course in some example embodiments at least one controller may operate to continue to send messages and provide outputs to indicate the probable abnormal condition. Likewise in still other example embodiments, the at least one controller may operate responsive to other inputs or tests that it has carried out, to determine that an abnormal condition does not exist. Thereafter the at least one controller may operate in accordance with its programming to take steps to inform a remote servicer or other entity that there is not an abnormal condition at the machine. The remote servicer may check the machine remotely through messages that cause the machine to carry out additional tests for the presence of fraudulent devices and/or may view images from cameras adjacent to the machine. In still other example embodiments other steps or actions may be taken to determine and/or clear the presence of unauthorized devices. Of course these approaches are example.

Figure 21:
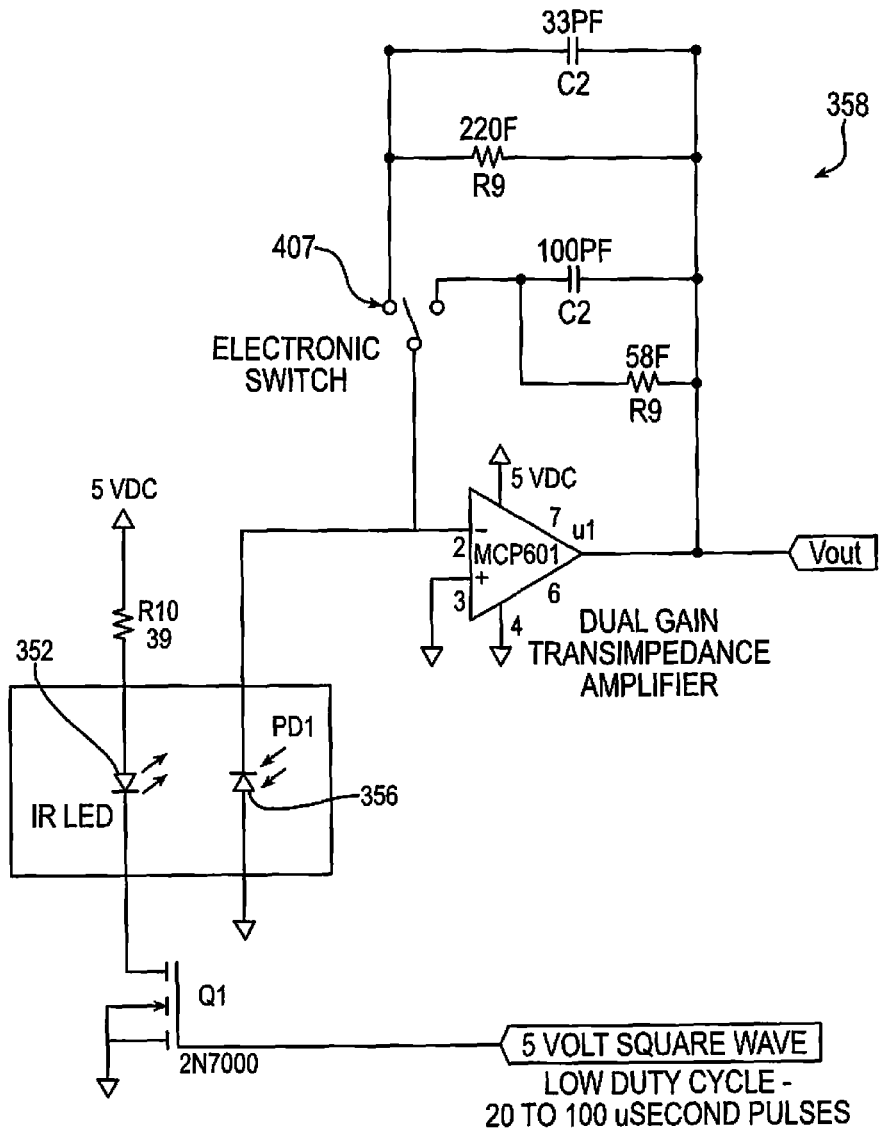
FIG. 21 is a schematic of example gain circuitry used in connection with an example radiation sensing device.

FIG. 21 shows an example form of the control circuitry 358. In an example embodiment the LED 352 is driven by a square wave signal responsive to the controller 362. As previously discussed, in an example embodiment the radiation output device is operative to provide regular periodic intermittent pulses. These pulses are determined through the programming of the controller and may be of various durations. However, in an example embodiment the pulses are set at a fixed duration. A suitable length of the duration for this particular embodiment has been found to be in a range of about 20 to 100 milliseconds.

In an example embodiment a dual gain approach is used to provide greater sensitivity during times when the ambient radiation levels are relatively low. This may include for example operation of the automated banking machine in indoor or nighttime environments. The gain circuitry of example embodiments includes a selectable dual gain transimpedance amplifier schematically indicated 406. In an example embodiment, the gain which corresponds to the amount of amplification of the signal from the radiation sensing device is determined by selectively switching one of two possible gain impedances with the transimpedance amplifier feedback circuit. An electronic switch 407 is selectively operative responsive to the controller 362 to cause the dual gain transimpedance amplifier to provide higher gain and greater amplification of the signals from the photo diode responsive to the photo diode sensing ambient light levels at or below a particular threshold. Similarly responsive to the level of ambient light being determined as above the threshold the switch 407 is operated responsive to the controller to cause the lower gain for the photo diode signals to be provided.

This example approach provides appropriate amplification based on the level of currently sensed ambient radiation and helps to assure that the presence of unauthorized devices may be more readily detected in lower ambient light level conditions. It should be understood however that the approach shown as example. For example in other embodiments, other types of gain circuitry may be used such as those that provide a plurality of levels of gain responsive to ambient light and/or other parameters that are sensed. These may include for example, several different levels of amplification which correspond to particular conditions at the machine. Alternatively or in addition, other sensors may be used for purposes of determining radiation levels in other areas of the machine. Such signals from other sensors may be used by one or more controllers in the machine to make further evaluations as to possible abnormal conditions. Of course these approaches are example and in other embodiments other approaches may be used.

Figure 23:
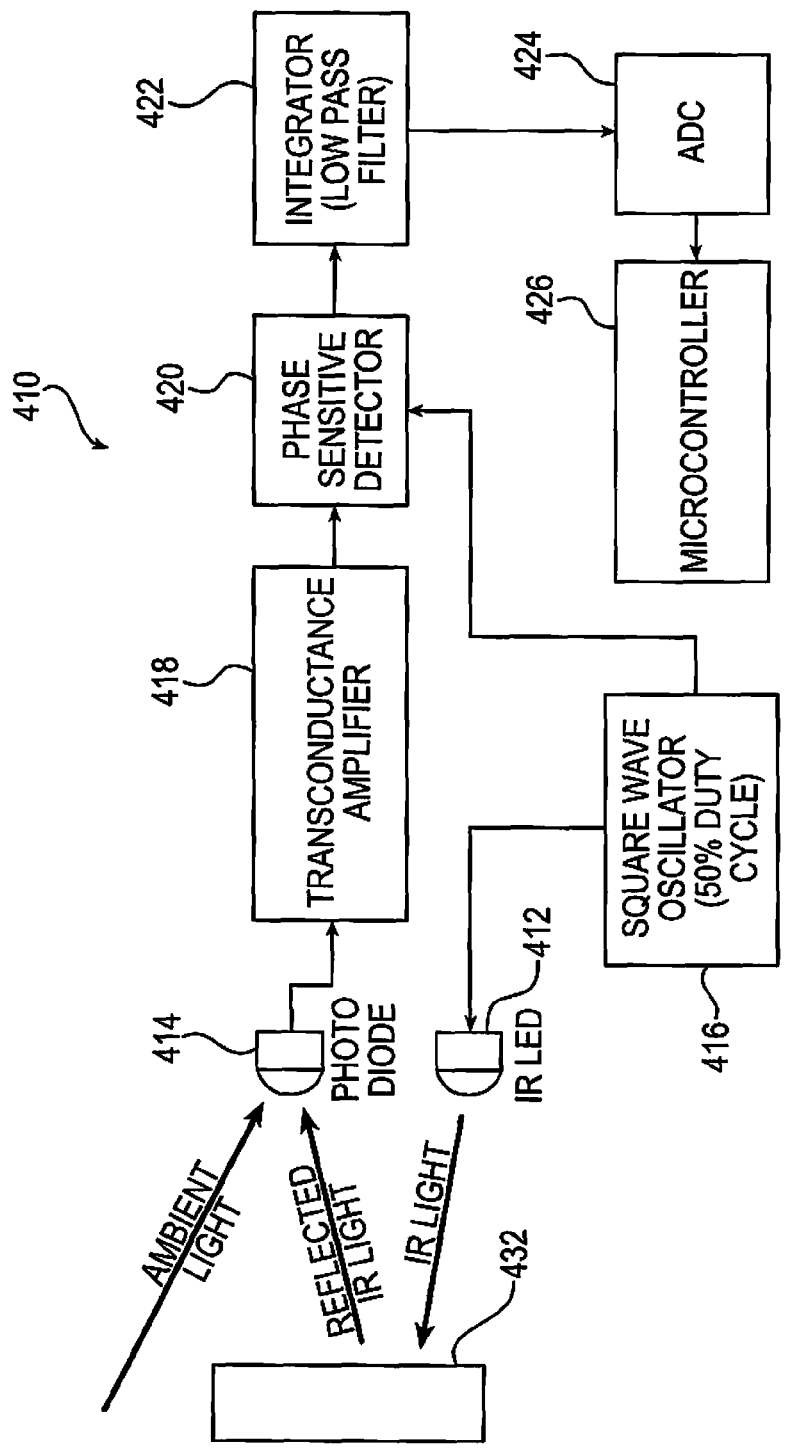
FIG. 23 is a schematic view of an alternative example apparatus for detecting the presence of an unauthorized device in connection with a machine.

FIG. 23 shows an alternative form of control circuitry generally indicated 410 which may be used in alternative embodiments of an automated banking machine which detects an unauthorized device at a transaction location on the machine. In an example embodiment the circuitry may be part of the circuitry which is operative to control operation of an automated banking machines of the types previously described. Of course it should be understood that aspects of an example embodiment may be used in other devices as well.

The example arrangement includes at least one radiation output device which includes an infrared LED 412. The arrangement further includes at least one radiation detecting device which in an example embodiment includes a photo diode 414. The photo diode 414 is operative to sense infrared radiation of the type output by LED 412. As represented schematically in FIG. 23 an example embodiment includes a driver circuitry that is operative to cause the LED 412 to output radiation. The driver circuitry of an example embodiment is a square wave oscillator 416. The square wave oscillator causes the LED to output radiation periodically and on a fifty percent duty cycle. In an example arrangement the LED is driven by a square wave signal and operates at a frequency of 10 KHz. Of course this approach is example and in other embodiments other approaches may be used.

In an example embodiment the photo diode is operative to output at least one signal corresponding to the magnitude of radiation sensed, to amplifier circuitry schematically indicated 418. The amplifier circuitry of an example embodiment amplifies the signals from the photo diode, and the level of amplification determines sensitivity of the controller circuitry.

The example amplifier 418 is operative to output one or more signals corresponding to radiation sensed, to phase sensitive detector circuitry schematically indicated 420. The phase sensitive detector circuitry is synchronized with a square wave oscillator 416. Circuitry 420 operates in an example embodiment as a full wave rectifier that is sensitive to phase alignment of the input signal with the reference square wave that drives LED 412. As a result the circuitry 420 is operative to produce signals that correspond to the magnitude of radiation sensed during the time period that the LED is operating to output radiation. In addition, in an example embodiment circuitry 420 is operative to attenuate the signals output therefrom in accordance with radiation that is sensed directly from the LED by the photo diode. This aspect is later discussed and enables an example embodiment to produce sensed signals for each cycle that corresponds to radiation reflected from a possible unauthorized sensing device and to minimize the effects of possible direct sensing of radiation output from the LED. Of course these approaches are example.

The sensor signals that are output from circuitry 420 are passed to circuitry 422. In an example embodiment circuitry 422 includes an integrator/low pass filter. The integrator/low pass filter is operative to integrate sensed values corresponding to each of the sensor signals output from circuitry 420. Example circuitry 422 integrates the demodulated signals over a defined time period. The defined time period in an example embodiment comprises a plurality of cycles of the LED. The number of cycles over which the values are integrated may be selectively set for the particular circuitry to suit the particular machine arrangement and/or transaction location in which the sensing is conducted.

Circuitry 422 provides the values corresponding to the integrated output to an analog to digital converter schematically indicated 424. The analog to digital converter provides digital outputs to at least one processor 426. In an example embodiment the processor is operative to compare the integrated value of the sensed values over a plurality of cycles, to one or more thresholds that are stored in memory associated with the processor. In situations where the at last one value received from the analog to digital converter 424 is in excess of a threshold, the at least one processor 426 operates in accordance with its programming to provide at least one output. This at least one output causes the controller or other devices in the automated banking machine to take at least one action. The at least one action may include for example, providing an alarm signal, notifying remote locations or taking other steps of the types previously described.

Figure 24:
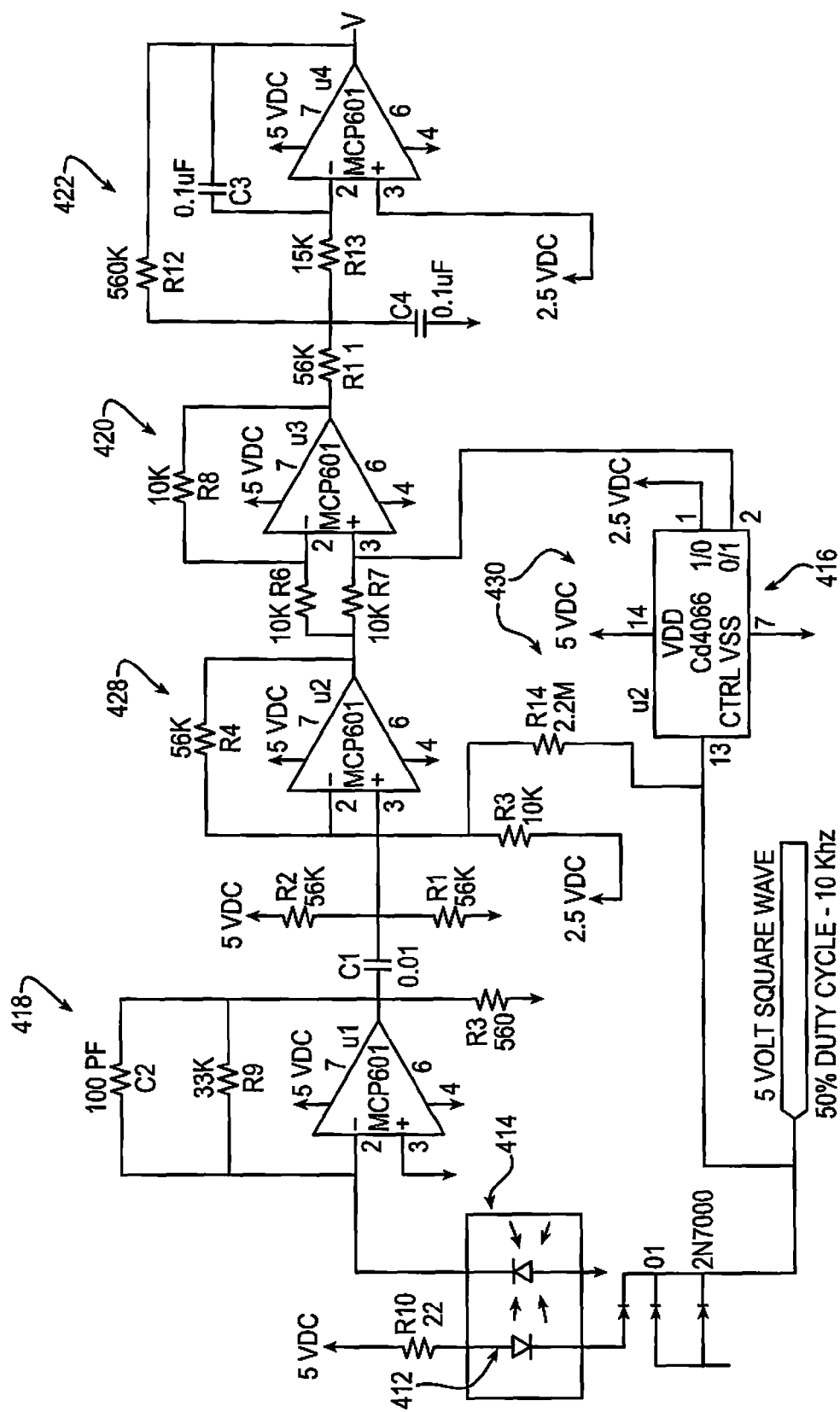
FIG. 24 is a schematic of example circuitry used in connection with the example apparatus of FIG. 23.

FIG. 24 shows example circuitry which corresponds to the schematic shown in FIG. 23. In this example embodiment the LED 412 operates to emit radiation intermittently during a desired period of operation in accordance with a fifty percent duty cycle. The transconductance amplifier 418 operates to amplify the signals from photo diode 414. This circuitry further includes a first stage amplifier 428 that is used to bias the signal. The first stage amplifier also has its input signal conditioned so as to subtract out the effect of radiation that is sensed directly from the LED by the further diode 414. This is accomplished in the example circuitry through the use of a connection through the resistor designated 430. The circuitry helps to assure that the total output voltage swing is available for the signal output. The value of resistor 430 is selected to remove that portion of the "cross talk" that occurs between the particular configuration of the LED and photo diode. In an example embodiment this avoids the need for light pipes or other devices to reduce the incidence of radiation directly from the LED reaching the photo diode. Of course this approach is example and in other embodiments other approaches may be used.

In an example embodiment the at least one controller in the automated banking machine operates to cause the machine to carry out transactions. A transaction location such as the card reader slot, to which the LED and photo diode are adjacent, is utilized in the operation of the machine to carry out a transaction function. As in the case of the other described embodiments, placement of an unauthorized device schematically indicated 432 in FIG. 23 causes the level of radiation output from the LED and reflected to the photo diode 414 to increase. This is a function of the particular configuration of the transaction location at which the system is used. The control circuitry is operative in this example embodiment to produce signals corresponding to the sensed radiation only during the time periods that the LED operates to output radiation. The phase sensitive detector circuitry 420 operates to output a plurality of sensor signals, each corresponding to a particular cycle in which the LED outputs radiation. The values corresponding to sensor signals is integrated by the circuitry 422 over a set comprising a plurality of cycles. This integration produces a value that is then output to the analog to digital converter 424. The comparison of this value is then made through operation of the processor 426 to at least one threshold. When the value is below the threshold the amount of reflected radiation is considered to be indicative that no abnormal condition exists because no unusual amount of radiation is being reflected to the photo diode.

In circumstances where the amount of reflected radiation increases, the at least one value produced by the circuitry will be in excess of a threshold. The processor 426 operates in accordance with its programmed instructions to output at least one signal. The at least one signal then causes at least one action by the ATM of the types previously discussed.

While in an example embodiment the control circuitry operates to integrate sensed values for a plurality of sets of cycles which are gathered sequentially, in other embodiments other approaches to gathering data may be used. This may include for example, integrating sensed values for a plurality of cycles in which the cycles in the sets may substantially overlap. Thus for example if the period of integration is ten cycles, each set may overlap the other set by a plurality of cycles. Indeed in some embodiments the immediately succeeding set may overlap the immediately preceding set by all but one cycle. In this way some embodiments may provide for monitoring such that an abnormal condition is more rapidly detected.

In other example embodiments provision may be made for including in a set sensed values, data corresponding to cycles that are not immediately adjacent. For example in some embodiments, sampling circuitry may be included such that values corresponding to one of each of several cycles, may be included in a set for purposes of producing at least one value. In this way the amount of data analyzed may be reduced, and in some embodiments the effects of temporary fluctuations in the amount of reflected radiation may be minimized so as to reduce the possibility of false alarms. As referred to herein however, in cases where a sampling of cycles is described as conducted for sensed values, those values that are sampled shall be considered immediately adjacent cycles even though the driving circuitry may operate to produce numerous radiation output cycles intermediate of those cycles for which radiation sensed is sampled.

Further while in an example embodiment only one radiation output device and radiation sensing device are shown, other embodiments may include a plurality of either output devices and/or input devices. Also while in an example embodiment the attenuation of sensed signals is accomplished through circuitry providing a fixed resistance, other embodiments may provide for variable resistance and more active attenuation. This may be done for example by including one or more sensors that operate to sense a degree of radiation which moves along a path directly between the one or more radiation output devices and radiation sensing devices. The outputs of such sensors may be used to provide active variable attenuation of the sensed signal. Of course other approaches may also be used.

In an example embodiment the ATM 10 is provided with enhanced diagnostic capabilities as well as the ability for servicers to more readily perform remedial and preventive maintenance on the machine. This is accomplished in an example embodiment by programming the controller and/or alternatively distributed controllers and processors associated with the transaction function devices, to sense and capture diagnostic data concerning the operation of the various transaction function devices. In an example embodiment this diagnostic data may include more than an indication of a disabling malfunction. In some embodiments and with regard to some transaction function devices, the data may include for example instances of speed, intensity, deflection, vacuum, force, friction, pressure, sound, vibration, wear, or other parameters that may be of significance for purposes of detecting conditions that may be developing with regard to the machine and the transaction function devices contained therein. The nature of the diagnostic data that may be obtained will depend on the particular transaction function devices and the capabilities thereof as well as the programming of the controllers within the machine.

The following applications and patents are incorporated herein by reference in their entirety. Provisional Application Ser. No. 60/853,098 filed Oct. 20, 2006; U.S. application Ser. No. 11/454,257 filed Jun. 16, 2006; U.S. application Ser. No. 10/832,960 filed Apr. 27, 2004; U.S. application Ser. No. 10/601,813 filed Jun. 23, 2003; Provisional Application 60/429,478 filed Nov. 26, 2002; and Provisional Application 60/560,674 filed Apr. 7, 2004.

Figure 25:
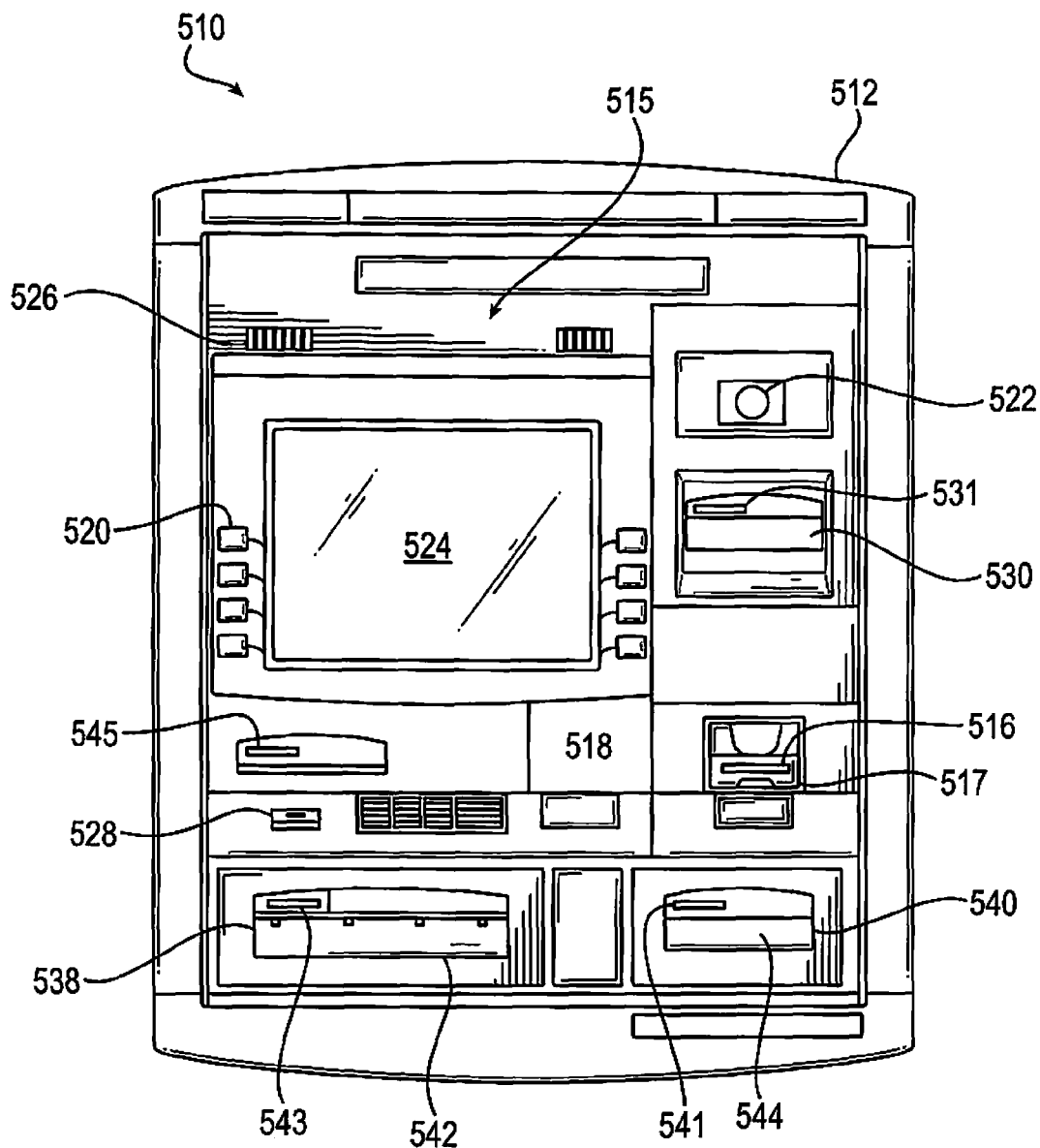
FIG. 25 is a front view of a fascia of an alternative automated banking machine.

Still example embodiments may include other or additional features. Such features of example embodiments are described in connection with an automated banking machine generally indicated 510 in FIG. 25. Machine 510 includes a fascia generally indicated as component 512. The fascia 512 is generally positioned in supporting connection with a machine's housing and/or other machine components of the type previously described. In this example embodiment, fascia 512 extends through a wall 514 or other similar fascia supporting structure. Of course this approach is example, and in other embodiments other approaches may be used.

Automated banking machine 510 includes a card reader positioned within the machine that is associated with a card reader slot 516 which extends through the fascia. A card reader bezel 517 includes and is in generally surrounding relation of the card reader slot. The card reader can also have an appropriate indicator and sensors adjacent to the card reader slot such as those that have been previously discussed. The machine includes a keypad 518 of the type previously described through which a user may provide manual inputs. Further, an example embodiment includes a plurality of function keys 520 which are positioned adjacent to a display 524. Function keys 520 may be actuated to provide inputs corresponding to selections that are output on the display.

An example embodiment further includes a camera 522 which may be used to capture images of users of the machine. Camera 522 may also or alternatively serve as a biometric input device for purposes of recognizing users via appearance features such as through facial recognition in the manner discussed in the incorporated disclosure.

An area above the fascia generally indicated 515 includes speaker openings 526. The speaker openings enable audible outputs from speakers included in the machine to be output to users. A headphone jack 528 enables users to connect headphones or other audible output devices to the machine. This enables blind users or persons who may have disabilities that require operation of the machine through voice guidance, to receive audible outputs concerning operation of the machine.

The example machine further includes a depository such as a check acceptor. The check acceptor has an associated check accepting opening 530 in the fascia. A light indicator 531 is positioned adjacent to the opening 530 so as to indicate the status of the check acceptor. Thus, for example, in example embodiments when a user indicates that they wish to deposit a check into the machine, the light indicator 531 may operate to provide a visible indication of the location of the check reader slot. Alternatively or in addition, the light indicator may provide a green indicator to indicate in such circumstances that the check acceptor is operational. Alternatively in some embodiments, the indicator may provide a yellow or red indication to indicate other conditions such as that the check acceptor is operating and cannot process further checks, or that the check acceptor has malfunctioned. Of course these approaches are example and in other embodiments, other approaches may be used.

In an example embodiment the machine includes a cash dispenser which operates to dispense cash to users through a cash outlet opening 542. The cash outlet opening includes a gate 538 which operates to open when cash is to be dispensed therefrom. A visual indicator 543 is positioned adjacent to the cash outlet opening. The visual indicator may operate to provide an indication of when cash is being dispensed or has been presented to a user. For example, the visual indicator may operate to indicate to a machine user the location at which they may take the cash dispensed from the machine. Alternatively or in addition, the indicator 543 may operate to indicate conditions such as that the cash dispenser has malfunctioned or is not available, so as to provide an indication that the machine cannot carry out cash dispensing transactions.

In an example embodiment, the machine 510 further includes an envelope depository. The fascia includes an opening 540 through which envelopes may be accepted for deposit into the machine. Access through the opening 540 is controlled through a movable gate 544. The gate 544 is opened through operation of the machine at appropriate times in transaction sequences when a deposit envelope can be accepted. An indicator 541 is positioned adjacent to the envelope accepting opening 540. The indicator may operate in example embodiments in the manner of the other indicators so as to indicate to users when the envelope accepting depository can accept envelopes therein. Likewise the indicator may also or alternatively indicate conditions that the envelope accepting opening is inoperative or is otherwise not available.

The example fascia further includes a receipt dispensing opening 545. The receipt dispensing opening 545 is operative to deliver receipts produced by a receipt printer within the machine. The receipt dispensing opening 545 further has an indicator adjacent thereto which can be operated to indicate that a receipt has been presented and can guide the user to the opening so they may take the receipt. Like the other indicators, the indicator adjacent to the receipt opening may also operate to indicate that the receipt printer is not available due to a malfunction or other conditions.

It should be appreciated that in some example embodiments, the indicators may operate in a flashing manner to indicate various conditions. The indicators may provide various color outputs so as to indicate various conditions. This may include, for example, a yellow indication when a function is being performed by the corresponding device; a green indication when the device is ready to operate; and a red indication when the device has malfunctioned or is unavailable. Of course alternative approaches may be used. It should be appreciated that the programming associated with the at least one processor included in the machine may be operative to control the indicators so as to provide the programmed indications to machine users.

In an example embodiment, the machine fascia 512 includes several bezels. An example bezel is a removable component of an outer fascia portion which covers at least part of the user side (front) of a function device of an automated banking machine. A fascia bezel can have an opening that leads to its associated function device. An example fascia can have plurality of distinct bezels, including a card reader bezel, display device bezel, cash outlet bezel, deposit input bezel, receipt bezel, keypad bezel, etc. The card reader bezel 517 has an opening (i.e., card slot 516) that leads to the card reader. A display device bezel can have an opening (which may have a transparent cover) that allows a machine user to see the user display screen 524. The cash outlet bezel has the cash outlet opening 542 through which cash can be dispensed by the machine. A deposit input bezel can have a slot (e.g., check accepting opening 530; envelope accepting opening 540) through which a deposit (e.g., checks, currency bills, envelopes, etc.) can be received by the machine (or an acceptor device thereof). The receipt bezel has the receipt dispensing opening 545 that leads from a transaction receipt printer. A keypad bezel can have an opening through which a machine user can provide manual inputs to the keypad 518. As can be seen, an individual bezel can be a part of a fascia's bodywork that surrounds (either physical or visual) user access to an individual function device of the machine.

An example machine includes a user data reader and a bezel having a user data receiving area. The user data reader is operable to read user data provided to the user data receiving area. In an example, a card reader (i.e., a user data reader) is operable to read card data inserted through a bezel's card slot (i.e., a user data receiving area). In a further example, a wireless reader (i.e., a user data reader) is operable to wirelessly read user data that is placed adjacent to a designated reading area (i.e., a user data receiving area) of a bezel. An example machine includes at least one wireless reader that can read a smart card chip data, RFID data, NFC data, magnetic data, IR data, bar code data, electronic ink data, and/or radioactive data, etc.

A machine fascia bezel may function as intermediate structure (or a component) between the machine user and the user function device. The machine bezel may also be shaped to enhance user utilization of the function device. For example, a card reader bezel can have a tapered (or narrowing) slot that guides a user's card toward a correct orientation for proper entry into the card reader. A card accepting area (e.g., a slot) of a card reader may be aligned with a card reader bezel's slot. The (parallel) alignment of two slots can encompass several different slot relationship arrangements, including having: (1) a card reader's slot extending at least partly into a bezel's slot; (2) a bezel's slot extending at least partly into a card reader's slot; or (3) the two slots being set end-to-end (in either abutting or non-abutting relation). When a first slot extends into a second slot, then at least part of the second slot surrounds at least part of the first slot. Of course each bezel slot is formed by bezel structure, and each card reader slot is formed by card reader structure (or other structure operatively associated therewith).

The various types of bezels may be supported by the machine fascia, by the housing, by its associated function (or transaction) device, by a combination thereof, or by other structure associated with the machine. A bezel may also function to retain or provide some support to its associated function device. Other types of bezels are known in other fields. For example, with regard to a typical television, a display bezel can be the front surround of the TV screen. With regard to an automotive vehicle, a particular bezel can be the bodywork structure that surrounds a particular light.

As discussed in more detail later, an automated banking machine is configured to use exchangeable (or interchangeable) bezels for a specific function device. For example, each of a plurality of differently-shaped replaceable card reader bezels can be individually used (in succession or randomly) as the current card reader bezel of the machine. The machine is configured for easy exchange of the card reader bezels. Frequent replacement of the current card reader bezel with another card reader bezel that has a differently-shaped outer surface leading to the bezel's card slot can act to deter attachment of a fraudulent card reader. That is, the fixed shape of a particular fraudulent card reader may not be clandestinely usable (or structurally attachable) with each of the differently-shaped card reader bezels.

Figure 27:
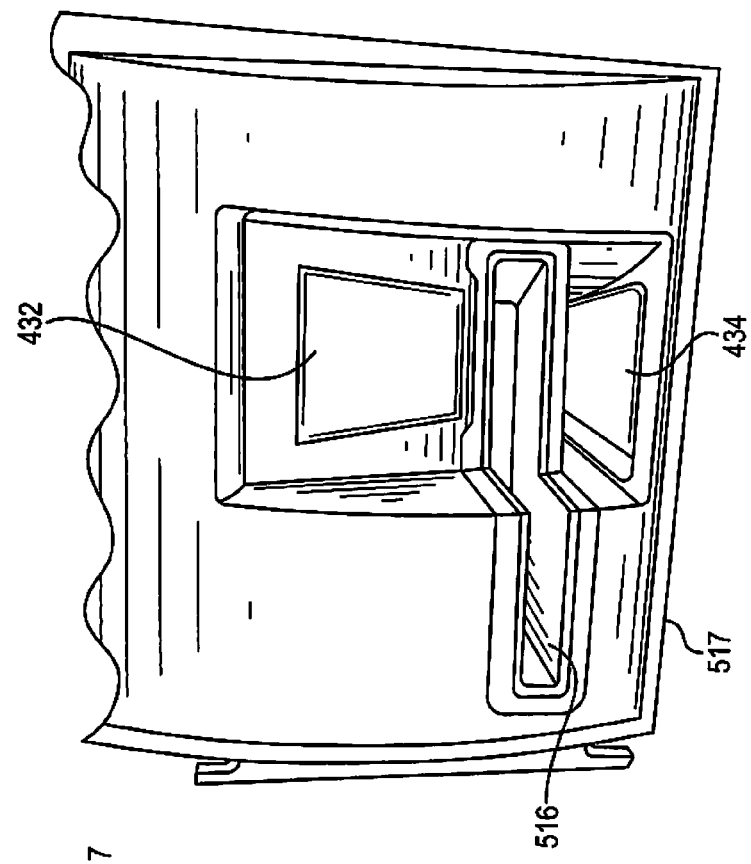
FIG. 27 is an isometric view showing the bezel surrounding the card reader slot.
Figure 26:
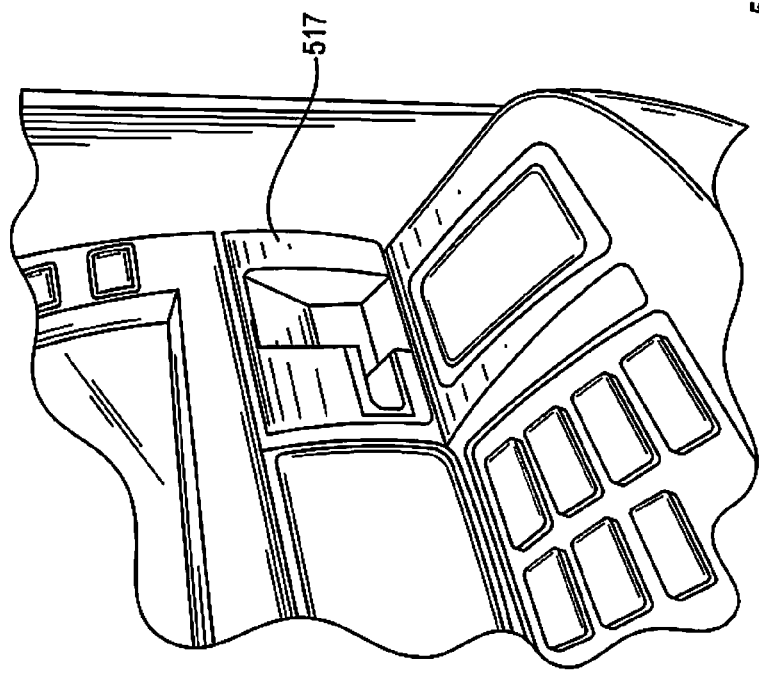
FIG. 26 is a partial isometric view of a fascia of an automated banking machine showing the area of the card reader slot.
Figure 28:
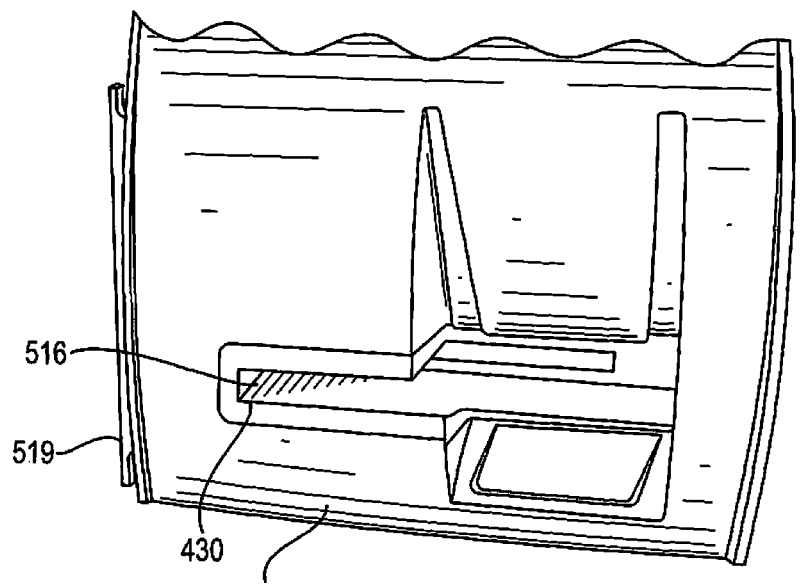
FIG. 28 is an isometric view of a card reader bezel similar to FIG. 26.

In an example embodiment, the machine fascia 512 includes a bezel 517 as shown in FIGS. 26-28. FIG. 26 shows an isometric view including the card reader bezel 517 of an example embodiment. The card reader bezel 517 includes the card reader slot 516. The card reader slot 516 has in surrounding relation thereof a transparent yoke or donut 430, as shown in FIG. 28. The donut portion 430 (of the card reader bezel) surrounds the bezel's card reader slot 516. The donut of an example embodiment is configured to be positioned in adjacent relation with visible and infrared sensors and emitters of the type previously discussed, so that the presence of unauthorized devices adjacent thereto can be detected. In an example embodiment, the translucent or transparent nature of the donut 430 operates to enable radiation to pass therethrough from the emitters and sensors that are positioned within the machine behind the donut so that unauthorized devices and other conditions can be detected. FIG. 28 also shows a fastening member 519 that can be securely fastened to bezel supporting structure of the machine.

Figure 28A:
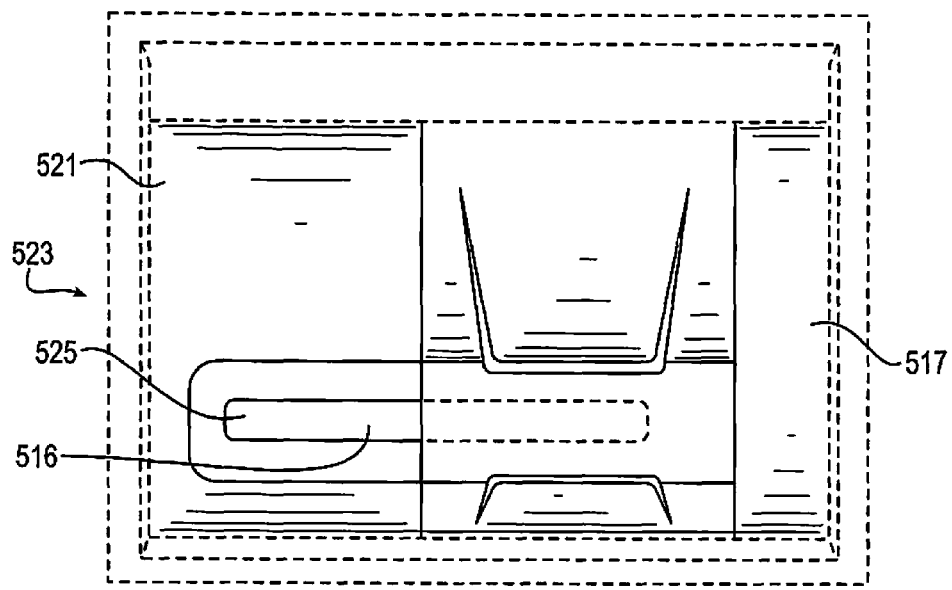
FIGS. 28A, 28B, and 28C show different views of a bezel that is similar to the bezel shown in FIG. 28.
Figure 28B:
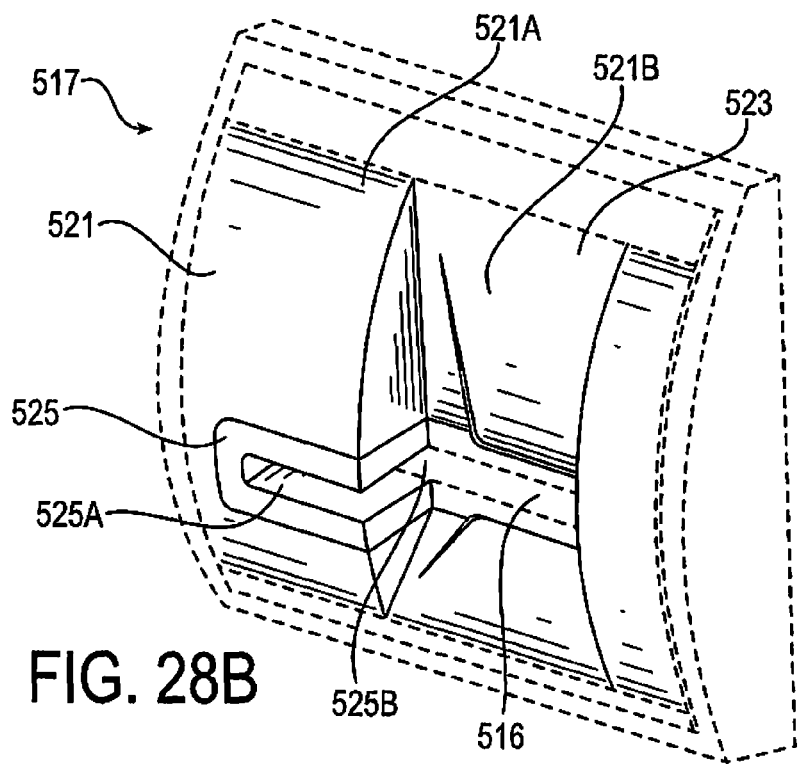
Figure 28C:
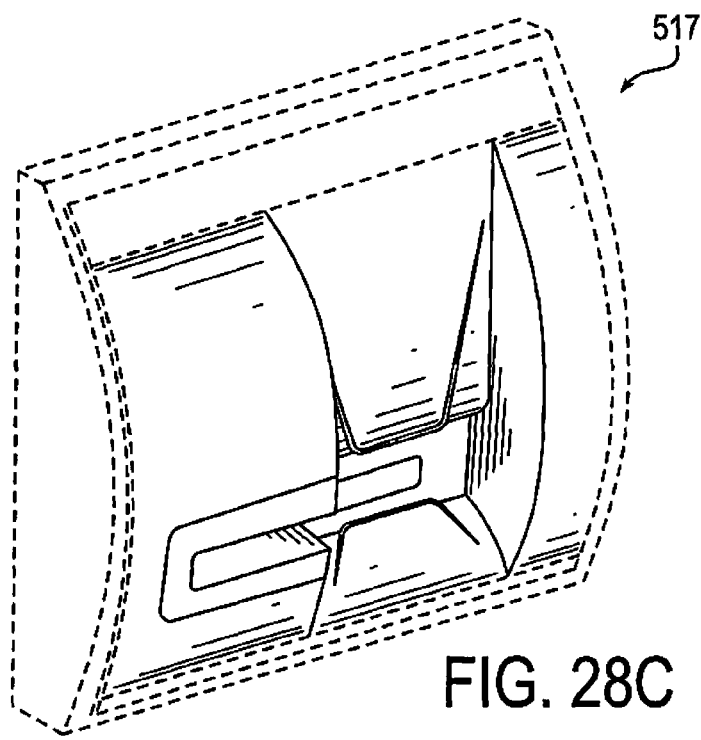

FIGS. 28A, 28B, and 28C show different (angled) views of a card slot bezel that is similar to the bezel shown in FIG. 28, but without the fastening member. Thus, for ease of understanding, the bezel in FIGS. 28A, 28B, and 28C has also been labeled with reference numeral 517. As can be seen, the bezel in FIGS. 28A, 28B, and 28C has an exterior surface 521. The exterior surface 521 comprises a contoured (shaped) profile 523. The profile 523 can include protrusions, curves, angles, indents, slots, and topographical (physical) features of various extensions, lengths, and heights, etc. The contoured profile surrounds the entrance 525 to the card slot 516 of the bezel 517. That is, the card slot entrance 525 extends through a outer surface area that is topographically non uniform (e.g., not horizontally level, irregular surface). The surface is non uniform (in physical form) in the outward direction (e.g., direction away from the machine). That is, respective different portions 521A, 521B of the outer surface vary in the outward/inward length (or distance) they extend.

The card slot entrance 525 also has at least one portion (or section) 525A that is further outward/inward than at least one other portion 525B of the card slot entrance. The card slot entrance 525 can be part of the bezel's exterior surface 521. At least a portion of the card slot entrance 525 can be tangible to the machine user. As can be seen, outer surface portions of the bezel profile that are adjacent to (or bound or surround) the card slot entrance 525 can vary in their outwardly extending distance.

In an example embodiment, a bezel can be of an integral, one-piece, unitary structure. An example bezel may comprise plastic, polymer, rubber, and/or fiberglass material. The bezel can also be made of the same material as the remainder of the machine fascia. The bezel can have an exterior color or pattern that matches the rest of the fascia front.

As discussed, the example bezel 517 is configured so that its card reader slot (or entrance thereto) does not present a generally uniform horizontal outer surface. Rather as shown, the bezel outer surface includes at least two generally horizontally offset portions connected by an intermediate section. This outer surface configuration makes it more difficult to attach a skimming device to the exterior of the card slot bezel. This is because the irregular outer surface would require a skimmer device to have a similar corresponding complex surface so as to attach thereto in a way that would be unnoticed.

In some example embodiments, the exterior surface of the bezel can include an anti-stick coating. This can include, for example, a paint or powder coating that includes a silicone material which makes it difficult to attach an unauthorized device thereto via an adhesive or other similar sticky materials. The coating makes it difficult for criminals to attach a skimming device to the bezel. In another embodiment, a bezel's outer surface can comprise spun fiberglass strands that are coated with tetrafluoroethylene (TFE) fluorocarbon polymer or a fluorinated ethylene-propylene (FEP) resin. For example, the anti-stick coating can comprise Teflon®.

Further in example embodiments, the bezel 517 can include multiple colored elements such as elements 432 and 434 shown in FIG. 27. Elements 432 and 434 can differ in color from the surrounding bezel. Such elements and the contrasting colors thereof may make it difficult for a skimmer to be attached in a way that does not cause it to be noticeable because of the color contrast. Further, such elements can include logos, designs, or other indicia that further make it difficult for any skimming device to be attached in the area thereof without being noticed. In addition, the inclusion of such indicia provide a visible indicator to an exterior camera or other detecting device which enables a determination to be made that a bezel has been subject to modification via analysis of captured images of the fascia of the machine. The transparency of the yoke 430 also makes it easier to notice a (non-transparent) fraudulent device attached or adjacent thereto. Of course these approaches are example, and in other embodiments other approaches can be used.

In some example embodiments, the fascia of the machine can incorporate different card surrounding bezel configuration designs. Such card surrounding bezel designs can be made readily manually changeable or interchangeable by authorized service persons who have authorization to remove/replace the bezel. In some bezel support arrangements, accessing the bezel may only be feasible through an interior area of the machine.

Figure 29:
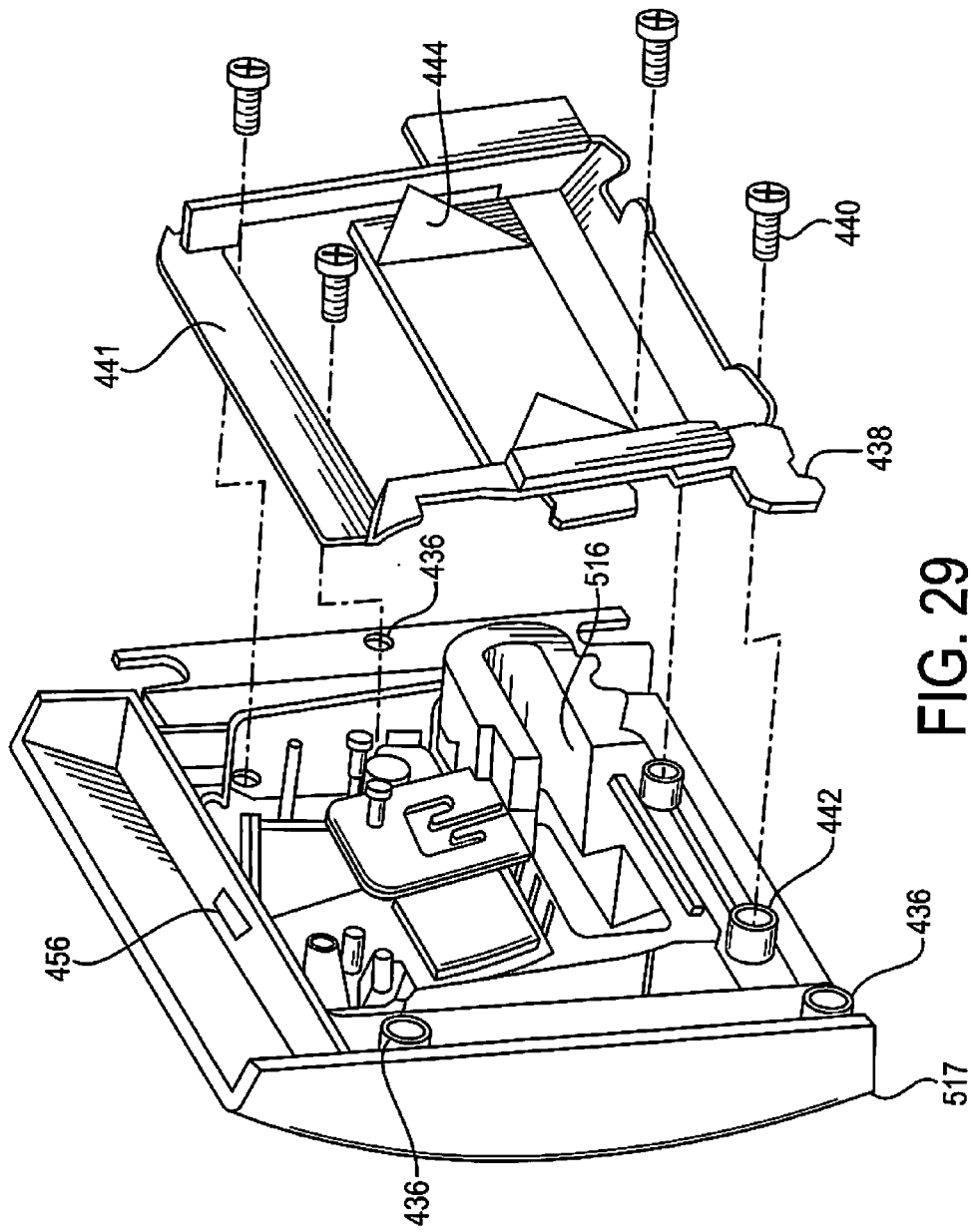
FIG. 29 is an exploded rear view of the card reader bezel assembly.

As shown in FIG. 29, an example bezel 517 includes fastener accepting openings 436, 442 which are operatively configured to accept fasteners that extend through internal bezel-supporting structure of the machine. For example, the fastener accepting openings 442 are configured to receive removable fasteners 440 (e.g., bolts, screws, pins, etc.) that extend through corresponding openings 441 in a card reader holder assembly 438 of the machine. The fasteners 440 allow the bezel 517 to be generally readily engaged and disengaged from the card reader holder assembly 438 (and the machine and the fascia). The other fastener accepting openings 436 are configured to receive other fasteners that operatively connect the bezel to other bezel supporting structure, such as a card reader, a fascia portion, or other machine structure. As can be seen, FIG. 29 shows at least one fastener 440 releasibly holding a card slot bezel 517 in fixed operatively supported engagement with a bezel support structure 438 of an automated banking machine. Furthermore, the at least one fastener 440 is manually movable to release the respective bezel 517 from fixed operatively supported engagement with the bezel support structure 438.

The bezel fastener arrangements enable authorized service personnel to relatively readily remove a bezel and replace it with another bezel that has a different configuration yet has similarly arranged fastener accepting openings. That is, the machine can be used with a plurality of differently configured card reader bezels, where each bezel would share the same bezel support arrangement of the machine. The approach allows a single automated banking machine to separately use differently configured card reader bezels without requiring any changes to the machine's bezel-support structure. Different bezels can be attached in the same manner to the same machine. In an example embodiment, an automated transaction machine can individually use a plurality of card reader bezels, with each bezel having an exterior surface of a different (unique) contoured profile, where the contoured profile surrounds the bezel's card slot. The differing contoured profiles are configured to reduce the probability of having a same type of fraudulent card reader be attachable adjacent to different card slots of differently configured card reader bezels. The discussed approaches at a common supporting arrangement for plural bezels are example, and in other embodiments other bezel support arrangements can be used.

In an example embodiment a card reader holder and gate assembly (generally indicated 438) is releasibly attachable to the card reader bezel 517 via the fasteners 440 which engage the fastener openings 442 in the bezel. Gate assembly 438 includes a movable gate 444 which is operative to block the slot 516 at the back of the bezel 517 when the card reader mechanism within the machine is moved relatively away from the back of the bezel for servicing. The blocking by the gate 444 can prevent user cards from being inserted through the bezel slot 516 during absence of the card reader from the machine. Likewise, the gate 444 is operative to move and open as the card reader assembly is operatively positioned adjacent to the back (rear side) of the bezel 517. Of course these approaches are example and in other embodiments other approaches can be used.

Figure 40:
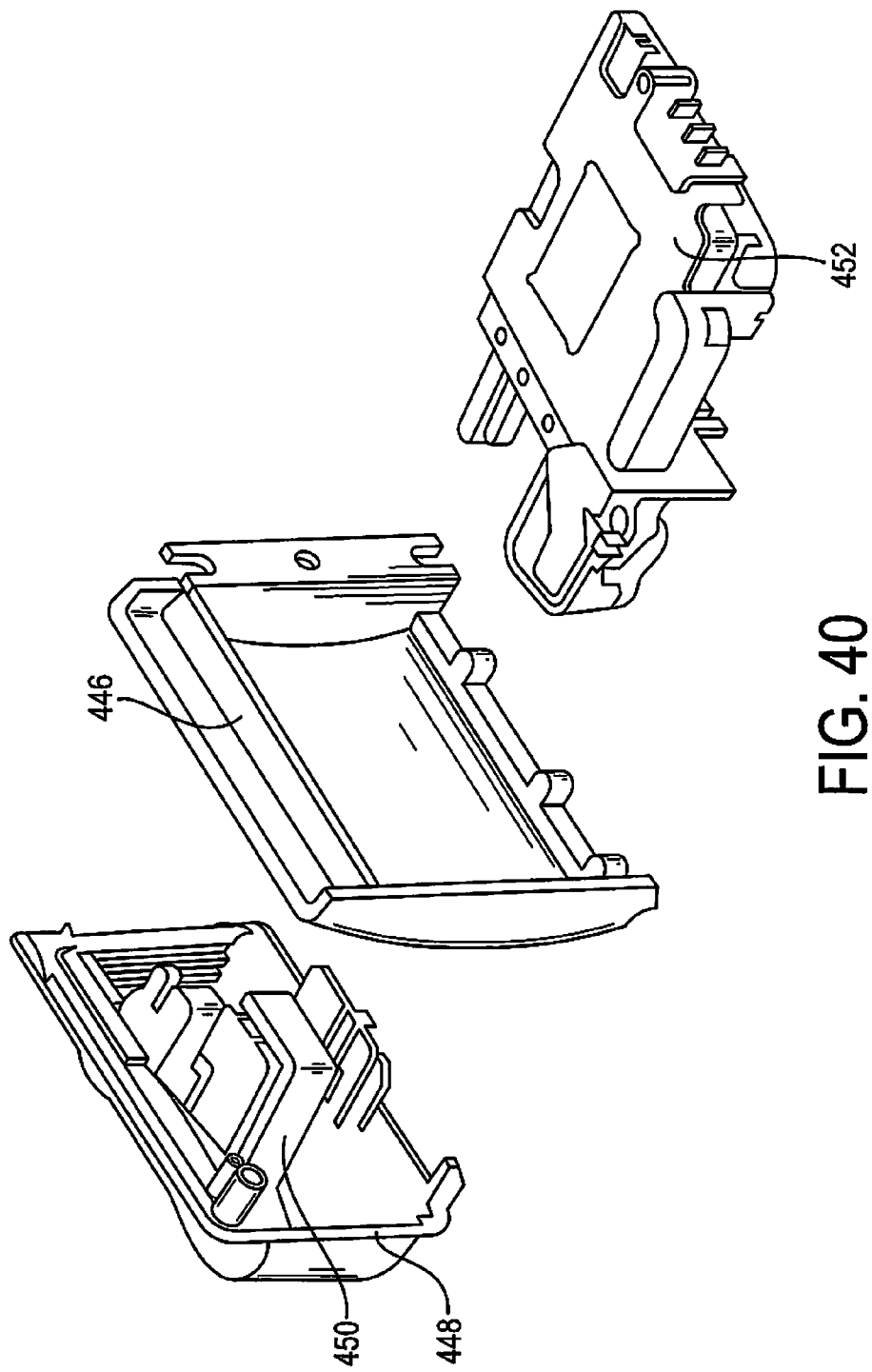
FIG. 40 is an exploded view of an alternative card reader bezel structure and a card

FIG. 40 shows an alternative bezel fastening arrangement. A bezel includes a bezel housing 446 and a bezel insert 448. The bezel insert 448 includes a card reader slot 450 which enables a card to pass therethrough to a card reader 452. The bezel housing 446 is releasibly engageable with bezel-supporting structure in the machine. The bezel insert 448 is releasibly engageable with the bezel housing 446. Thus, both the bezel housing 446 and the bezel insert 448 can be supported by the bezel-supporting structure. Some arrangements allow the bezel insert to be releasibly engaged with the bezel housing before they are attached to the machine. In some embodiments a plurality of differently configured (and interchangeable) bezel inserts can be fittingly used with the same bezel housing. Thus, in some arrangements the bezel housing can remain attached in the machine while the bezel insert is being replaced. That is, only the bezel insert would need to be replaced. In other arrangements the bezel housing would first need to be disconnected (unattached, unfastened) from the machine before the bezel insert could be disconnected from the bezel housing. In other embodiments a bezel housing and a corresponding bezel insert can only be (uniquely) fastened to each other. Thus, replacement of one would likewise require replacement of the other.

Also, in some bezel arrangements both a bezel housing and a bezel insert can be manually touchable by (tangible to) the machine user. This results in both bezel components contributing to the bezel's outer surface configuration. Such a dual component surface configuration may cause additional interference against successful attachment of a fraudulent reading device.

Suitable fasteners (e.g., like fasteners 440) and other features can be used to hold the bezel insert 448 in releasibly engaged relation with the bezel housing 446. Some bezel arrangements may require that the fasteners be manually released only from the interior of the machine, which interior accessing may be performed by authorized service personnel.

Fasteners are usable to fasten an interior support and a bezel or a bezel housing. Fasteners are also usable to a fasten a bezel insert and a bezel housing. Such fasteners that are usable in bezel fastening can include bolts, screws, pins, hooks, recesses, male/female connections, flexible parts, telescopic components, snap fit pieces, etc. Also, a bezel support structure may include at least one fastener integral therewith. For example, the integral fastener can comprise a movable screw or a snap fit connector. The snap fit connector can be removably received in a connection slot of a bezel. Alternatively, a bezel can have snap fit connectors that are removably fitted into connection slots of a bezel support.

In another arrangement for securing a bezel, a key actuating type of lock can be used to fasten the bezel to a bezel support structure (e.g., machine housing). The key lock can be arranged so that it is accessible to a mechanical key that is used outside of the machine. Thus, the removable bezel can be locked/unlocked to the housing by a service person located outside of the machine. In still other arrangements, an exterior located key lock can be used in combination with a bezel fastener connection that is located inside the machine housing. As can be appreciated, various approaches can be taken to provide different configurations of bezel fastening so as to minimize the risk of unauthorized removal of a bezel.

Different bezels can respectively have differently configured (or shaped) exterior (outer) faces. That is, the bezels' outer surfaces, which are touchable by customers, can have a shape vary with regard to dimensions in height, length, and width. Different bezel shapes can respectively have a different number and/or different positions of indents, recesses, corners, curves, points, lengths, patterns, molds, forms, trims, contours, outlines, profiles, delineations, characteristics, frames, cutouts, peaks/valleys, physiques, rises, slopes, gradients, projections, angles, materials, colors, etc. Shapes other than donuts can also be used, including C-shapes, U shapes, L-shapes, I-shapes, T-shapes, V-shapes, X-shapes, rectangular shapes, unique shapes, etc.

The bezel 660 of FIG. 41 additionally has an outer contour comprising four walls 682, 684, 686, 688 tapering inwardly to the card entry slot 662. The upper 682 and lower 684 walls each have three raised projections (upper projections 672, 674, 676; lower projections 692, 694, 696) that extend away from the base of their wall face. The two side walls 686, 688 each have a single trapezoidal shaped outward extending raised projection 678, 680. The rise of the projections can vary in outward height. The intentional non-uniform outer surface assists in preventing skimmer attachment to the bezel 660.

In some example embodiments, bezels including card slots of different designs can be readily changed on the same model of machine. Periodically changing bezel configurations may help to deter the installation of fraudulent reader components, such as data skimming devices. This is because criminals cannot readily develop skimming devices which can be attached without observation to a plurality of different configurations of bezels and card slots. Thus, by having different colors and contours of bezel designs, and by having machines of the same type but with different card reader bezel configurations, criminals will find it more difficult to deploy and operate card skimming devices. As can be seen, example embodiments increase the difficulty of criminals to produce a generic skimming device that can be used on an entire (bank) fleet of machines, especially when machines of the same type (model) can respectively have different bezel configurations at different times.

The different bezel configurations can also have differently sized card slots (e.g., slots of different widths). As previously discussed (e.g., with regard to U.S. Provisional Application 61/574,594 filed Aug. 5, 2011), some card slots (card input openings) can be of a larger (horizontal) width to allow a long edge (side) of a card to be inserted first into the card slot. That is, the card can be inserted sideways into the slot. The card reader can be arranged so that a read head is horizontally movable to read the magnetic stripe of the long-edge inserted card. The card reader may be horizontally mounted. In alternative card reading embodiments, a card reader may be vertically mounted to receive and read a card inserted vertically upward (or downward) into a card slot, where the card slot can be of a width configured to receive a long-edge inserted card.

FIGS. 30-39 show examples of example bezels which can be installed on automated banking machine fascias. Each of these bezels has a different exterior contour which makes it difficult to attach an unrecognizable skimming device. As can be appreciated, a sole skimming (fraudulent card reading) device would be even further difficult to use with each of the differently configured bezels. As can be appreciated, each example includes similar internal attachments mechanisms so that the bezels can be interchanged and mounted in operative engagement with an example automated banking machine fascia mounting structure. As further expressed in FIGS. 30-39, each of these example bezels can include a translucent donut of the type previously discussed that can be used for purposes of detecting the installation of an authorized card reading device. Of course it should be understood that these bezel configurations are example and in other embodiments, other configurations can be used.

Figure 30:
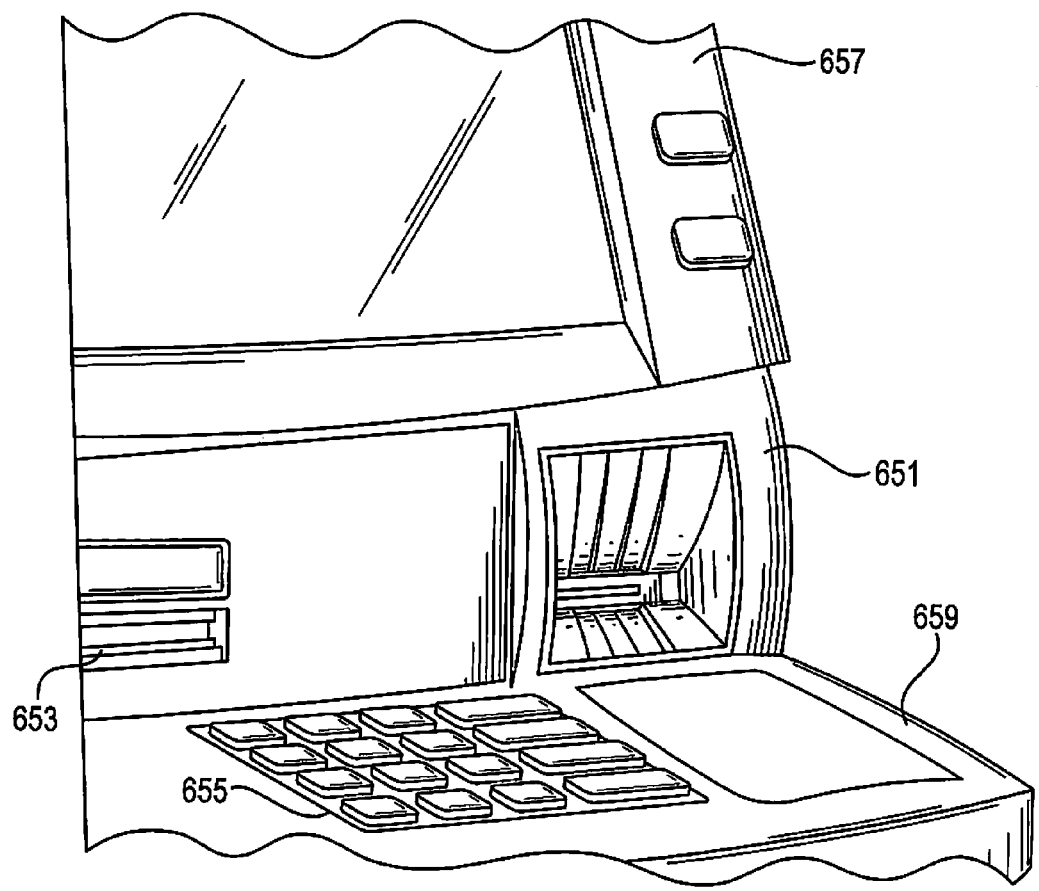
FIG. 30 is a front isometric view of an ATM fascia with an alternative card reader bezel.

FIG. 30 shows a card reader bezel 651, a receipt bezel 653, a keypad bezel 655, and a display bezel 657. FIG. 30 also shows a wireless reader bezel 659. The machine includes a wireless data reader which is operatively positioned (within reading range) to wirelessly read user data that is placed adjacent to the wireless reader bezel 659 by a machine user. As previously discussed, an automated banking machine can have at least one wireless data reader that can wirelessly read smart card chip data, RFID data, NFC data, magnetic data, IR data, and/or bar code data, etc. For example, a wireless NFC data reader of the machine is operable to read NFC data from a mobile phone (or card, wallet, etc.) that has engagingly contacted (e.g., bumped against) the wireless reader bezel 659. In another embodiment a RFID data reader of the machine can read RFID data from an object (phone, card, wallet, etc.) that is positioned by a machine user within the reading range of the RFID data reader, which reading range includes the area adjacent the wireless reader bezel. In still other embodiments a wireless biometric data reader of the machine can wirelessly read biometric data from a machine user. For example, a biometric feature of the user can be read when the feature is properly positioned near (or in contact with) the wireless reader bezel. As previously discussed, a biometric feature that can be wirelessly read can include any of a fingerprint, iris scan, retina scan, facial feature, etc. When a camera is used as a wireless biometric data reader to read a facial feature of a machine user for use in facial recognition, then the wireless reader bezel can bound (surround) a visual opening that leads from the fascia to the camera.

Figure 31:
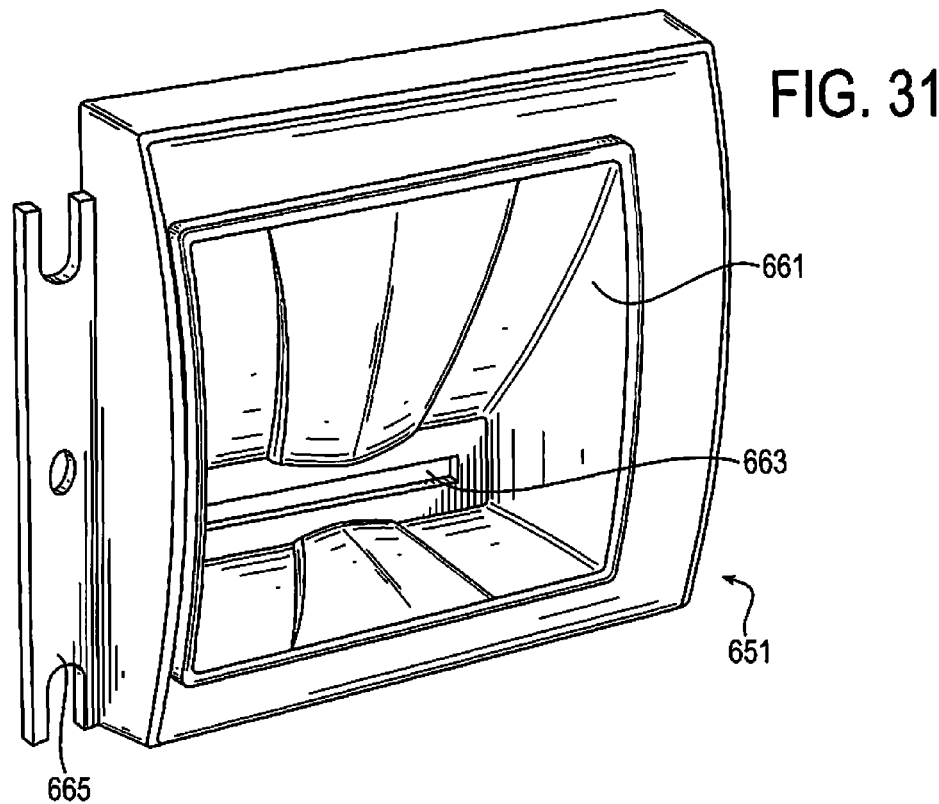
FIG. 31 is an isometric view of the card reader bezel shown in FIG. 30.
Figure 31A:
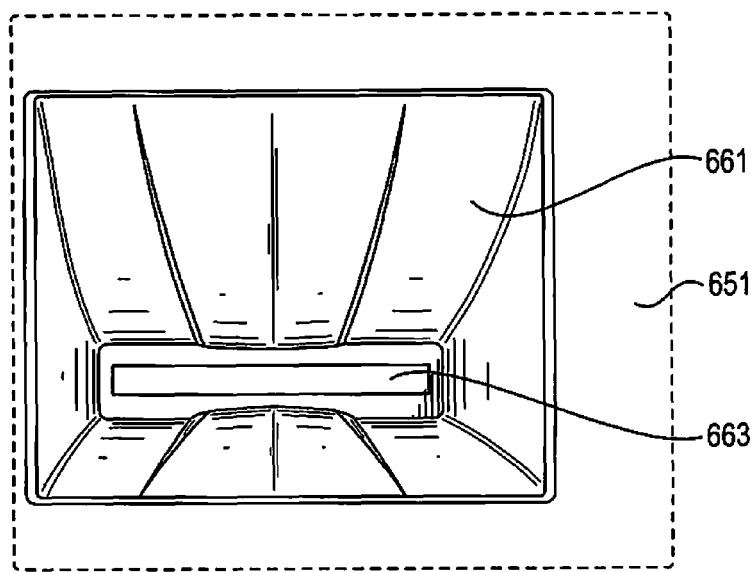

FIG. 31 is an isometric view of the card reader bezel 651 shown in FIG. 30. FIGS. 31A, 31B, and 31C show different (angled) views of a card slot bezel that is similar to the bezel 651 shown in FIG. 31, but without the fastening member. Thus, for ease of understanding, the bezel in FIGS. 31A, 31B, and 31C has been labeled like the bezel of FIG. 31. The bezel 651 of FIG. 31 has a card entry area 661 that is tapered on four sides. The tapering guides the card to a card slot 663 that passes through the bezel. The card slot 663 has a continuous straight (horizontal) entry opening. Alternatively, the bezel 651 can be viewed as having a card slot that includes the area 661, where the card slot tapers smaller toward the card reader. The FIG. 31 bezel comprises a fastening arrangement which includes at least one fastening member 665.

FIGS. 32-39 respectively show differently configured card slot bezels 902, 904, 906, 908, 910, 912, 914, and 916. Each of these respective bezels includes at least one fastening (attaching) member that is useable to removably attach the respective bezel to a machine. Fastening members 903, 905, 907, 909, 911, 913, 915, and 917 are shown. As can be seen, each of these fastening members has similarly arranged attachment points (e.g., fastener receiving holes) or connections (e.g., male/female snap-in connector component). The common usage of similarly configured attachment points allows each bezel to be engagingly supported by the same support structure of the machine. Thus, each of the differently configured bezels of FIGS. 32-39 can be interchangeably used with the same automated banking machine.

Figure 32:
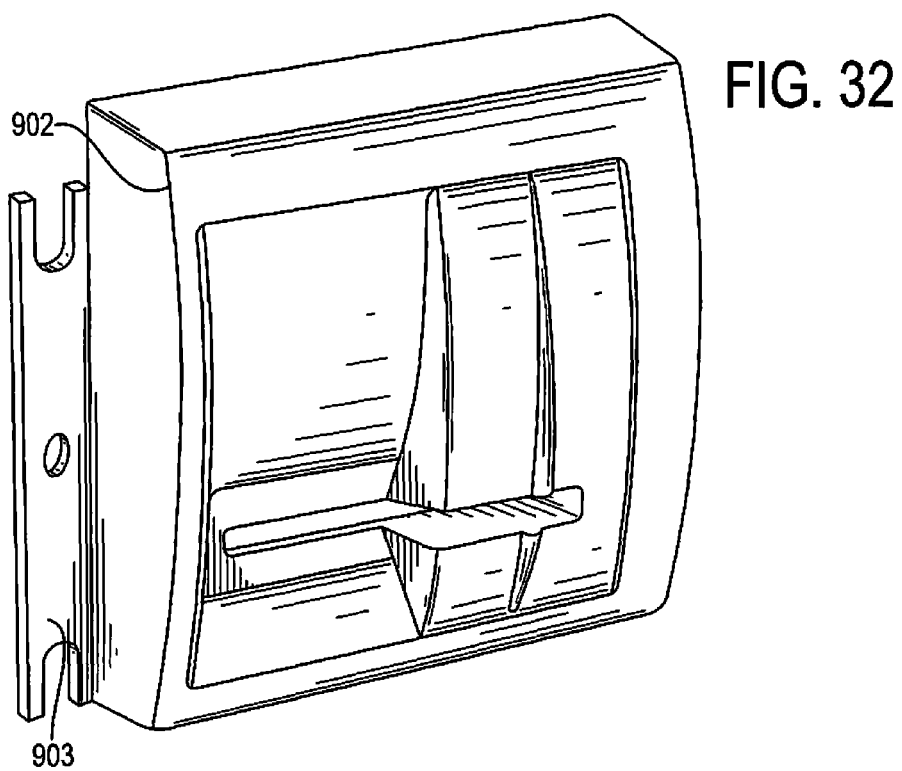
FIG. 32 is an isometric view of an alternative card reader bezel.
Figure 32A:
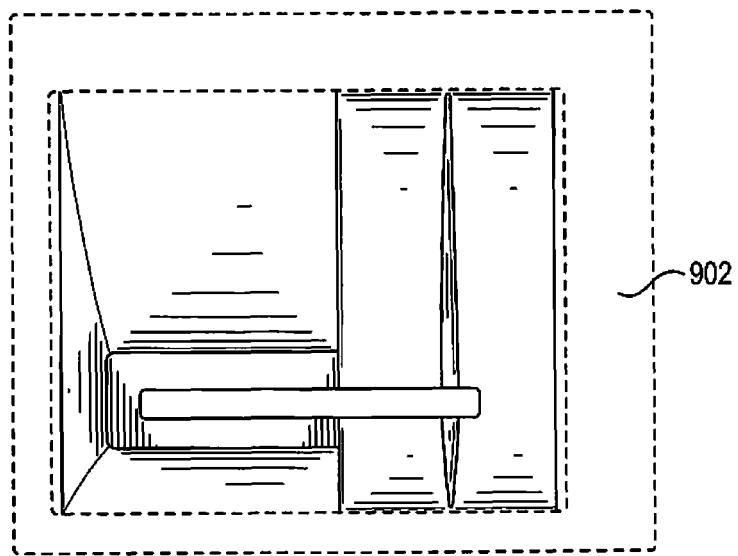
Figure 33:
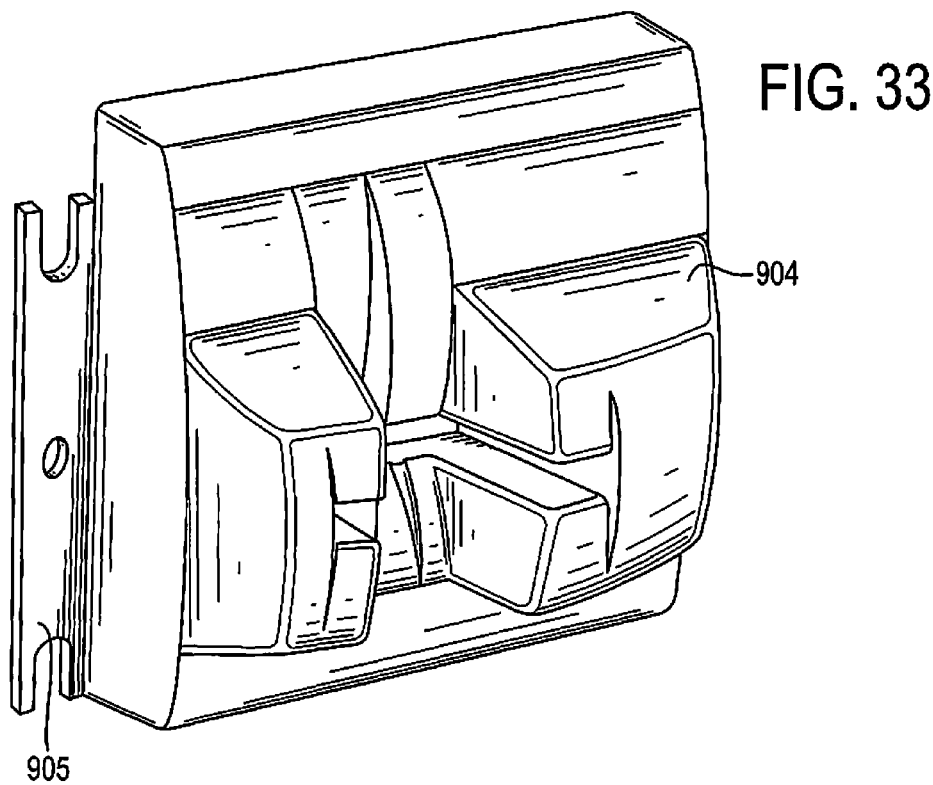
FIG. 33 is an isometric view of an alternative card reader bezel.
Figure 33A:
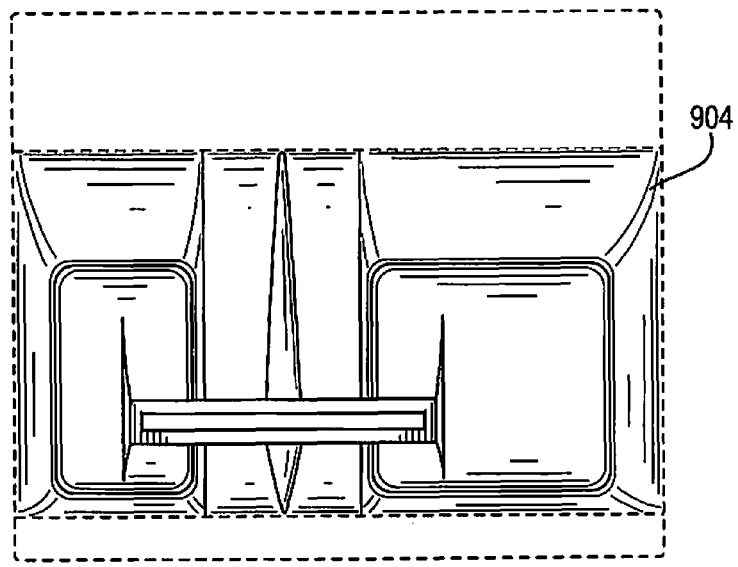
FIGS. 33A, 33B, and 33C show different views of a bezel that is similar to the bezel shown in FIG. 33.
Figure 33B:
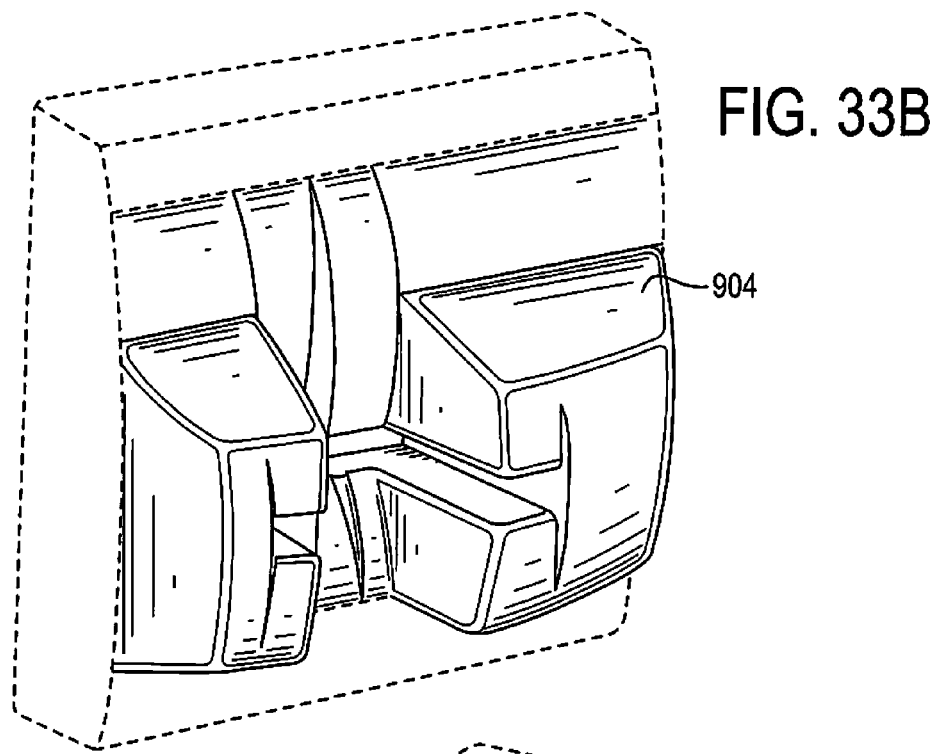
Figure 33C:
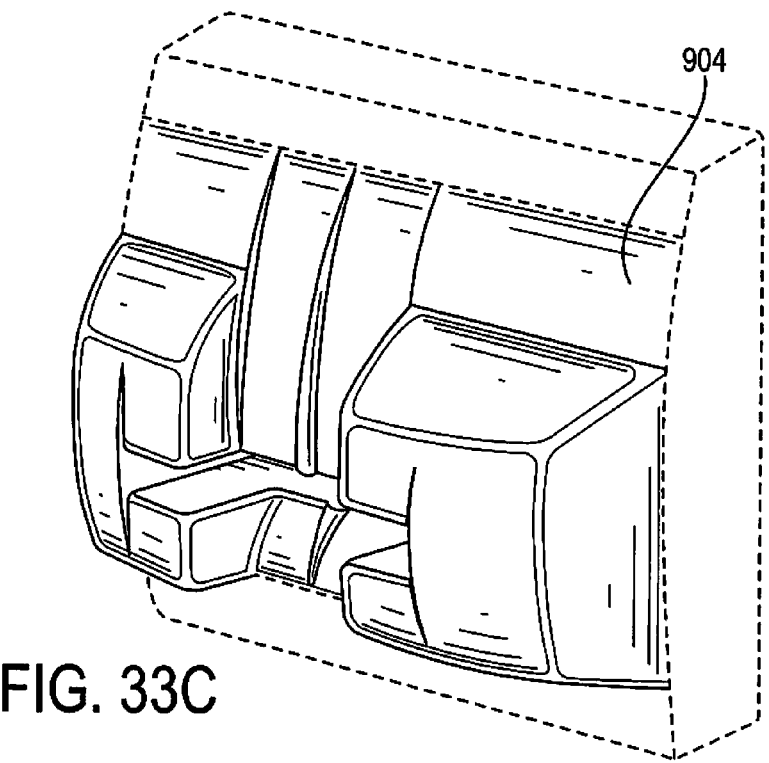
Figure 34:
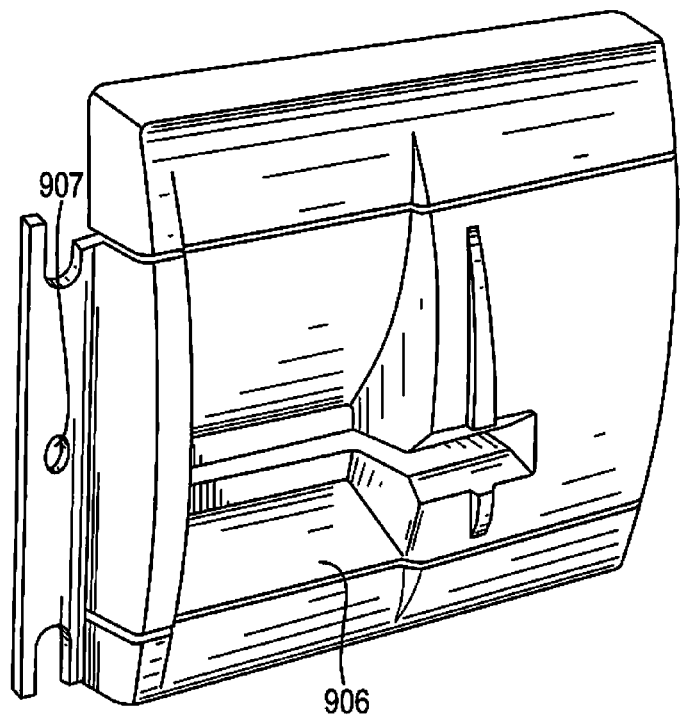
FIG. 34 is an isometric view of an alternative card reader bezel.
Figure 34A:
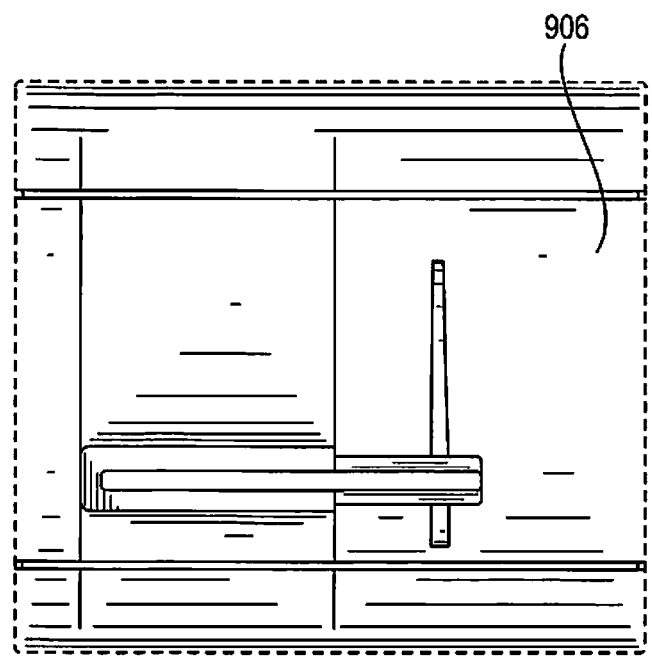
FIGS. 34A, 34B, and 34C show different views of a bezel that is similar to the bezel shown in FIG. 34.
Figure 34B:
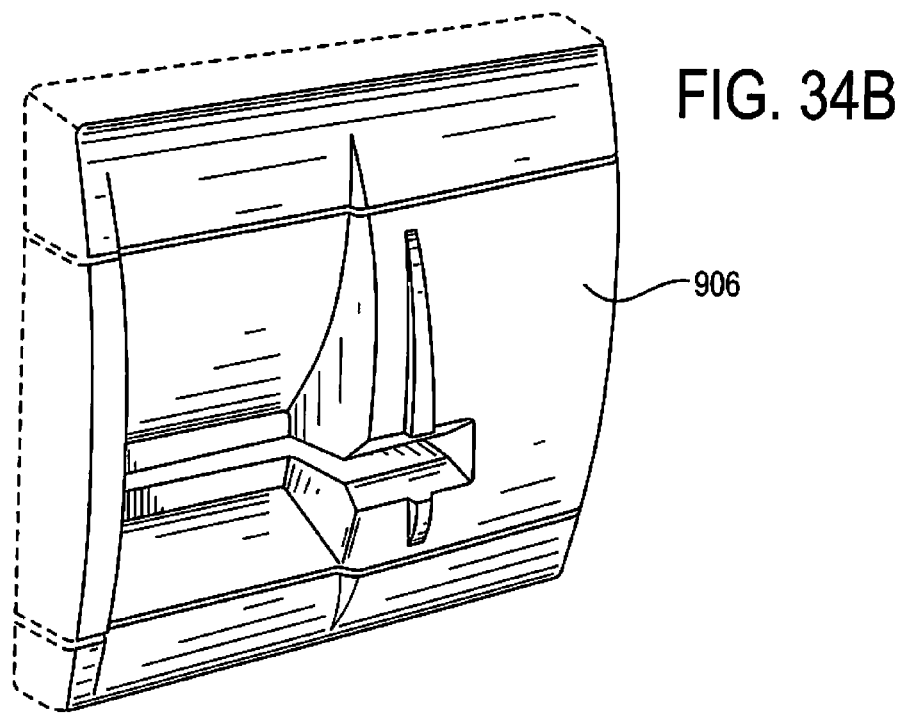
Figure 34C:
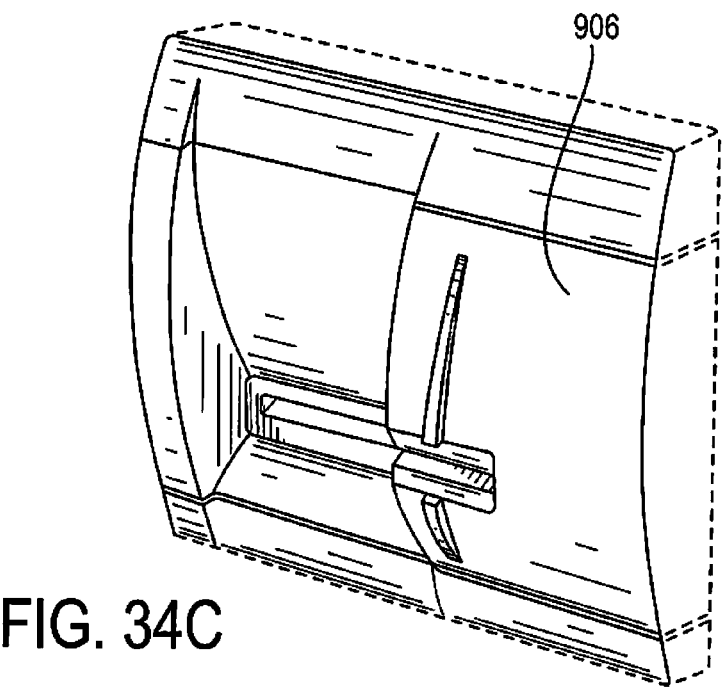
Figure 35:
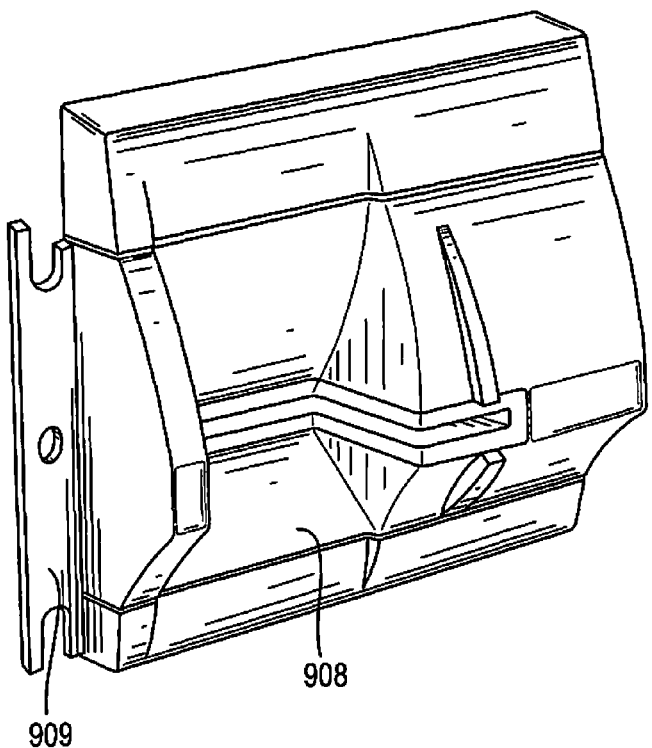
FIG. 35 is an isometric view of an alternative card reader bezel.
Figure 35A:
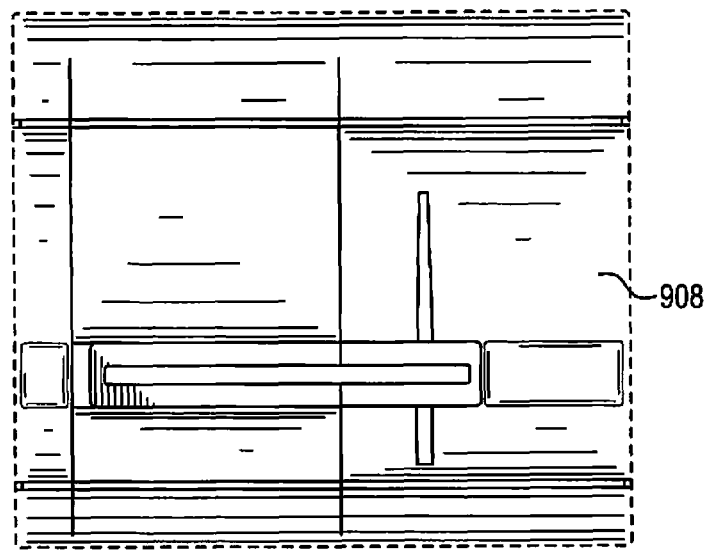
FIGS. 35A, 35B, and 35C show different views of a bezel that is similar to the bezel shown in FIG. 35.
Figure 35B:
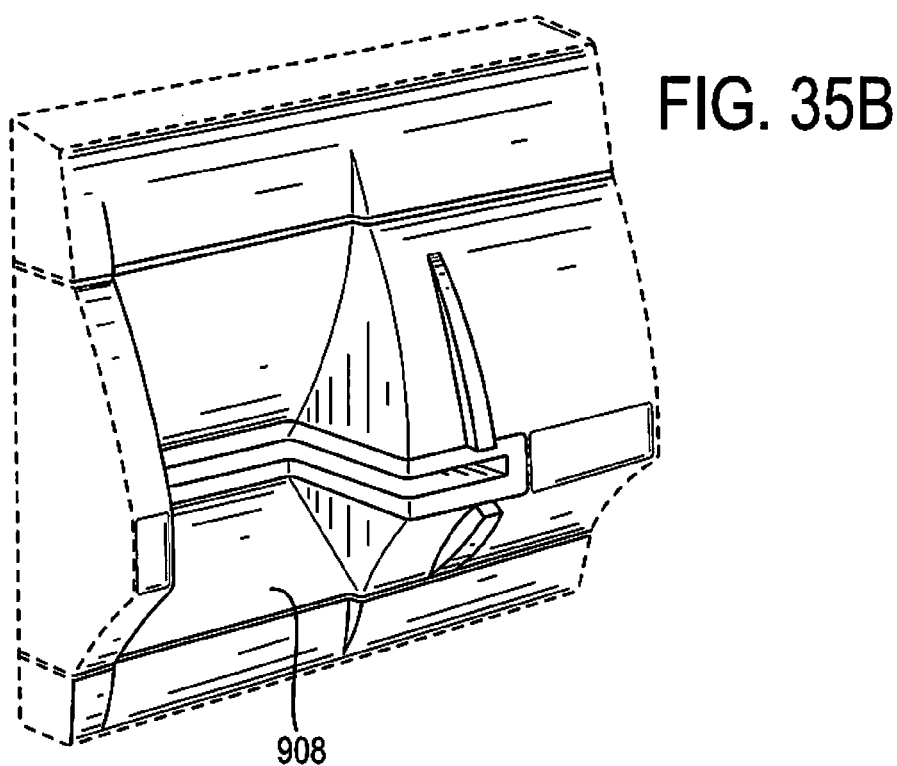
Figure 35C:
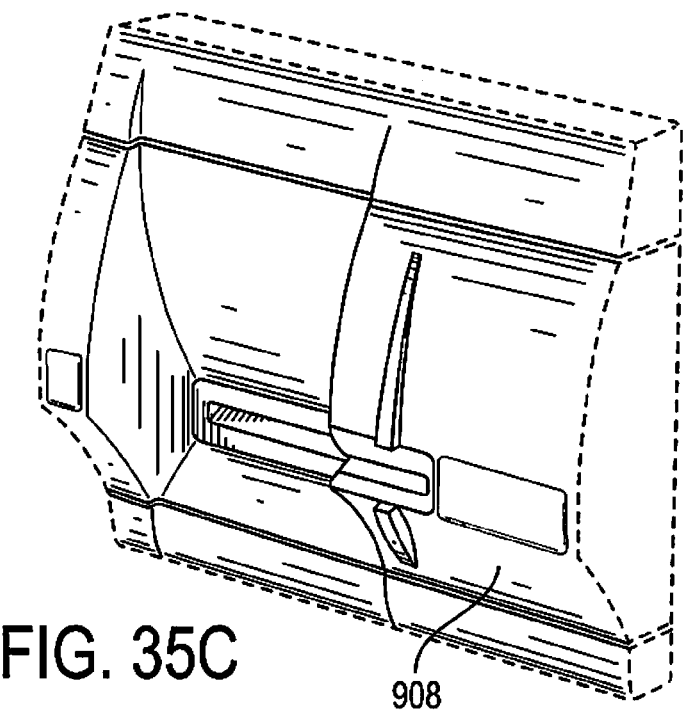
Figure 36:
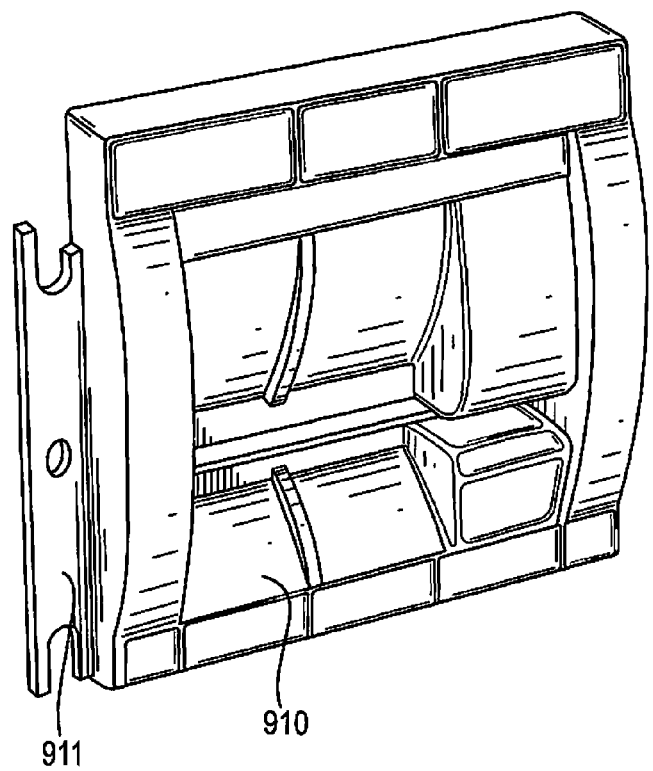
FIG. 36 is an isometric view of an alternative card reader bezel.
Figure 36A:
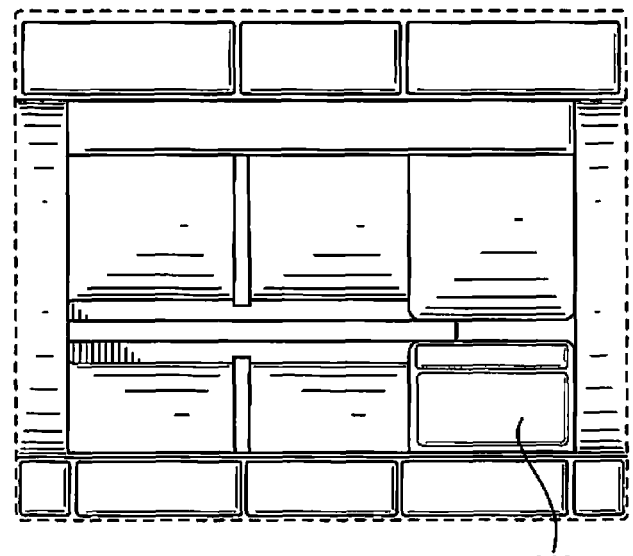
FIGS. 36A, 36B, and 36C show different views of a bezel that is similar to the bezel shown in FIG. 36.
Figure 36B:
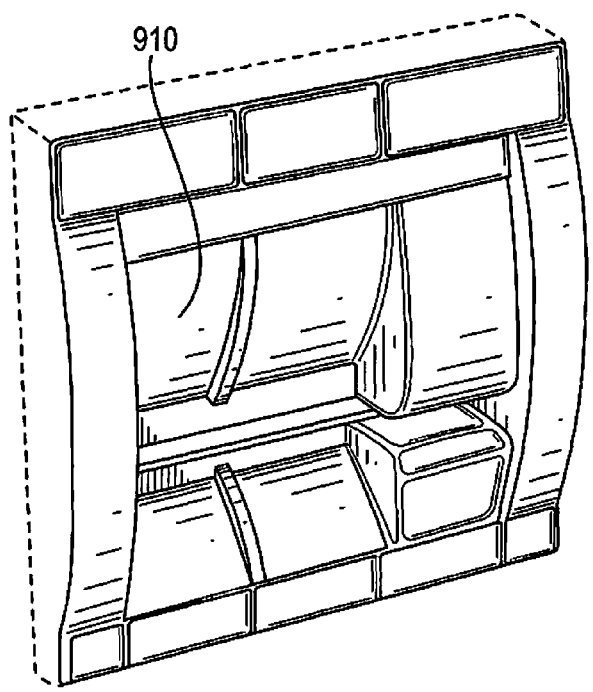
Figure 36C:
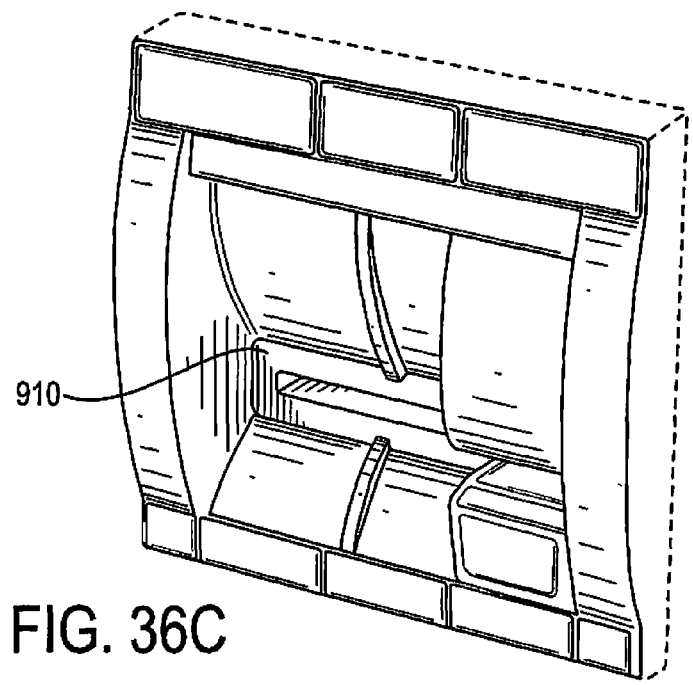
Figure 37:
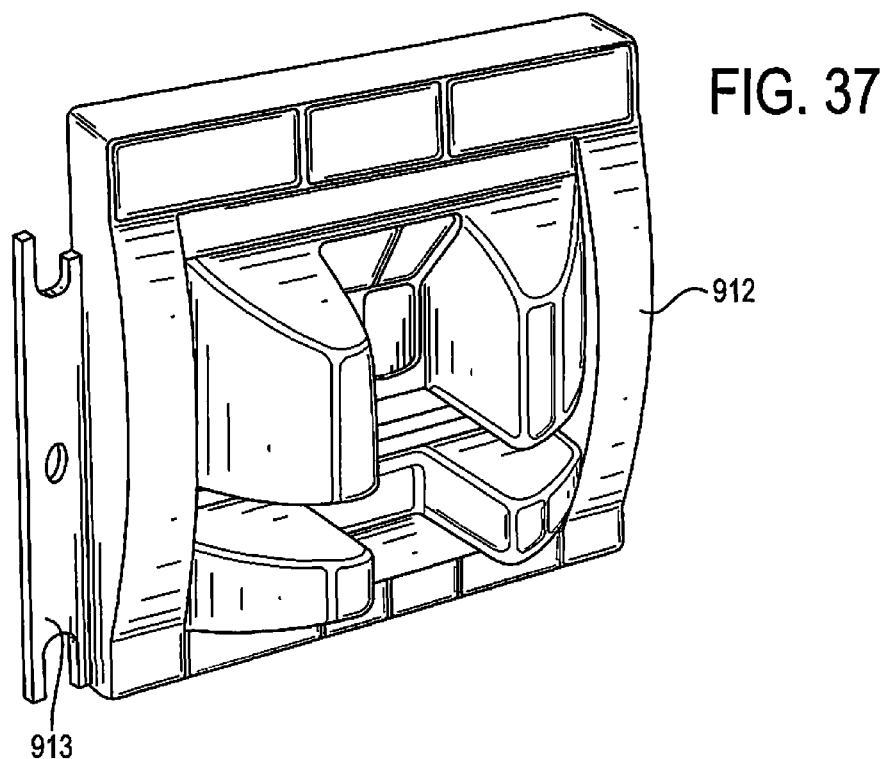
FIG. 37 is an isometric view of an alternative card reader bezel.
Figure 37A:
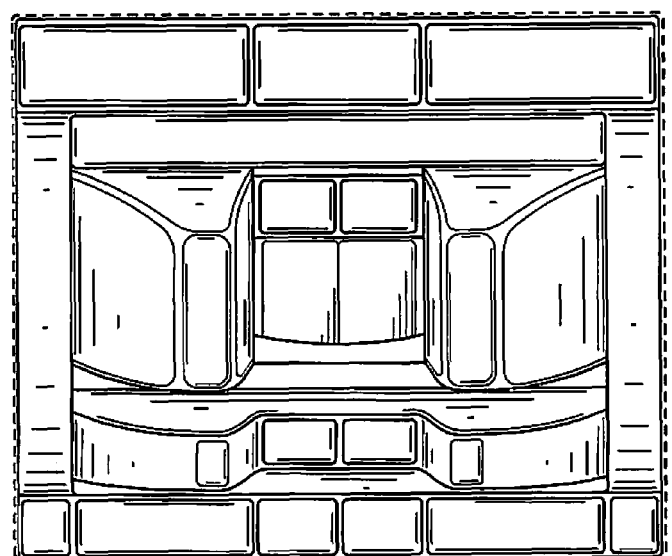
Figure 37B:
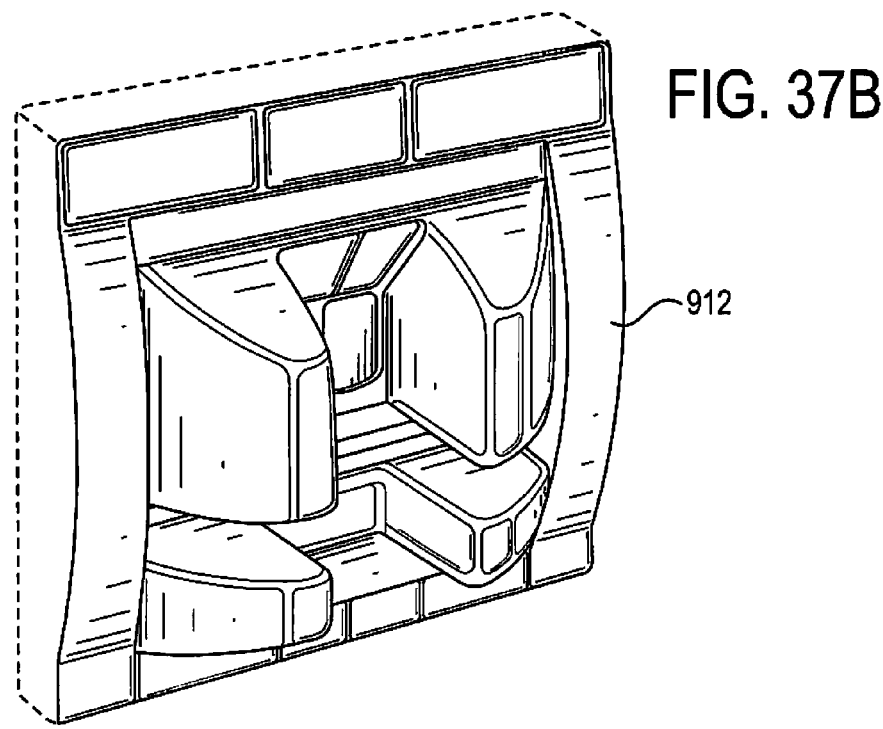
Figure 37C:
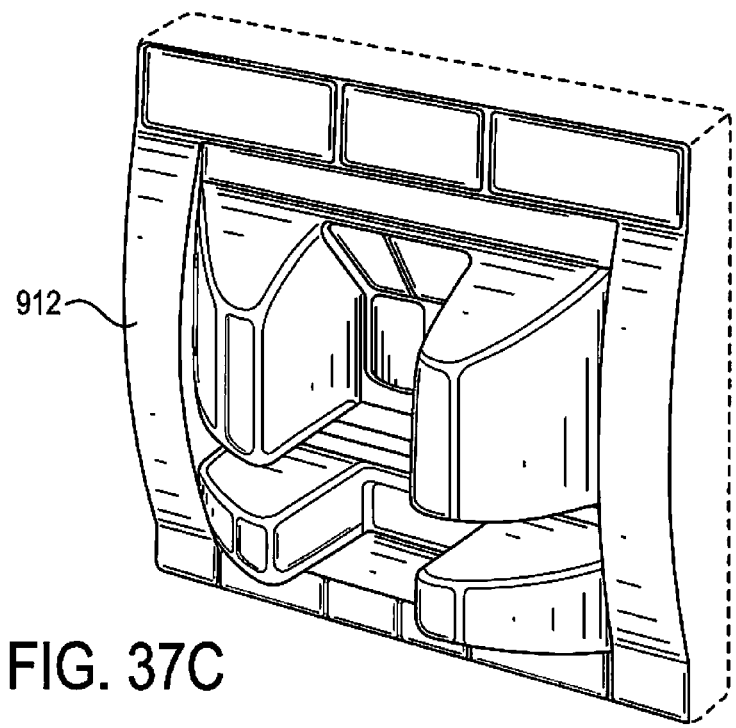
Figure 38:
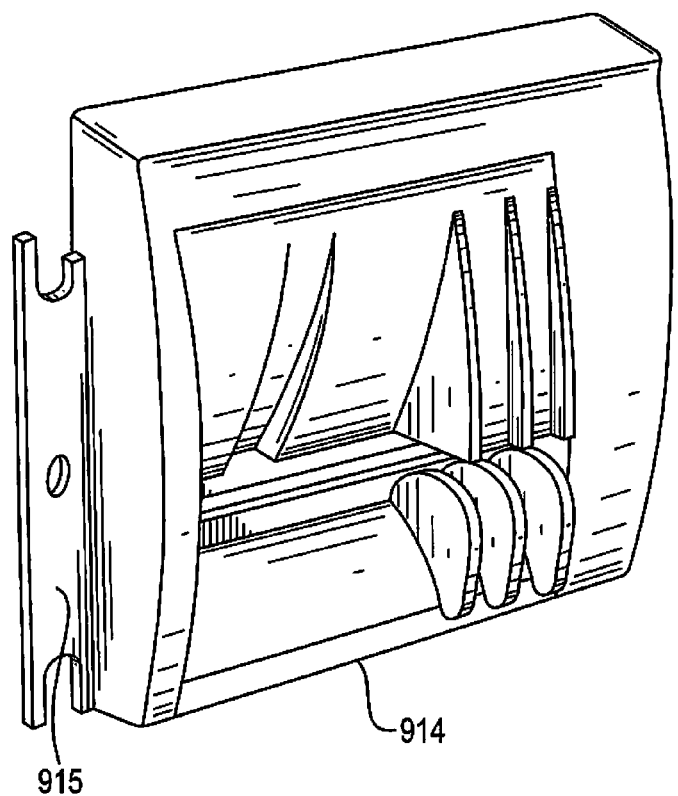
FIG. 38 is an isometric view of an alternative card reader bezel.
Figure 38A:
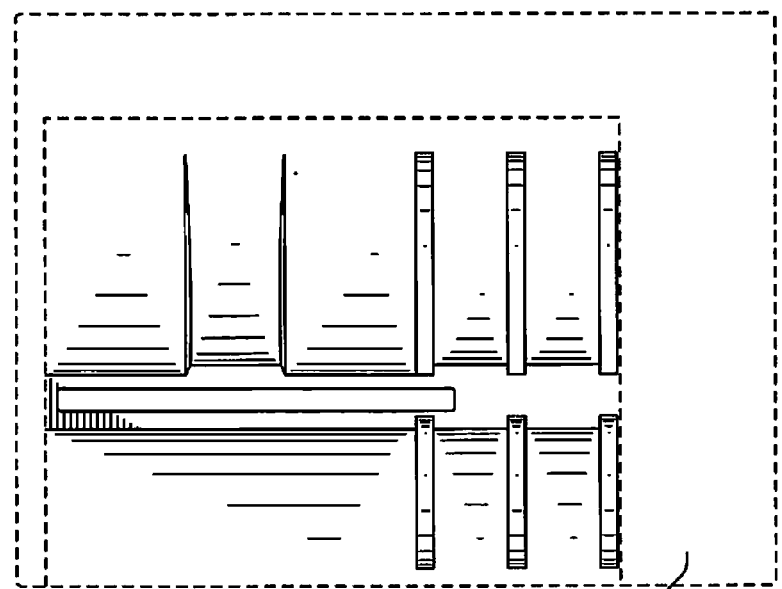
FIGS. 38A, 38B, and 38C show different views of a bezel that is similar to the bezel shown in FIG. 38.
Figure 38B:
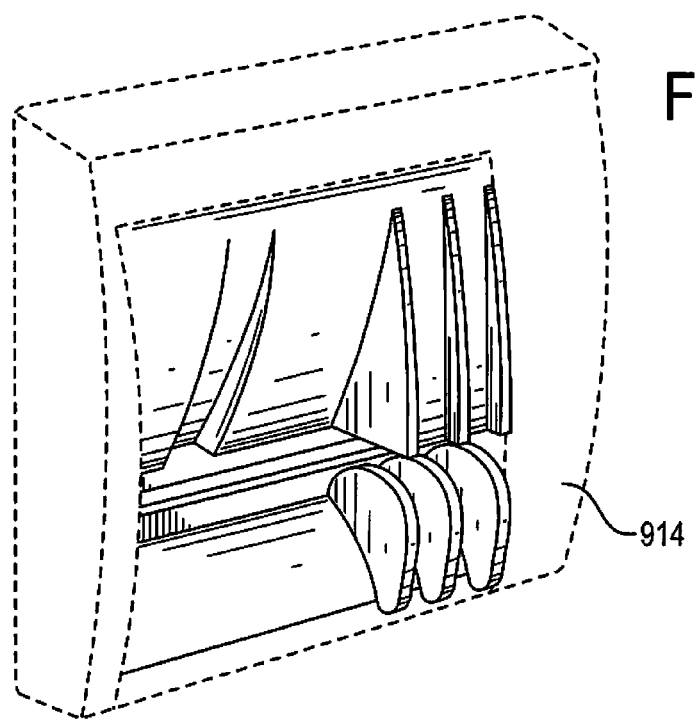
Figure 38C:
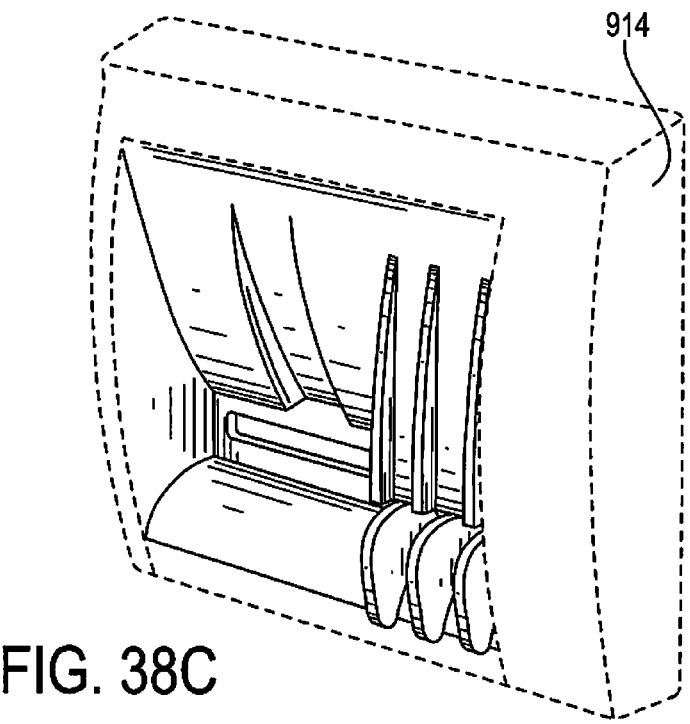
Figure 39:
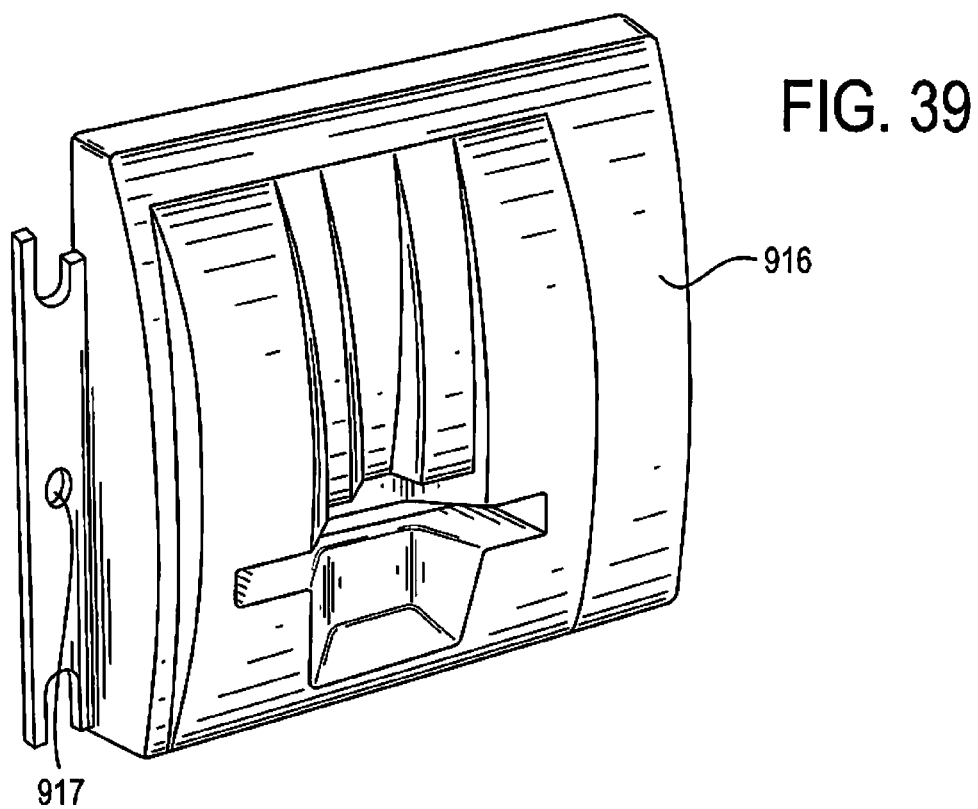
FIG. 39 is an isometric view of an alternative card reader bezel.
Figure 39A:
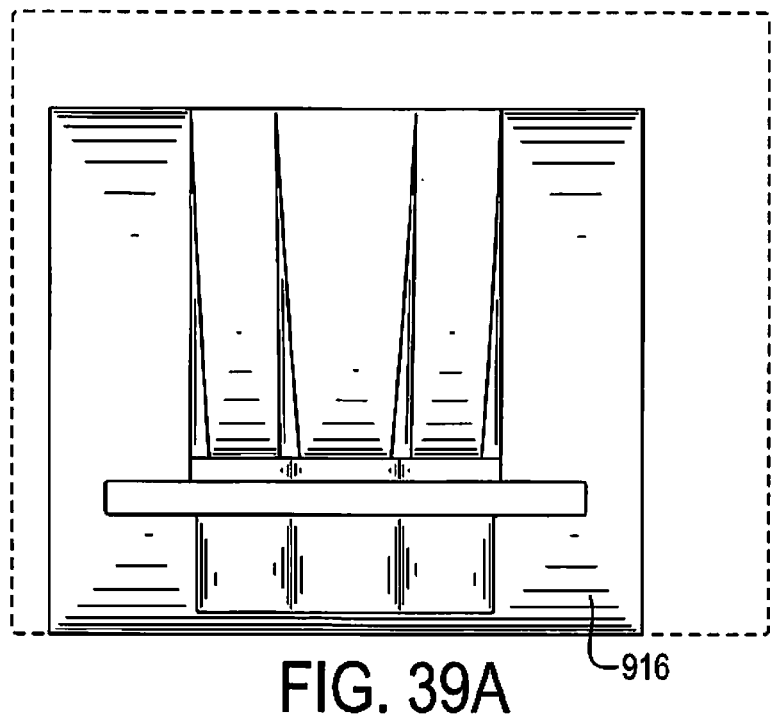
FIGS. 39A, 39B, and 39C show different views of a bezel that is similar to the bezel shown in FIG. 39. reader.
Figure 39B:
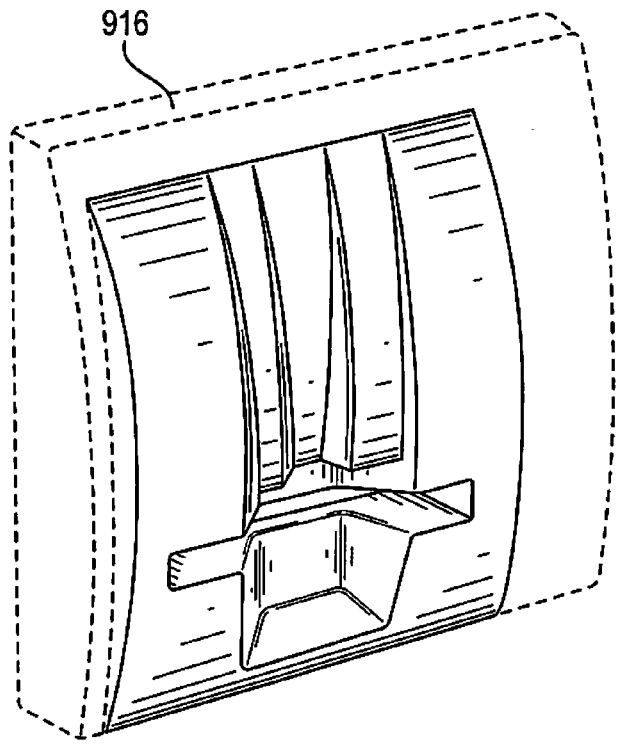
Figure 39C:
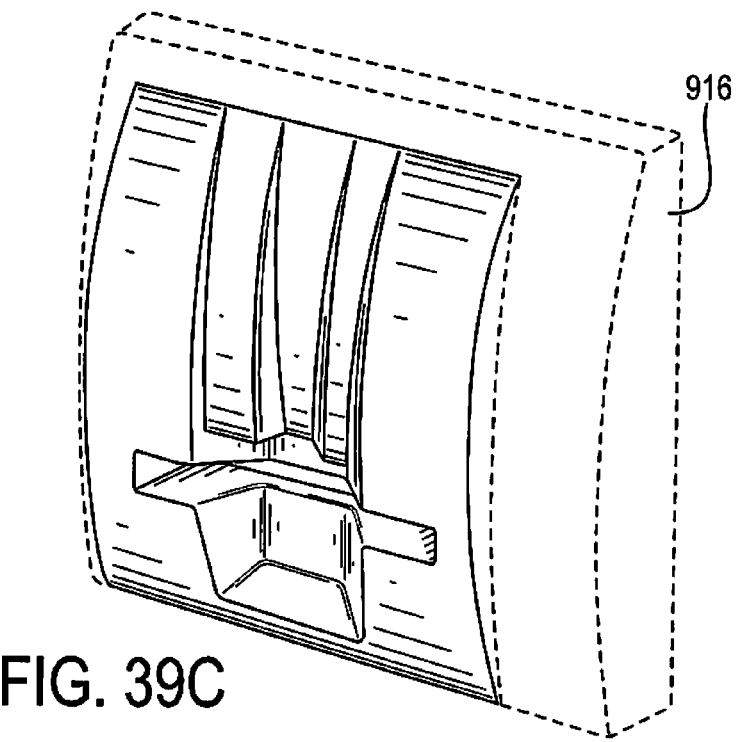

FIGS. 32A-39A, 32B-39B, and 32C-39C respectively show different angled views of card slot bezels that are similar to the respective bezels shown in FIGS. 32-39, minus the bezel fastening members. That is, FIGS. 32A, 32B, and 32C show different views of a bezel that is similar to the bezel shown in FIG. 32. Likewise, FIGS. 39A, 39B, and 39C show different views of a bezel that is similar to the bezel shown in FIG. 39. Thus, for ease of understanding, similar reference numerals have been used for similarly (like) configured (shaped) bezels.

As can be seen, an automated banking machine can have structure where a bezel area surrounding a card reader slot can be readily replaced from a position inside of the machine. Other arrangements can allow card reader bezel replacement from outside the machine, such as through use of a fascia key lock. Still other bezel fastening arrangements can required a service person to both access an outside securing feature and an inside securing feature of a bezel fastening arrangement. Further, the outside and inside accessing may have to be performed in a specific order of service steps. For example, a first bezel securing feature which can only be manually accessed inside of the machine housing may have to be released before another (second) bezel securing feature which is accessible outside of the machine housing can be released, and vice versa. Thus, the fastening and/or removing of a bezel may require that the authorized person perform (in a particular sequential order) both interior an exterior operations.

As discussed, an outer surface of a bezel area can include one or more diagonal faces, including faces of different (outwardly extending) heights. For example, the faces can slope or taper in an inwardly direction toward the card slot. Thus, a bezel configuration can act to guide (or funnel) a card toward the card entry slot. As discussed, example embodiments allow for different card reading area bezels with different configurations to be installed and periodically changed on different machines.

Figure 42:
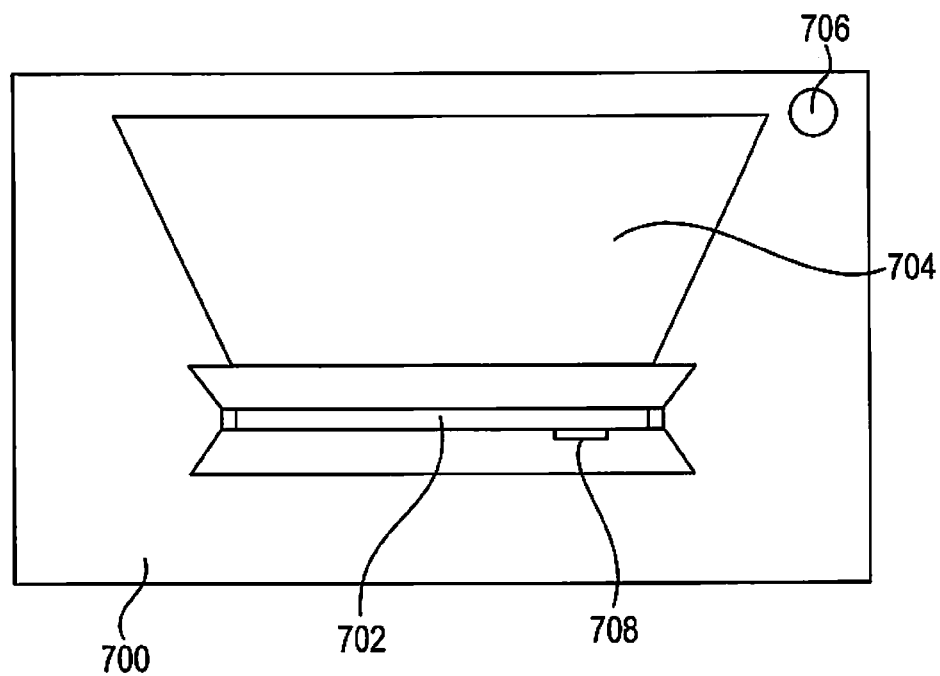
FIG. 42 shows a front view of an example bezel that includes a see-through window.
Figure 43:
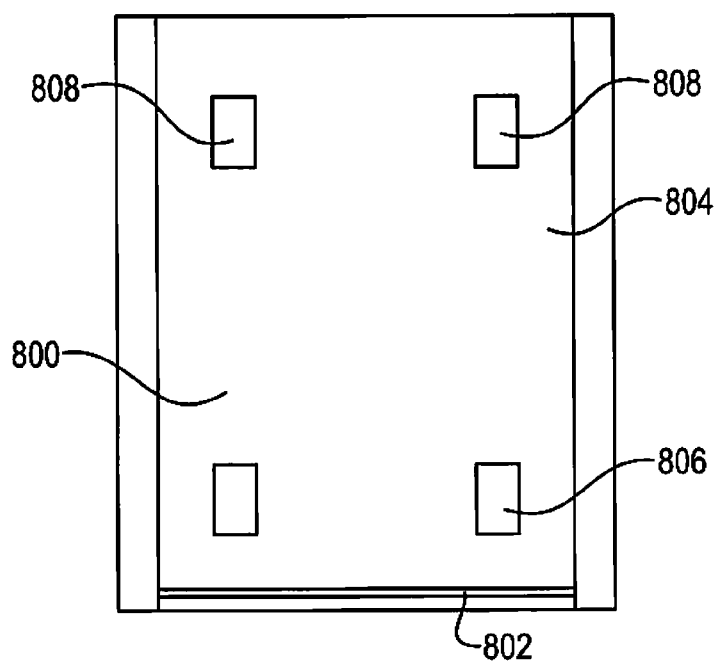
FIG. 43 shows a top view of the interior of a card reader.

In other example embodiments an interchangeable integral bezel unit can have a translucent or transparent view window. The window is of a configuration (size) and position (location) that allows a customer to view their card while it is inside the card reader. Thus, the customer can be in visual possession of their card at all times during a transaction with the machine. An inability of a customer to see their card can be an indication that an unauthorized component is blocking their (direct line of sight) view to the card. FIG. 42 shows a bezel unit 700 including card slot 702 and a (transparent or translucent) window 704. FIG. 43 shows a card reader 800, which has a shutter 802 and an open top portion 804. At least one read head 806 and card sensors 808 are also shown. The shutter 802 is aligned with the slot 702. The window 704 allows a customer to see into the interior of the reader 800.

The card reader's entrance shutter (door) 802 can be moved from a closed position (or a locked condition) to an open position (or an unlocked condition) to allow a user card to enter into the interior of the card reader 800. In an example embodiment the shutter 802 is normally locked in a closed position to keep non card material out of the card reader. With the shutter 802 unlocked during a card reading operation, a card entering the card reader pushes against the biased shutter 802 causing it to be moved to an open position. For example, the shutter 802 can be pivoted upward about an upper hinge or axis. Upon exit of the card from the card reader, the shutter 802 is biased back to its closed position where it can again be placed in a locked condition. It should also be understood that other arrangements for opening/closing a shutter can also be used, including arrangements that use drive (e.g., mechanical, electrical, etc.) devices to cause the shutter to be moved (driven) from the closed position to an open position independent of card insertion.

In other example embodiments, operation of a shutter of a card reader is linked to one or more visual indicators situated on the bezel (or on the fascia). The bezel has at least one sensor positioned in an area adjacent to (or in) the card input slot. The at least one sensor can sense the presence of a card entering the card slot. The at least one sensor can also sense whether the card is properly oriented to allow reading of the card data (e.g., magnetic stripe data) by the card reader. Both the at least one sensor and the shutter position/condition controlling device can be in operative connection with at least one processor (e.g., controller) of the machine.

The magnetic stripe of a card can be used to determine the card's orientation. For example, if a magnetic property of a magnetic stripe can be sensed (by the at least one sensor), then it is determined that the card is correctly oriented. That is, the at least one sensor can be positioned relative to the card entry slot so that it can only read a magnetic property from a properly oriented magnetic stripe.

A visual indicator (e.g., a light emitter which can change colors) on the bezel (or on the fascia) can alert a customer whether their card was correctly or incorrectly inserted. For example, a visual indicator comprising an LED can emit a green light if the card was determined to be properly oriented upon its entry into (or adjacent to) the card input slot. In response to the (magnetic) sensing of a properly oriented card, the shutter can be opened to allow the card to enter the card reader. In contrast, the LED can emit a red light if a sensed card is determined to be improperly oriented. The shutter will remain closed in response to the sensing of an improperly oriented card.

As can be seen, an example embodiments allow for use of shutter locking control in combination with visual indicators during a machine transaction. The computer control that oversees the unlocking of the card reader shutter is dependent on verification that the card is correctly oriented. Furthermore, visual indicators (e.g., LEDs) can be used to identify (confirm) to a customer an authenticated proper card orientation.

The bezel unit of FIG. 42 also includes a visual indicator 706 and at least one sensor 708 operable to both sense the presence of a card and sense a magnetic property. In an example the at least one sensor includes two sensors, both a separate proximity sensor and a separate magnetic field sensor. In another example the at least one sensor comprises a single combination sensor. It should be understood that in other example examples more or fewer sensors can be used.

It should also be understood that a card reader shutter arrangement that is (at least partly) controlled by bezel sensor operation is applicable to both short-edge and long-edge card insertion configurations. In the bezel example of FIG. 42 the at least one sensor 708 is positioned adjacent to a lower (bottom) edge of the slot 702. This position allows the at least one sensor to detect a proper orientation for a card that is being inserted short-edge first, has its magnetic stripe facing downward, and has its magnetic stripe at the lower right side of the card. The proper orientation enables the right side read head 806 in FIG. 43 to read data from the magnetic stripe. However, the at least one sensor shown in FIG. 42 may also be viewed as being positioned to detect a proper orientation for a card that is being inserted long-edge first and has its magnetic stripe facing downward. It should be understood that the sensor position is example, and in other embodiments other sensor positions can be used.

Further, in some example embodiments authorized bezels can have embedded therein at least one indicator that can comprise radio frequency identification (RFID) tags, near field communication (NFC) chips, and/or other wired or wireless indicators which can be detected through operation of suitable sensors positioned within the machine. FIG. 29 shows a bezel indicator 456. For example, a bezel indicator can comprise an RFID tag which indicates that the bezel is a genuine and authorized bezel. The data in the RFID tag may include a suitable serial number or other data or value which indicates to the machine that an authorized bezel is present.

As discussed in further detail later, in some arrangements a bezels's RFID tag is programmable, and the machine is operable to store bezel updated data in the RFID tag of an authorized bezel. The stored bezel data can be later read by the machine's RFID reader to verify that an authorized bezel is still present. Updating of bezel data may occur after each transaction. Similarly, the machine may store authorization data in a programmable NFC chip of a bezel. A new bezel being attached to the machine for the first time can have bezel data that identifies it to a machine-associated computer as a bezel that is designated (approved) for use with the machine.

In an example embodiment, at least one bezel indicator reader (or sensor) is positioned within (or adjacent to) the machine. A reader of a bezel indicator can comprise a wireless reader. FIG. 3 shows such a wireless reader 77. The wireless reader 77 is operable to wirelessly receive bezel data transmitted by a bezel positioned adjacent the machine housing. For example, the bezel data can be usable to identify the bezel as a bezel authorized for use with the machine.

The bezel data reader 77 can comprise an RFID reader and/or an NFC reader. For example, an RFID reader can detect signals from a RFID tag or other RFID indicator on or in the bezel. The presence of an appropriate bezel data (or indicator) may be monitored through operation of at least one computer associated with the machine to assure that an authorized bezel is installed on a machine. Thus, removal of a bezel can be detected.

Alternatively, an RFID signal strength or other signal properties may be used by at least one computer to determine that an authorized bezel is adjacent the machine housing, and it is also in its proper operating location. The failure to detect an authorized bezel may be indicative that an unauthorized bezel has been installed by criminals on the machine. Likewise, a failure to detect appropriate signal strength or other properties can be an indication that a skimming device is installed. That is, a change in the signal strength from an RFID tag (or from an NFC chip) can be an indication of tampering. For example, the signal strength may be decreased because of the new presence of unauthorized structure. The signal strength may also be decreased because the bezel is not properly positioned (e.g., due to unauthorized movement of the bezel from its normal operating position). Signal strength may also be decreased (or absent) because the current bezel is unauthorized (e.g., due to unauthorized replacement of the prior bezel).

In response to the detection arrangement indicating the absence of the expected bezel indicator, or improper signal properties, the at least one processor can operate in accordance with its programming to take appropriate action. This can include, for example, disabling further operation of the machine, giving an indication to a remote computer of a possible fraud condition, notifying authorities, causing a display device to output a message (warning) to potential customers, and/or other appropriate steps.

In alternative embodiments, a bezel indicator can include a programmable RFID tag or other structure/component which can receive signals (messages), such as from the machine. The indicator can alter its stored data in response to the messages from the machine. For example, a bezel indicator's programmable RFID tag (or a similar wireless indicator including a memory) may receive data (such as from the machine), which is then stored in association with the indicator. This data may be output (sent) by a suitable wireless output device of the machine with each transaction, or upon other events that occur at the machine. That is, with each transaction the current data being stored by the indicator can be updated. For example, after a transaction the machine may provide the bezel indicator new data that corresponds to a code or value, such as the next transaction number or identifier.

The machine includes at least one wireless reader (e.g., an RFID tag reader) that can read data from the bezel's stored data (e.g., an RFID tag). The machine can operate in accordance with its programming to check the data stored in connection with the bezel indicator with each transaction or on a periodic basis. That is, a computer associated with the machine can determine if the bezel's currently stored data matches the latest data sent to the bezel. If the stored data associated with the bezel indicator does not correspond with the data that was last sent by the machine to be stored in the bezel indicator, then at least one processor of the machine will determine this discrepancy. The processor of the machine can further resolve that there is a possible fraud situation occurring at the machine. This may result in the processor causing the machine to no longer operate or to give an indication of a fraud condition to a remote computer.

Further in other embodiments, security features (such as data encryption) can be used in association with the transmission of data to/from the indicator and with data storage to make it more difficult to intercept and replicate the data used in association with the indicator. This can include, for example, the use of public key encryption or similar security so as to assure that communications between an emitter/receiver of the machine and the storage device of (within) the indicator cannot be intercepted or readily replicated in a counterfeit bezel device. Of course these approaches are example and in other embodiments other approaches can be used.

Furthermore, each of the bezel configurations previously discussed can be used with bezel indicators of the type described to assure that the replaceable/changeable bezels installed on a machine are authorized, and that a counterfeit bezel has not been installed on the machine. As can be seen, example arrangements allow for a feature to be associated with a replaceable authorized bezel in order to determine if the authorized bezel has been removed and replaced with another (fraudulent) bezel installed by the a criminal. An example system of this type can involve a series of sensors or other switches that can detect when the bezel has been removed from its normal surroundings. If a processor (associated with the sensors) determines a situation where the bezel has been changed, then the machine may be automatically shutdown. A machine servicer may need to provide special inputs to the shutdown machine, cause a message to be downloaded to the machine, or other procedures in order to again make the machine operable for customers.

As can be seen, example examples of sophisticated approaches for determining if the authorized bezel has been removed have been provided. For example, some of these approaches include providing programmable RFID tags or other chips within the authorized bezel. An RFID receiver/reader within the machine can determine if the data output by the RFID tag in the bezel corresponds to a value for an authorized bezel (i.e., a bezel authorized to be used with that particular machine). As previously discussed, the machine itself (or a processor associated therewith) can be used to provide the bezel with an updated value.

Other approaches for authorized bezel verification may analyze signal strength to verify that the bezel is in its proper (expected) position. This can include analyzing the signal strength received by the (remainder of the) machine from an RFID tag or NFC chip embedded in the bezel. If the authorized bezel has been moved from its normal position but still remains within the machine, then the change (e.g., decrease) in the signal strength can be an indicator that the authorized bezel is not in the proper operating position. As a result, changes in the sensed signal from the RFID tag (or NFC chip) can be an indication that the bezel has been moved from its authorized position, and that criminals have installed a skimming bezel on the machine.

As previously discussed, other detection methods for detecting the presence of an unauthorized bezel can also be implemented. These can include having an RF emitter/transmitter of the machine communicate with the programmable RFID component (or NFC chip) of a given bezel with every transaction. The communication can cause the RFID tag to store a different value (or secret code) after completion of each transaction. Before allowing the machine to carry out a subsequent transaction, the processor/sensors associated with the machine can determine if the machine can receive (from the bezel) the prior value that was communicated to the RFID tag. If the value does not correspond (match), or cannot be recovered (received from the bezel), then a fraud condition that the bezel has been replaced with an unauthorized bezel can be determined.

As previously discussed, encryption features can be employed in connection with the communicating and storing of data within a data store associated with the RFID tag or NFC chip of the bezel. Thus, the data stored in the bezel data store (e.g., RFID tag) may be encrypted to make it harder for criminals to produce counterfeit bezels to install on machines. Example encrypted communication approaches can use asymmetric public key encryption for purposes of transmitting a new value to the bezel. This can include having a data store in association with the RFID tag (or NFC chip) in the bezel. The data store can have a public and private key. Similarly, the processor associated with the machine's RFID reader and transmitter can have its own public and private key pair. The machine's emitter can communicate wirelessly to the bezel its public key, and cause the bezel to provide its public key to the machine's processor. A value that is encrypted using a given private key can be decrypted using the corresponding public key. Thus, the ATM is able to determine that it is communicating with the genuine bezel. Likewise, the genuine bezel is able to determine that it is communicating with the authorized emitter and processor associated with the machine. In this example arrangement, data can be securely stored within the data store of the bezel that can authenticate the particular bezel as genuine.

In still other embodiments, card reader bezel structures can be made further resistant to fraud by having movable components included therein or therewith. For example, bezels may be comprised of flexible plastic or other material that allow the flexing and movement of surfaces thereof. Such flexible materials can include embedded therein or mounted adjacent thereto, movable members which are in operative connection with actuators so as to provide periodic movement of the bezel structures. Such movement may be achieved by actuating devices, such as shape memory alloy structures that move in response to applied electrical energy. Alternatively, such bezel structures may move in response to applied pressure, such as internal fluid (air) bladders, pneumatic cylinders, or other similar pressure providing devices. Further, alternative embodiments may include panels or pieces that are moved in response to solenoid actuators, motors, or other electrical devices.

In an example embodiment, control circuitry can operate in response to at least one processor in the machine to cause the periodic movement of the actuator included within the card reader bezel (or other machine bezel that is used to receive user input). Movement of the actuator changes the exterior contour of the bezel. Changing of the exterior contour will generally cause the dislodgement of (or the readily visibly exposing of) an unauthorized reading device that may have been mounted thereon by a criminal. In example embodiments the exterior surface of the bezel's contour adjacent to the area of the donut can be periodically moved in response to the actuator. Such movement can include, for example, producing a periodic single temporary bulge or wave in the outer surface contour of the bezel. In some example embodiments, a plurality of such temporary bulges, waves, or other contour changes can be produced. The outward waves can also be of various sizes (wavelengths and frequencies) and can be continually produced for various lengths of time. Such contour changes can be produced (before and/or after) each time that the user data reading device (e.g., a card reader) is operated, at other periodic intervals, after proximity detection of a potential customer, etc.

As can be appreciated, such repeated periodic contour surface changes will generally be effective, particularly in areas where skimmers are likely to be attached, to cause such skimmers to (at least partly) be disengaged or dislodged from the moving underlying bezel structure. Thus, such skimmers will be made more readily visibly apparent to machine users and machine owners. Furthermore, when combined with the use of anti-stick coatings (of the types previously discussed), the use of bezels having changeable outer contour surfaces will be further effective to prevent the continual (retained) attachment of unauthorized devices thereto. Of course these approaches are example and in other embodiments, other approaches can be used.

Figure 44:
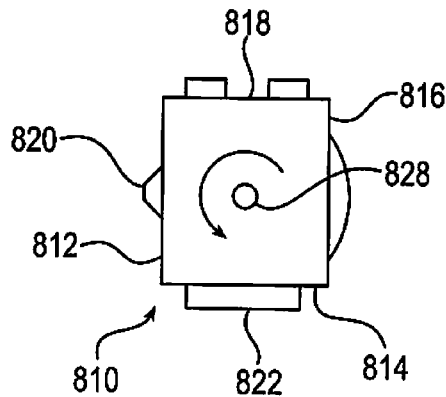
FIG. 44 shows a top view of an example rotatable bezel section having a substantially rectangular shape.
Figure 45:
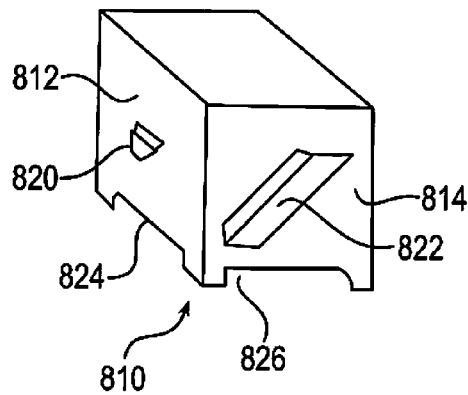
FIG. 45 shows an angled side view of the bezel section shown in FIG. 44.

Still other example embodiments can change the presented outer surface of a bezel by movement of individual bezel components. For example, a bezel can have plural different faces. The bezel can be rotated about an axis by a service person to change the bezel face that is to be currently presented to the machine users. FIG. 44 shows a top view of a box shaped bezel section 810 having four differently configured (substantially square or rectangular) outer faces 812, 814, 816, 818. The bezel section 810 can be moved (rotated) ninety degrees about its axis 828 to cause an adjacent (next) face to be presented to a customer area adjacent the machine. FIG. 45 shows an angled side view of the bezel section shown in FIG. 44. Some fixed protrusions 820, 822 that are common to both Figures are also shown.

In an example embodiment a bezel comprises both an upper section and a lower section. These two sections are independently rotatable. The arrangement allows for an upper section of one complete bezel face to be used (mixed and/or matched) with the lower section of another complete bezel face. Thus, the arrangement enables the generation of even more different combinations (configurations) of usable bezel faces. As shown in FIG. 45, each of the four sides 812, 814, 816, 818 of the upper bezel section 810 can include a cutout 824, 826 that comprises one-half of the (total area of the) card slot. In other arrangements one of the upper or lower bezel sections can have a cutout that forms substantially the entire slot. A cutout can also be a portion (percentage) that is less than half of a slot.

Figure 46:
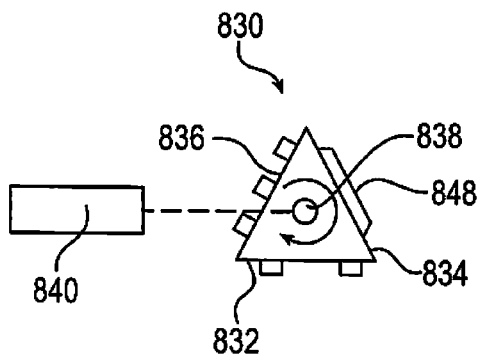
FIG. 46 shows a top view of an example rotatable bezel section having a substantially triangular shape.
Figure 47:
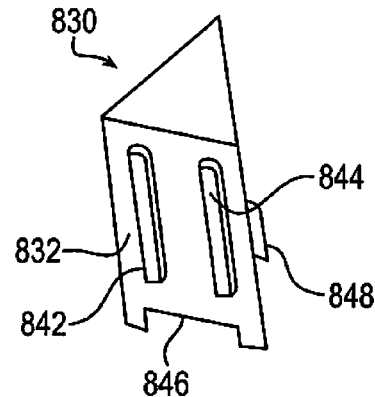
FIG. 47 shows an angled side view of the bezel section shown in FIG. 46.

FIG. 46 shows a top view of another multi-faced upper bezel section 830. The triangular shaped section has three differently configured outer faces 832, 834, 836. The bezel section 830 can be rotated (in either direction) 120° degrees about its axis 838 to cause a different face to be presented to a customer. A drive device 840 can be used to perform the rotation. FIG. 47 shows an angled side view of the bezel section 830 shown in FIG. 46. Protruding outward from the face 832 are two parallel vertically-extending raised members 842, 844. The face 832 also has a slot cutout portion 846. A raised member 848 extending from face 834 is also shown in both Figures.

In an example arrangement a key lock is used to hold a bezel (or a bezel section) of a transaction machine in its desired rotational position. The key lock can be positioned inside the machine. Alternatively, the key lock can be positioned so that it is accessible from the front (exterior) customer side of the machine. Thus, a bank employee who daily adds cash to the machine can also daily manually rotate the bezel to a new position. An unlocked rotatable bezel can also be easily removed and replaced (exchanged) by the bank employee. This allows for use of a plurality of multi-faced bezels, where no two faces are the same. In other arrangements, a machine computer can cause a multi-faced bezel to be rotated (by a computer controlled drive) to a new face immediately following each transaction. The rotation (and the time of rotation) can be predetermined to follow a set rotational pattern. Alternatively, the amount of rotations for any single face change can be randomly determined. As can be seen, bezel movement (or movement of a portion of a bezel) such as by rotation or pivoting, provides increased protection against successful fraudulent device installation and operation.

Figure 48:
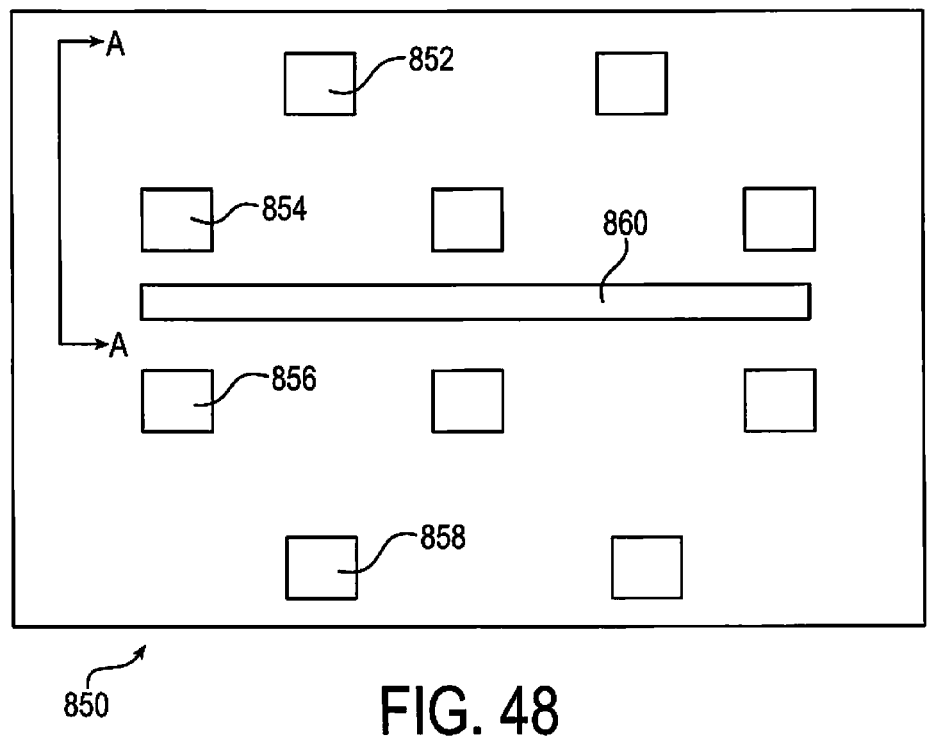
FIG. 48 shows a front view of the outer face of an example bezel.

FIG. 48 shows a front view of another example bezel 850. The bezel 850 includes a plurality of outwardly extendable projections 852, 854, 856, 858. A card reader entry slot 860 is also shown. A bezel's pattern of projections can be based on several variables, including the number of projections being used versus the effectiveness of the pattern. For example, it may not be cost effective to cover an entire bezel face in closely spaced projections. An example embodiment includes a computer program that can calculate effective different patterns of movable face members (projections) based on changeable factors such as configuration (e.g., security contributing angles) of the bezel face, the bezel face material (e.g., strength, thermal expansion properties, etc.), bezel size, other security features employed (e.g., non-stick coating), climate, assessment of fraud risk for the intended geographic location, cost, etc.

Figures 49, 50:
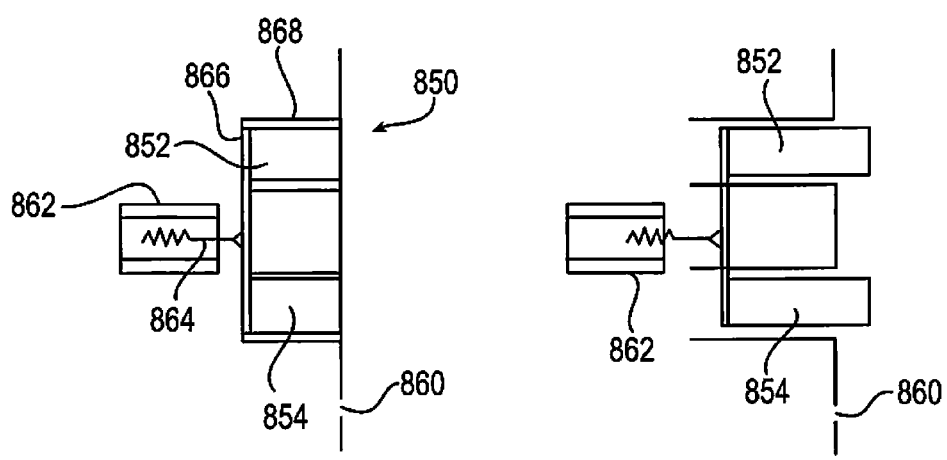
FIG. 49 shows a side view taken along A-A in FIG. 48, with projections retracted.
FIG. 50 shows a side view taken along A-A in FIG. 48, with projections extended.

FIG. 49 shows a side view of an upper portion of the bezel 850 taken along A-A in FIG. 48. The upper portion includes the projections 852, 854 located above the card slot 860. In FIG. 49 the projections 852, 854 are in their non-extended (flush) position. FIG. 50 also shows a side view of an upper portion of the bezel 850 taken along A-A in FIG. 48. However, in contrast to FIG. 49, the projections 852, 854 in FIG. 50 are in a fully extended position. That is, the outer surface of the projections 852, 854 can be moved from a position (FIG. 49) that is substantially flush with the bezel face to another position (FIG. 50) that is extended outward a predetermined distance from (relative to) the bezel face. The card entry slot 860 is also shown in the FIGS. 49 and 50.

In an example embodiment an electric motor 862 drives a screw rod 864 connected to a plate 866. The plate 866 connects to the projections. The motor 862 can be operated to move the projections outward and inward relative to their guide housings 868. The fixed housings 868 each include at least one slot through which the plate 866 can respectively move. In one example embodiment all of the projections (including those located above and below the card slot 860) are connected to the plate 866 and driven by a drive device (e.g., motor). In other example embodiments all projections located above the card slot are operatively connected to a first plate and a first drive device, whereas all projections located below the card slot are operatively connected to a second plate and a second drive device.

It should be understood that other arrangements for operatively connecting a plurality of projections (or a single projection) to a drive device can be used. It should also be understood that other drive devices and/or arrangements can be used to cause the projections to be moved (driven) in an outward direction (toward a customer area). For example, a mechanical, electrical, electro mechanical, fluid, or magnetic drive member can be used. Biasing arrangements can also be used to move (push or pull) the bezel face components (projections) either outward or inward.

An example embodiments also allow for changing the distance which certain movable surface portions (projections) are outwardly moved. That is, the projecting distance can be periodically varied. Some movable portions may be moved only part of their maximum distance, whereas other movable portions may simultaneously be moved their maximum distance. As can be appreciated, the varying of outward movement results in different bezel face configurations.

By periodically changing the outer contour of a bezel face, an attached fraudulent device (such as a card skimmer) may become dislodged from the bezel surface. Alternatively, a changed contour may cause a skimmer to be rearranged so that the skimmer becomes more noticeable, either visually by a person or by machine sensors or cameras. The novel ability to outwardly/inwardly move bezel portions allows for machine computer programming to cause a different facial configuration to occur after every customer transaction session.

In other example embodiments a bezel includes a display screen device. A computer associated with the automated banking machine controls the data that is output by the bezel display. For example, the outputted data can comprise data that a potential machine user can verify as correct, such as the current time and/or date, bank name, bank branch address, etc.

The data output through the bezel display screen can also be correlated by a computer with information this is concurrently output through the (larger) user display screen, such as the user display screen 36 shown in FIG. 1. For example, the user display screen may notify the potential machine user to check whether the bezel display is currently displaying a specific code. That is, for normal operation the specific code is visible (or indicated or identified) on both the user display and the bezel display. The absence of the code on the bezel display, or an inability of the potential user to see the code on the bezel display, can be an indication of the presence of a (view blocking) card skimmer or an unauthorized bezel. The code can be predetermined or randomly generated. A new code or password can be provided after each transaction. The sophisticated computer programming that causes the two displays to simultaneously output the same code would act as another deterrent to success of a fraud device attached to the machine.

In other embodiments other (non identical) data can be correlated. For example, the user display can be used to inform a person (via a displayed text message) to verify that the correct date/time is displayed on the bezel display before inserting their card into a card slot.

In another example the bezel can have an indicator (e.g., an indicator light such as an LED). The indicator can be in addition to or alternative to the bezel display. The machine can cause a plurality of different colors to be individually output by the bezel's indicator. The color being output through the indicator should be visible to a customer. The user display can then ask a person to verify whether a specific color is being output by the bezel indicator.

In still other embodiments card entry into a valid card slot can be normally blocked by the machine. The potential machine user may be required to verify through user input (e.g., to a touch screen user display) that the accessible card slot is closed. For example, the machine can (via displayed instructions) request the user to try to insert only a non-stripe portion of their upside down card into the accessible card slot (which may be a fraudulent slot). The potential machine user may also be required to verify other data, such that the current date/time is correct and/or that the displayed codes match. Following user input corresponding to the required verifications, the card slot can then be opened (unblocked) by the machine. The user can then insert their card into the deemed-valid card slot to enable reading of user data from the card. It should be understood that combinations of arrangements involved with customer validation of the accessible (visible) card slot can be used. A plurality of validation steps can be conducted and/or required by the machine. Additionally, the combinations and arrangements are also applicable to customer validation of other reading devices (e.g., a biometric reader).

As previously discussed, a bezel can be positioned in an area relatively close to a card reader of an automated banking machine. In another example embodiment an outer surface portion of the bezel can comprise a flexible material, such as plastic or rubber. An actuator can be operated to cause the contour of the flexible outer surface of the bezel to be changed. The actuator can be mounted on the bezel. Alternatively, the actuator can be mounted in the machine at a location adjacent to the bezel.

Suitable driving circuitry can move the actuator so that the outer contour of an outer surface of the bezel is physically changed. The change can be temporarily, with the flexible material returning to its original shape (e.g., its shape prior to being flexed). By periodically changing an outer surface portion of a bezel, a skimmer that was attached to the bezel outer surface portion may be dislodged. Thus, the ability of example bezels to have their external form modified by flexing can also assist in reducing fraud at automated banking machines.

An outer surface portion of the bezel can also comprise other shape-changing materials, such as shape memory alloys, piezoelectrics, electroactive polymers (EPAs), superelastic carbon nanotube aerogel, etc. Additional materials can include Mylar®, etc. Flexible elastic packaging materials may also be used. The materials may also be covered by a loose layer of a protective stronger material, such as Kevlar®. Combinations of materials are also useable.

In an example embodiment a flexible outer skin portion (e.g., a flexible plastic or rubber portion) of a bezel can be expanded/contracted through operation of an actuator that provides an increase/decrease in pressure applied against the portion. For example, air may be added to a sealed chamber to provide the increase in pressure. The chamber can act as a bellows or baffle. The baffle can have separate chambers that sequentially expand to cause a wave (or ripple) effect on the flexible material (skin) of a bezel. Alternatively, a drive piston may be used to force cylinder fluid (e.g., liquid, air) against the flexible material.

FIG. 51 shows an example of a bezel 870 with its outer skin 872 expanded by fluid pressure from an air-providing (pneumatic) actuator 874. The skin (which can have a balloon like expanding property) is inflated by the increased air pressure. As shown in FIG. 52 the continuous sealed skin 872 surrounds the card slot 876 of the bezel 870. Thus, a single actuator can be used to changed the shape of the bezel's outer surface both above and below the card slot 876. In other embodiments plural actuators can be used to respectively inflate separately segregated (independent) sealed partial sections of the total outer skin surface.

In other example embodiments a movable member may be mechanically slid or rolled against the flexible (elastic) bezel outer surface to push (stretch) the bezel skin in an outward direction (e.g., toward the customer area). For example, a roller (or ball) can have an outer surface that extends further outward than the face of the skin when the roller is rolled (horizontally) across the skin. The movement of the (outwardly pushing) roller causes a wave (of expansion and contraction) to move across the skin. That is, the wave is at its peak where the roller contacts (and pushes outward) the skin. As the roller continues to move, the peak correspondingly continues to move. Thus, the moving roller creates a moving wave. The skin at a specific skin area returns (flexes back) to its normal (non stretched) condition after the roller has passed that specific skin area.

FIG. 53 shows an example of an example wave-creating arrangement applicable to a bezel surface. A cylindrical roller 880 is used to apply a pressure force against the interior side of a bezel skin 882. An angled side view of the roller 880 is shown in FIG. 54. As can be seen, as the roller 880 horizontally moves (in a direction of the arrow) across the flexible skin 882 it creates an outwardly directed wave 884 at the point of contact. In an example embodiment the roller 880 is attached to a slide housing 886 that slides on at least one rail 888. The housing 886 can be pushed, pulled, or driven along the rail 888. At least one biasing component 890 (e.g., a spring) acts to push the roller 880 away from the housing 886 in a direction toward the skin 882. End ramps 892 can be used to keep the roller 880 positioned inward (against the spring force) toward the housing 886 when a wave run is completed. In other example embodiments the force pushing the roller 880 outward (toward the skin) can be provided through use of a conventional drive member (e.g., screws, motors, magnets, etc.), which can then act to release/remove the applied force.

In still other example embodiments, the surface contours (including surface angles) of a bezel body structure can be such that users of the machine are forced to insert cards into the card slot in particular (intended) ways. For example, bezel structures can be configured so as to make it highly awkward for a machine user to insert the card using anything other than their right hand. Implementing this bezel configuration provides predictability regarding the areas adjacent the fascia in which a user's hand will be positioned when inserting a card into the machine. By forcing the use of the right hand of the user for card insertion, this also indicates where the hand structure will be positioned during normal machine/user operation.

In example embodiments, radiation or other types of detectors of the types previously discussed are operative in conjunction with one or more suitably programmed processors to detect the presence of the user's hand adjacent thereto. Further, sensors located in other areas of the fascia where a user's hand would not normally be positioned may be used to detect conditions which correspond to a current attempt to install an unauthorized card reading device.

A bezel configuration can have a particular recessed area that leads to the card slot. Thus, because a user is required to manually insert their hand/fingers into the recessed area during insertion of their card into the card slot, the configuration generally assures that the user's (card gripping) hand/fingers will not be positioned in/at a different area of the bezel that is located away from the recessed area during card insertion/removal. For example, this different area of the bezel may be outwardly located from the (normal) card slot. Thus, detecting card insertion without sensing that a hand was moved into the recessed area (e.g., moved in expected close proximity to the card slot) during the card insertion can be an indication that a fraud device was present between the hand and the (normal) card slot during the card insertion.

Card insertion may be based on proximity sensors which detect the presence of the card in the card slot. Card insertion may also be based on magnetic stripe detection. For example, in circumstances where the magnetic stripe of a card is detected, sensors of the type previously described can be operative to sense the presence of structures that are adjacent the slot and outside of the normal area where the user's hand would be expected to be positioned. Thus the sensing of structures in these areas can be analyzed to more reliably provide an indication of an abnormal condition, such as the installation of a skimmer. This can be done in the manner previously discussed or using other types of sensors.

In other embodiments, a user's card (or magnetic stripe thereof) can be detected while it is still located exterior of the bezel's (hand receiving) recessed area. At the approximate time of this card detection, sensing of structure adjacent the card slot or in the recessed area can also be indicative of the structure being unauthorized. That is, if the card is not yet in the recessed area (or adjacent the card slot), then the user's hand also would not yet be in the recessed area.

When conditions corresponding to the installation of a skimmer are detected, appropriate steps can be taken, such as ceasing operation of the machine, sending messages to a remote security computer, and the like. It should be understood that the approach of configuring the bezel so that a user's particular hand and fingers are generally forced to be positioned in a particular location and not in another location when inserting or removing a card from the slot, is example of approaches that can be taken to facilitate the detection of the presence of unauthorized reading devices. In other embodiments, other approaches can be used.

Figure 55:
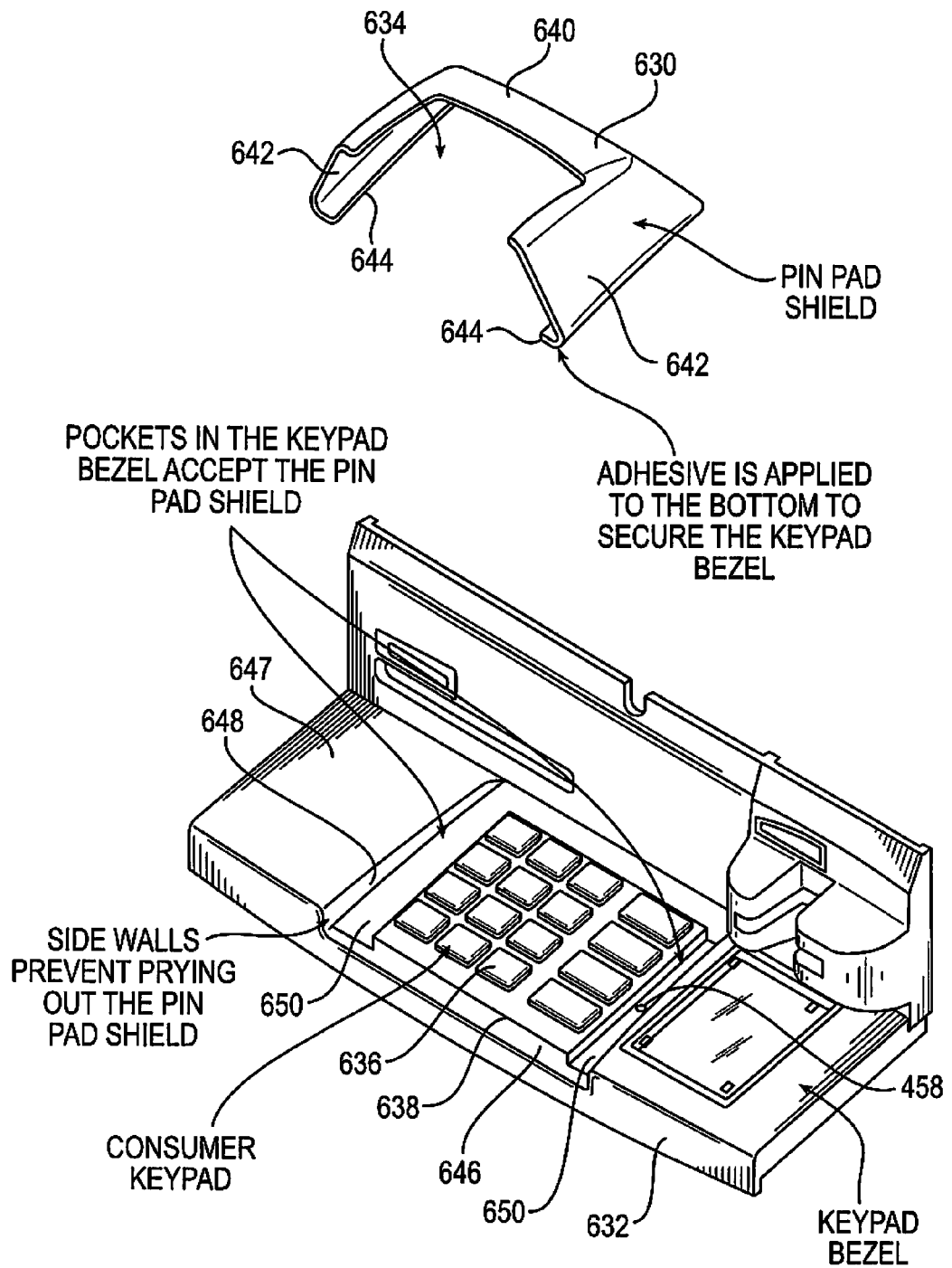
FIG. 55 is an exploded view of a portion of a machine fascia and a keypad cover.

In still other embodiments, automated banking machines can be operative to detect conditions where criminals may have tampered with the machine so as to install unauthorized user input interception devices. FIG. 55 shows a portion of a machine fascia generally indicated 647 which includes the machine keypad 638. Keypad 638 may be of the type previously discussed and includes a plurality of keys 636. In an example embodiment the keys of the keypad are positioned generally inwardly relative to a front surface of the fascia 632.

In an example embodiment, pockets 650 are positioned in the fascia portion on each side of the keypad. Pockets 650 of an example embodiment include recesses which are adapted to engage leg portions 644 of a keypad cover 640. In an example embodiment the pockets are configured to hold/receive adhesive or other suitable material for engaging the leg portions 644 of the keypad cover 640 to the fascia portion 647. Alternatively, the pockets can receive mechanical connecters/fasteners for securing the leg portions 644 to the fascia portion 647. Of course these approaches are example, and in other embodiments other approaches may be used.

Figure 56:
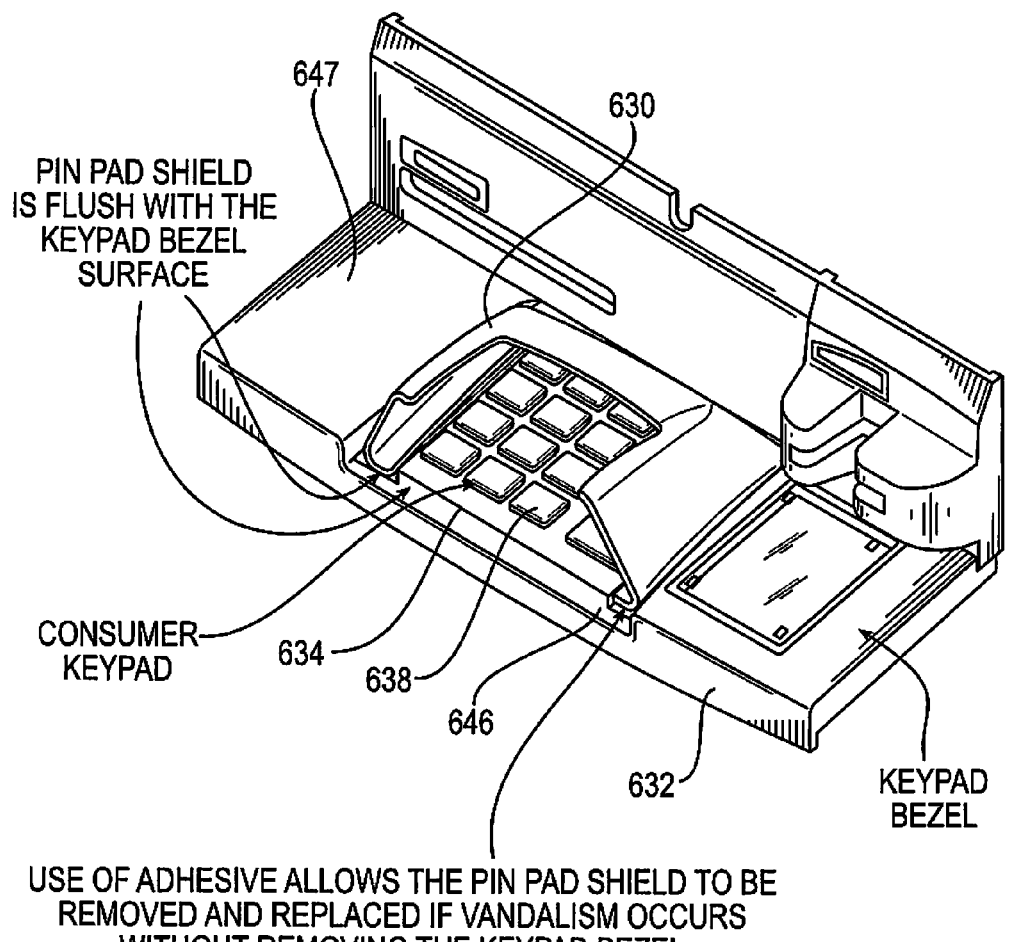
FIG. 56 shows the portion of the machine fascia of FIG. 55 including the keypad cover installed thereon.

In an example embodiment the attached keypad cover 640 is configured to extend generally above the keypad so as to prevent the unauthorized observation of inputs therethrough by criminals, either directly (e.g., direct line of sight) or indirectly such as through the use of miniature cameras installed in an area adjacent the machine. FIG. 56 shows the keypad cover 640 installed to the fascia portion 647. That is, FIG. 55 shows a potentially fraud condition in which the keypad cover has been removed, whereas FIG. 56 shows a fascia operating condition in which the keypad cover is installed in its proper (normal) position overlying the keypad. Of course FIG. 55 can also be viewed as condition where the keypad cover has not yet been installed to the fascia portion.

The example keypad cover 640 includes a body 630 which is generally comprised of a flexible resilient material. The body 630 includes a pair of inward extending sidewalls 642. The upper portion of the keypad cover includes an opening 634. The opening 634 is generally configured to enable viewing of the keys of the keypad by a user positioned adjacent to the machine.

In an example embodiment, a user is able to extend their fingers into the attached keypad cover to engage the keys of the keypad while simultaneously visually observing the location of the keys so as to provide the desired finger inputs. The body 630 of the keypad cover 640 can be comprised of resilient material having a resilient nature that allows flexing of the cover to accommodate the movement of the user's hand therein. Thus, the resilient material facilitates the user's engagement with the keys. These approaches are example, and in other embodiments other approaches may be used.

In order to provide enhanced security, some example embodiments include sensors that are operable to determine if the keypad cover 640 has been removed from its area above the keypad. This condition is determined because criminals who may wish to install a false keypad overlay often cannot install such a overlay with the keypad cover in place. In example embodiments, one or more sensors 458 are installed adjacent one or more of the pockets 650 positioned on each side of the keypad. The sensors 458 are able to detect properties that are indicative of whether the keypad cover 640 has been removed relative to the sensors or pockets. In some example embodiments, the sensors 458 may include a photosensor, infrared sensor, ultrasonic sensor, contact sensor, and/or another suitable sensor that is operative to sense a change in conditions if the adjacent leg portion 644 is no longer in adjacent relation thereto.

In an example embodiment the sensors 458 are in operative connection with suitable interface circuitry 460 which operates to receive signals from the sensors. The interface circuitry 460 provides one or more outputs to circuitry that includes at least one processor 462. The at least one processor 462 includes associated programming therein that is operative to analyze signals representative of the conditions detected by the at least one keypad cover sensor 458. The processor 462 is operative to determine when the signals correspond to a change which is indicative of removal of the keypad cover 640. Upon determining that such a removal has occurred, the at least one processor/circuitry 462 operates to send at least one message to a terminal controller 464. The terminal controller is operative to take steps in accordance with its programming, like those previously discussed. Such steps may include, for example, operating to cause the machine to no longer operate to perform transactions. Alternatively or in addition, the terminal controller 464 may operate to send one or more notification (alert) messages to a remote computer so as to notify bank personnel, law enforcement, or other individuals that potential tampering with the machine has occurred.

In other example embodiments, one or more sensors 646 may be positioned generally beneath the keypad cover. Sensor 646 is in operative connection with suitable interface circuitry 466 that receives the signals from the sensor so as to evaluate signals received therefrom. In example embodiments, the sensor 646 may include an infrared sensor that includes an emitter and receiver, and is operative to sense a distance to an interior surface of the keypad cover. Such a sensor may be operative in conjunction with interface circuitry 466 to determine the distance to an interior surface of the overlying keypad cover 640. Thus, for example, if the keypad cover has been removed, there will generally be no overlying surface sensed, especially at the expected distance based on a prior distance determination. This cover-removed condition can be determined through operation of at least one processor, such as processor 462.

Furthermore, if an unauthorized overlay has been positioned above the keypad (regardless of whether the keypad cover is present or absent), then the total distance sensed by the at least one sensor 646 will be small and/or reduced relative to a prior distance reading (i.e., the expected distance). As a result, such detected changes can also be identified as corresponding to a possible fraud condition.

In an example embodiment, signals from the at least one sensor 646 are analyzed through operation of interface circuitry. In an example embodiment the interface circuitry 462, which includes at least one processor, is combined with the interface circuitry 460 associated with sensor 458. However, it should be understood that in other embodiments separate interface circuitry and processors may be provided for analyzing signals from the various sensors 458, 646 that may be used for sensing possible fraud conditions.

As previously discussed, the at least one processor of the interface circuitry 462 can also be used to detect when signals corresponding to conditions sensed by at least one sensor 646 correspond to either removal of the keypad cover and/or the installation of an overlying keypad overlay. Responsive to such a risk determination, the processor of circuitry 462 is operative to send an indication thereof to the terminal controller 464.

The terminal controller 464 interfaces with the circuitry 462 so that analysis for potential fraud conditions is done at times when a user's fingers should not be in a position to be sensed within the keypad cover. This may include, for example, times when no transaction is being conducted at the machine.

In other embodiments, at least one sensor 646 may include an inductance sensor which may work in conjunction with the other connected circuitry to sense a change in inductance in an area of the keypad cover. Such a change can be indicative of keypad cover removal. Alternatively or in addition, such a change in inductance may correspond to the installation of an overlay so as to intercept PIN inputs. The inductance sensing arrangement can allow for a user's member being within the keypad cover to be taken into consideration.

As can be seen, various example embodiments have been provided for using sensors to sense the removal of a keypad cover. These embodiments include situating sensors in the (two) leg areas where the keypad cover legs respectively attach to the fascia in the side areas adjacent to the keypad. The leg sensors can sense when a keypad cover leg has been removed from its normal attachment position. These embodiments also include positioning at least one sensor so as to sense the distance to an overlying surface above the keypad. The sensor(s) can be used in verifying that the inside surface of the authorized keypad cover is present. The sensor(s) can also be used in verifying that the inside surface is in its expected position. For example, the sensor can sense whether the inside surface is much closer than normal. A determination of a closer (or further outward) cover can be an indication of a fraudulent cover. The sensing/detection of distances can be done during times when a user's fingers would not be expected to be adjacent to the keypad.

As previously discussed, inductance sensors and other types of sensors can also be used to verify if a keypad cover is present, absent, or out of normal position (e.g., a pre-measured and stored distance or position). Thus, example arrangements discussed herein can provide for immediate detection and automatic notification (via a computer message/warning) regarding removal of a keypad cover. The example ability to detect removal of a keypad cover can help thwart a criminal from clandestinely attaching a fraudulent keypad overlying structure, which structure may be capable of detecting (skimming) a customer's keypad inputs. Again, the example arrangements can assist in reducing fraud at automated banking machines.

Figure 57:
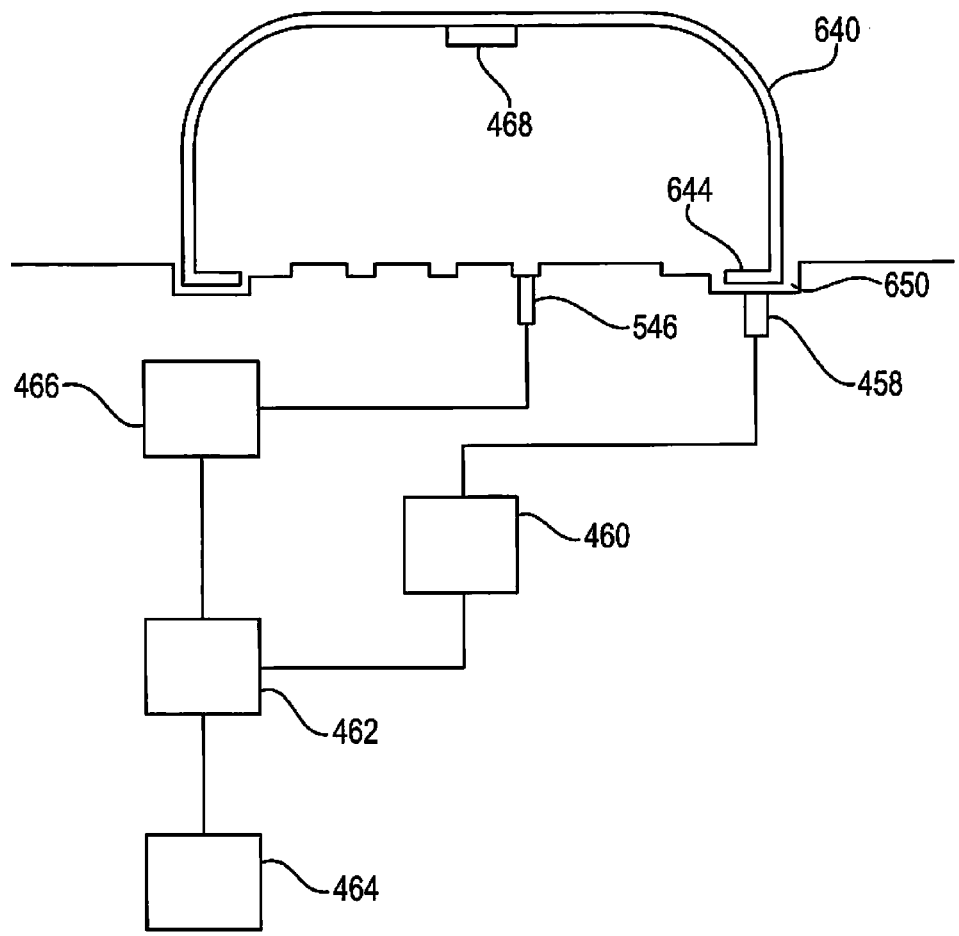
FIG. 57 is a schematic view of a portion of the fascia including the keypad cover including certain sensors for detecting fraud devices.

An inductance sensor adjacent to the keypad may also be operative to sense changes in the makeup of the structure of (or associated with) the keypad cover. For example, criminals may attempt to attach a micro-camera within the interior area of the keypad cover so as to view finger contacts with the keys. Such a micro-camera is represented schematically as 468 in FIG. 57. The installation of a micro-camera within the keypad cover will generally cause a change that is detectable by an inductance sensor or other sensor type. Such a change may be determined through operation of the at least one processor in the circuitry 462. The circuitry may operate responsive to the determination to provide at least one notifying output that corresponds to an indication of a probable fraud event.

In still other embodiments, sensor 646 may comprise one or more imaging sensors. Such imaging sensors may include sensors which are operative to capture image data corresponding to objects within the interior area of the keypad cover. Such sensors may include a complementary metal oxide semiconductor (CMOS) sensor or a micro/miniature camera. Such imaging sensors may determine visual changes to the interior of the keypad cover which may correspond to the installation of a camera or other device intended to intercept user inputs. In some example embodiments, the image data can be captured and analyzed through operation of one or more processors in the analysis circuitry so as to detect conditions during times when no user's fingers are present within the interior area. Changes which may correspond to an unauthorized camera installation within the keypad cover can be determined through operation of one or more processors and signals corresponding to the determination sent to the terminal controller. Of course these approaches are example, and in other embodiments other approaches employing the principles described may be used to determine conditions which correspond to probable tampering and/or the installation of criminal devices designed to accept user inputs.

As can be seen, various example embodiments have been provided for detecting the presence of a camera (or other fraudulent structure) installed within a keypad cover. As previously discussed, an inductance sensor can be positioned in the area of the keypad. The inductance sensor can sense a change in the properties of the keypad cover if a camera has been inserted therein. As previously discussed, another example approach is to have an authorized camera (or other imaging sensor) looking upward from the keypad toward the keypad cover. The camera is associated with a processor that can identify a structural and/or visible change within the inside of the keypad cover. By being able to determine a change in the appearance of the interior of the keypad cover, the presence of an unauthorized device can be determined.

As can be seen from the above discussions, an example embodiment includes an apparatus comprising an automated banking machine, wherein the machine is associated with at least one computer, wherein the machine includes a card reader, wherein the card reader includes a card entry opening, wherein the card reader is operable to read from user cards, user data that corresponds to financial accounts, wherein the card reader is in operative connection with the at least one computer, wherein the at least one computer is operative to cause the card reader to read user data from user cards, wherein the machine also includes a cash dispenser, wherein the cash dispenser is operable to dispense cash from the machine, wherein the cash dispenser is in operative connection with the at least one computer, wherein the at least one computer is operative, responsive at least in part to a determination that user data read by the card reader corresponds to a financial account with which a cash dispense transaction is authorized to be carried out with the machine, to cause the cash dispenser to dispense cash, wherein the at least one computer is also operative to cause the financial account to be assessed a value associated with the cash dispensed, wherein the machine also includes a housing, wherein the housing bounds an interior area, wherein the housing is associated with bezel support structure, wherein the bezel support structure is configured to operatively support different card slot bezels only one at a time, wherein the different card slot bezels are interchangeable with the machine, wherein the different card slot bezels include at least a first card slot bezel and a second card slot bezel, wherein the first card slot bezel includes a first card slot, wherein the first card slot bezel also includes a first exterior surface, wherein the first exterior surface comprises a first contoured profile, wherein the first contoured profile surrounds the first card slot, wherein the second card slot bezel includes a second card slot, wherein the second card slot bezel also includes a second exterior surface, wherein the second exterior surface comprises a second contoured profile, wherein the second contoured profile surrounds the second card slot, wherein the second contoured profile differs from the first contoured profile, wherein the differing contoured profiles are configured to reduce ability of a same fraudulent card reader being attachable adjacent to each of the first card slot and the second card slot, wherein the machine also includes at least one lock, wherein the at least one lock is in operative connection with the housing, wherein the at least one lock is operable to control access to the interior area, wherein when a respective card slot bezel of the different card slot bezels is operatively supported by the bezel support structure, then at least one fastener releasably holds the respective card slot bezel in fixed operatively supported engagement with the bezel support structure, and the at least one fastener is manually movable to release the respective card slot bezel from fixed operatively supported engagement with the bezel support structure, wherein when the first card slot bezel is operatively supported by the bezel support structure, then the first card slot is aligned with the card entry opening, which enables a user card to be moved in the first card slot to the card entry opening, wherein when the second card slot bezel is operatively supported by the bezel support structure, then the second card slot is aligned with the card entry opening, which enables a user card to be moved in the second card slot to the card entry opening.

Furthermore, in an example embodiment the machine includes a wireless reader, wherein the wireless reader is operable to wirelessly receive bezel data transmitted by a card slot bezel positioned adjacent the housing, wherein the at least one computer is operative to determine based at least in part on bezel data received by the wireless reader, whether an authorized card slot bezel is positioned adjacent the housing. Each of the different card slot bezels is an authorized card slot bezel, wherein each of the different card slot bezels is operative to wirelessly transmit bezel data, wherein the at least one computer is operative to determine based at least in part on bezel data received by the wireless reader, whether one of the different card slot bezels is positioned adjacent the housing. The at least one computer is operative to determine based at least in part on the bezel data received by the wireless reader, whether an authorized card slot bezel was removed from machine. The machine also includes at least one sensor, wherein the at least one sensor is operable to detect a card slot bezel operatively supported by the bezel support structure, wherein the at least one computer is in operative connection with the at least one sensor, wherein the at least one computer is operative to determine based at least in part on detection of a respective card slot bezel by the at least one sensor, whether the respective card slot bezel is properly positioned relative to the bezel support structure. When the first card slot bezel is operatively supported by the bezel support structure, then at least one first fastener releasibly holds the first card slot bezel in fixed operatively supported engagement with the bezel support structure, wherein the at least one first fastener is manually movable to release the first card slot bezel from fixed operatively supported engagement with the bezel support structure. The at least one first fastener is only accessible from within the interior area. When the second card slot bezel is operatively supported by the bezel support structure, then the at least one first fastener releasibly holds the second card slot bezel in fixed operatively supported engagement with the bezel support structure. The first card slot bezel can include the at least one first fastener, wherein the at least one first fastener is an integral part of the first card slot bezel. The bezel support structure includes at least one connection slot, wherein the at least one first fastener is resilient, wherein the at least one first fastener is configured to snap fit into the at least one connection slot, wherein the bezel support structure includes the at least one first fastener. The first card slot bezel includes at least one connection slot, wherein the at least one first fastener is resilient, and the at least one first fastener is configured to snap fit into the at least one connection slot. When the second card slot bezel is operatively supported by the bezel support structure, then the at least one first fastener releasibly holds the second card slot bezel in fixed operatively supported engagement with the bezel support structure. The at least one first fastener can be removably attachable to both the first card slot bezel and the bezel support structure, wherein the at least one first fastener comprises at least one screw. The at least one first fastener can include a bezel lock, wherein the at least one bezel lock is in operative connection with the first card slot bezel, wherein the at least one bezel lock is operable to lock the first card slot bezel to the bezel support structure, and wherein the at least one bezel lock is accessible from outside of the machine. Each respective different card slot bezel can comprise a bezel insert and a bezel housing, wherein for each respective different card slot bezel: the bezel housing is configured to be held in fixed operatively supported engagement with the bezel support structure; the bezel insert is removable attachable to the bezel housing; and the bezel insert includes the contoured profile; wherein the contoured profile differs from every other contoured profile of the different card slot bezels.

As can be seen from the above discussions, another example embodiment includes an apparatus comprising an automated banking machine, wherein the machine includes a user data reader, wherein the user data reader is operable to read user data that corresponds to financial accounts, wherein the machine also includes a cash dispenser, wherein the cash dispenser is operable to dispense cash from the machine to an authorized user of the machine during a cash dispense transaction, wherein the machine also includes a housing, wherein the housing bounds an interior area, wherein the machine also includes a bezel, wherein the bezel is removably attached to the housing, wherein the bezel includes a user data receiving area, wherein the user data reader is operable to read user data provided to the user data receiving area, wherein the bezel includes an exterior surface, wherein the exterior surface has a contoured profile, wherein the contoured profile is adjacent the user data receiving area, wherein the bezel also includes bezel data, wherein the bezel data is usable to identify the bezel as a bezel authorized for use with the machine, wherein the machine also includes a bezel data reader, wherein the bezel data reader is operable to wirelessly read the bezel data from the bezel.

Furthermore, in the another example embodiment the user data reader comprises a card reader, the card reader includes a card accepting area (or card reader entry opening), and the user data receiving area comprises a card slot. The machine includes at least one of: (i) the bezel including an RFID tag, wherein the RFID tag includes the bezel data, the bezel data reader comprising an RF reader, wherein the RF reader is operable to wirelessly read the bezel data from the RFID tag; and (ii) the bezel including an NFC chip, wherein the NFC chip includes the bezel data, the bezel data reader comprising an NFC reader, wherein the NFC reader is operable to wirelessly read the bezel data from the NFC chip. The bezel can include an RFID tag, wherein the RFID tag includes the bezel data, wherein the bezel data reader comprises an RF reader, wherein the RF reader is operable to wirelessly read the bezel data from the RFID tag, wherein the RFID tag is programmable, wherein the machine is operable to store bezel data in the RFID tag, and wherein the machine is operable to update bezel data stored in the RFID tag after each transaction. The bezel can include an NFC chip, wherein the NFC chip includes the bezel data, wherein the bezel data reader comprises an NFC reader, wherein the NFC reader is operable to wirelessly read the bezel data from the NFC chip, wherein the NFC chip is programmable, and wherein the machine is operable to store bezel data in the NFC chip, and wherein the machine is operable to update bezel data stored in the NFC chip after each transaction. The machine includes an attachment arrangement with which respective different bezels are respectively individually removably attachable to the housing, wherein the bezel comprises a first bezel that is attached to the housing via the attachment arrangement, wherein the apparatus further comprises a second bezel, wherein the second bezel is attachable to the housing via the attachment arrangement, wherein the second bezel includes a user data receiving area, wherein the user data reader is operable to read user data provided to the user data receiving area of the second bezel, wherein the second bezel includes an exterior surface, wherein the exterior surface of the second bezel has a different contoured profile that differs from the contoured profile of the first bezel, wherein the different contoured profile is adjacent the user data receiving area of the second bezel, wherein the second bezel includes different bezel data, wherein the different bezel data is usable to identify the second bezel as a bezel authorized for use with the machine, and wherein when the second bezel is attached to the housing via the attachment arrangement, the bezel data reader is operable to wirelessly read the different bezel data from the second bezel.

As previously discussed, different embodiments can provide different methods for interfering with or jamming fraudulent card readers (e.g., skimmers). In some embodiments (e.g., FIG. 41) electromagnetic radiation is directed toward an area outside of and adjacent to the card entry slot. An electrical coil or toroid may be used to emit the electromagnetic radiation. The emitted radiation can be in the form of electromagnetic pulses. The pulses may be randomly varied in frequency and duration. In some embodiments the emitters can transmit signals on a plurality of different frequencies to produce so much noise that the information encoded on the magnetic stripe of the card cannot be determined by a skimmer. The emitters can also vary their emitted signals in correspondence with variations in speed and/or direction of the card as it is moved toward the card entry slot. For example, a processor, based on received card speed data, can vary the interference radiation being output so as to achieve maximum jamming to prevent unauthorized interception of valid card data.

Further example embodiments allow for jamming a fraudulent card reader from properly reading valid card data. For example, example jamming can further include an ability to: transmit harmonically related frequencies; transmit magnetic signals in binary; transmit various wave forms; transmit random frequencies; transmit pulses that hide a card's reversal of direction; transmit jamming signals by use of resonant antennas; and/or transmit the jamming signals earlier. Additional jamming can be provided by transmitting at least one frequency that matches at least one speed of the card.

A card skimmer may have a coil that can convert a magnetic field into electrical signals. A read head can then read card data from these electrical signals. The example jamming signals are configured to interfere with the ability of the skimmer to read data (in the clear) from a magnetic field.

The jamming can be provided by use of a jammer (which may also be referred to herein as a jamming device or a jamming system). The jammer can comprise at least one emitter, at least one processor, sensors, and at least one data store. The emitter is controlled by the processor. The processor is in operative connection with the sensors and the data store. The sensors can be used to notify the processor when a card is being inserted toward the machine's card reader. Upon detection of a user card, the processor can cause the emitter to produce magnetic field jamming signals. Alternatively, an emitter may be operated to continuously produce the jamming signals, regardless of any card detection.

Different sensor arrangements can be used to sense the presence of a card. The sensors may be proximity sensors, and/or magnetic stripe sensors, etc. For example, one or more sensors can be located adjacent to the card entry slot. Other arrangements may have sensors located outwards from the slot, such as in a fascia portion that leads to the slot. Another arrangement may have sensors that detect the opening of a path gate that provides card access to the card reader. Different arrangements and methods for sensing cards may be of the manner described in U.S. patent application Ser. No. 13/404, 643 filed Feb. 24, 2012 and Ser. No. 13/667,620 filed Nov. 2, 2012, the disclosures of which are herein incorporated by reference in their entirety.

In example embodiments, the magnetic field jamming signals are configured to have a strength that is sufficient to interfere with the reading ability of a skimmer. However, the jamming signals are not sufficient to erase data from a high-coercivity magnetic stripe (or damage the stripe).

The jamming signals can also be directional. That is, they can be purposely pointed to the location(s) where a skimmer would likely be attached. As a result, the jamming signals would not be presented (active) in an area that would cause interference with the reading ability of the machine's card reader.

Figure 58:
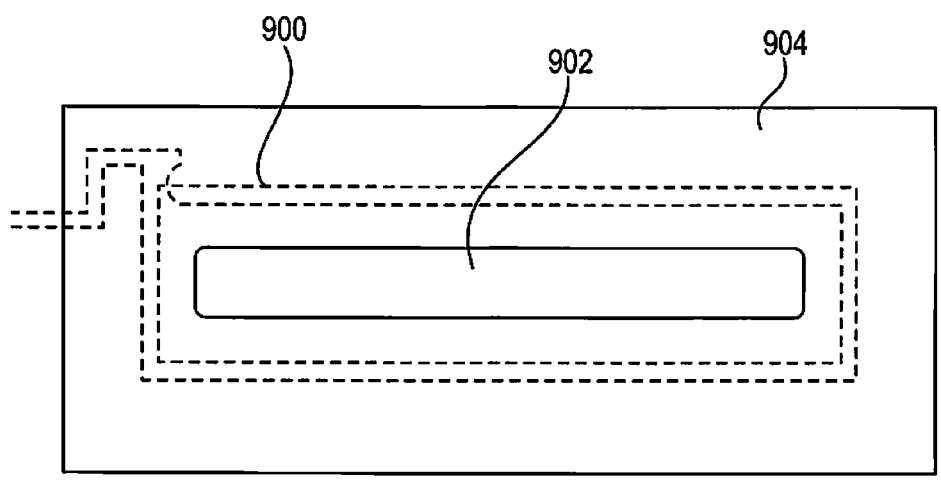
FIG. 58 shows a coil emitter adjacent a card inlet slot.

FIG. 58 shows a magnetic field emitter 900 in the form of a coil. The coil emitter 900 can surround a card entry slot 902 to a card reader. The coil is operable to convert electrical (jamming) signal(s) into a magnetic field(s). The generated magnetic field can cover an area outwardly adjacent to the slot and also at least a portion of the slot area. The slot can part of a single bezel component 904. The coil can be located inside (integral with) the bezel structure. Alternatively, the coil can be attached to the rear side of the card entry slot bezel 904. The bezel can be part of a machine that has a card reader. For example, the bezel may be a replaceable part of a user fascia for an automated banking machine.

Figure 59:
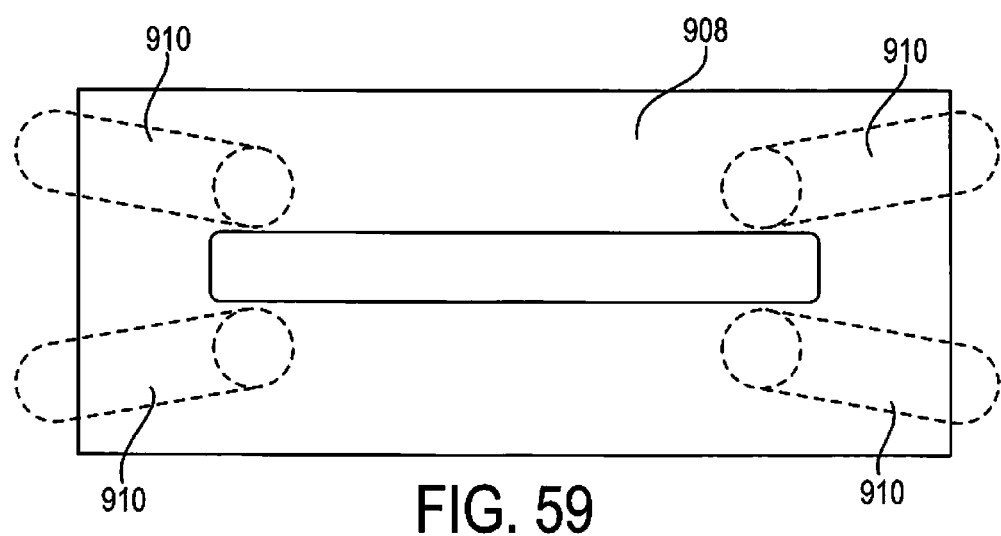
FIG. 59 shows directional emitters adjacent a card entrance slot.

FIG. 59 shows a card entry slot arrangement 908 that is similar to the arrangement shown in FIG. 58, but a different type of emitter is employed. For example, directional magnetic field emitters 910 can be used. The emitters may have the shape of a cylindrical tube. Each emitter 910 is operable to generate a magnetic field that directionally covers an area both in and outward of the card entry slot. The outwardly directed signals can limit magnetic field interference to the interiorly located card reader. The emitters may be operated in combination, in rotation, and/or randomly. For example, a first emitter may output a first jamming signal followed by a partially overlapping second jamming signal emitted from a second emitter.

The jammer system may be part of an anti-skimmer kit or unit. The kit can be retrofit to an automated banking machine. That is, the kit can be an aftermarket add-on device that gets installed on an existing automated banking machine. In some embodiments the kit can be installed without being integrated with the machine circuitry (e.g., machine controller). However, in other embodiments the installed kit can be integrated into the circuitry (and control) of the machine, including the circuitry of the card reader. The kit can also include its own power source and operate completely independent of an automated banking machine.

In an example embodiment a jammer is operable to transmit (outputs) magnetic field signals at two or more frequencies that are harmonically related to the magnetic field frequencies used by a card skimmer to read the data from the magnetic stripe of a user card. By outputting magnetic fields at harmonically related frequencies to magnetic fields from which the card skimmer is trying to capture data, the jamming signals can be more effective at interfering with the ability of the skimmer to read data (in the clear) from a magnetic field.

An example automated banking machine can read magnetic stripe data from a plurality of different cards. Such cards include bank cards, credit cards, debit cards, driver's licenses, etc. A card's magnetic stripe can comprise multiple different tracks. For example, track 1 may include data that is related to a user's name. Track 2 may include data that is related to an account number. Track 3 can include miscellaneous data that may be unique to the card system. A card may have tracks 1 and 3 being 210 bits per inch, with track 2 being 75 bits per inch. Each encoded character on the magnetic stripe can comprise a number of bits. Several schemes exist to determine whether a bit is a 1 or a 0. For example, where each bit has the same physical length on the stripe, then a polarity change in the bit can be used to indicate a 1. The absence of such polarity change can indicate a 0.

Some readers can read a card while the card is being manually moved. The speed of the card corresponds to the frequency of the stripe's magnetic field. Again, each bit (0 or 1) has the same physical length (distance). Thus, the speed (distance/time) of a card can be determined by measuring the time (one clock cycle) from when a bit begins to when the bit ends. The beginning of a track can include a series of 0 bits. The speed of these series of 0 bits can be used as the speed of the whole card. That is, the speed (frequency) of a card can be determined by measuring the speed of only a few initial bits. It follows that whether a bit is a 1 or a 0 bit can then be determined based on whether a polarity change occurred within the time of one bit cycle.

Figure 60:
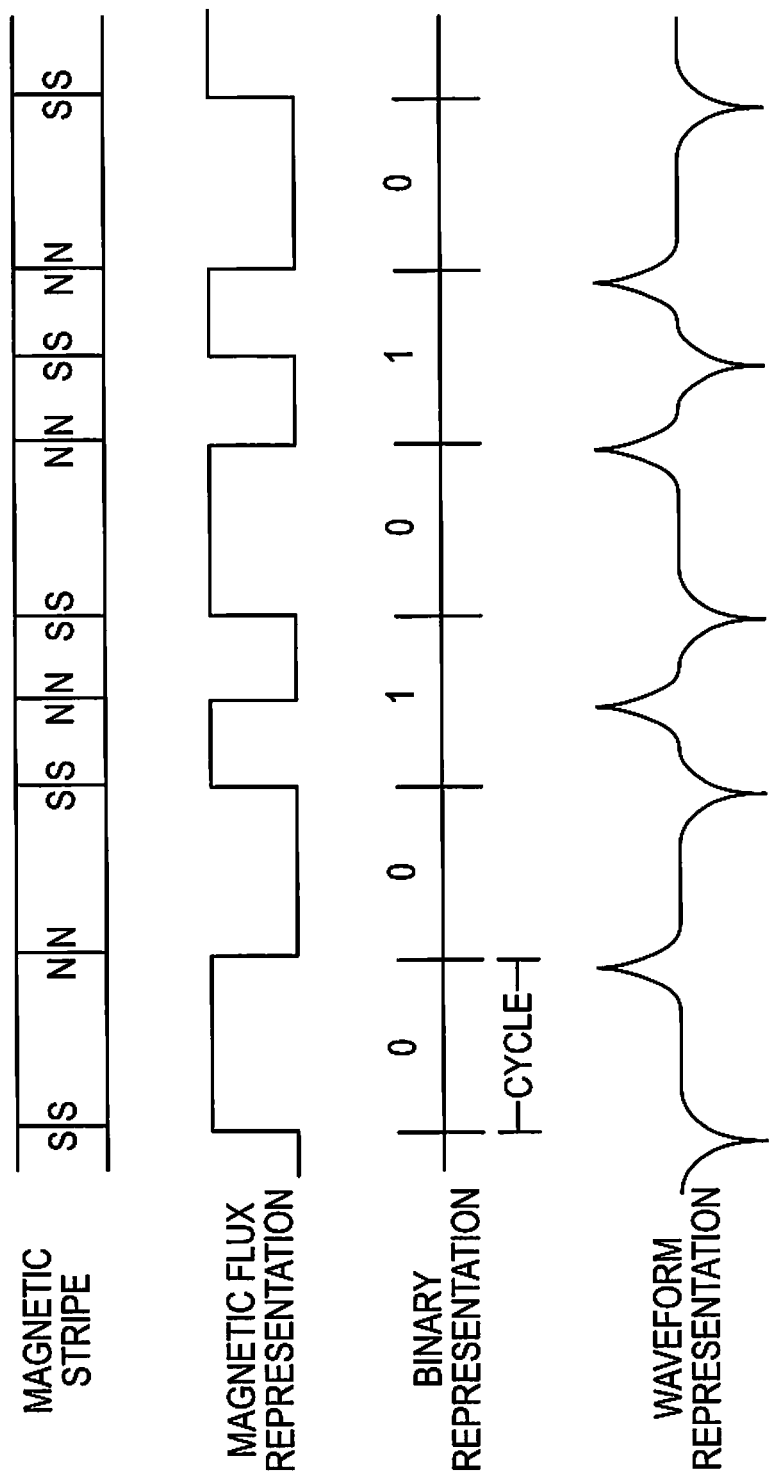
FIG. 60 shows corresponding relationships among a magnetic stripe, magnetic flux, bits, and waveform.

FIG. 60 shows a portion of a magnetic stripe of a user card. Also shown are the related characteristics of magnetic flux, bits, and waveform which directly correspond to the magnetic stripe portion. A bit length of one clock cycle is also shown. Example embodiments discussed herein prevent a skimmer from being able to accurately read magnetic stripe data in such magnetic flux, bits, and waveform in the clear. In some embodiments interference is generated by signals that prevent (interfere with) skimmer reading. In other embodiments false data is generated for the skimmer to read. For example, the skimmer can read a total amount of data which includes the false (invalid) data intermingled with the (valid) card data.

A track 2 format may include a 5-bit scheme (4 data bits+1 parity) which allows for sixteen possible characters, which are the numbers 0-9 plus six punctuation symbols. The data format may be as follows: a start sentinel (one character); the primary account number (PAN); a separator (one character); a card expiration date; a service code; discretionary data; an end sentinel (one character); and a longitudinal redundancy check (LRC). The LRC can be a validity character calculated from other data on the track. The track data can be related to each other in a ratio. For example, both the track 1 data and the track 3 data may be related to the track 2 data in a 2.80:1 ratio (i.e., 210175). This ratio can indicate that there are 2.80 as many flux reversals on track 1 and track 3 in comparison to track 2.

The example jamming embodiment can take advantage of track ratio. A skimmer head may be designed to primarily try to capture a stripe's account number data on track 2. However, card data in the various tracks may be received at different rates by the skimmer head. An example embodiment includes using a jammer to transmit false card data in a magnetic field frequency ratio that is close to the magnetic stripe ratio. For example, the outputted magnetic field frequency ratio can be set at 3:1. This ratio would allow the interference data to correspond to data from any of the tracks. Transmitting in harmonically related frequencies will provide pulses in the skimmer's read heads that will be incorrectly interpreted as valid data. That is, transmitting interference data at a rate of three times the track 2 rate (or close to the data rate on tracks 1 and 3) makes it very difficult to interpret what "good" data was sensed by a skimmer head. As a result, the skimmer is overloaded with useless data that appears (to the skimmer operation) to be captured valid card data.

As previously noted, a card's track format may include a 5-bit scheme. A further example embodiment takes advantage of such bit scheme. The embodiment produces jamming that inserts two errors per five bit words. These errors function to fool the LRC. Two errors per six bit words may also be employed. In other embodiment, jamming is configured to deny clock pulses.

Still other embodiments can interleave jamming signals. That is, different signals (or portions thereof) can be alternatively inserted (mixed) together. A portion of a first signal can be inserted between adjacent portions of a second signal. This inserting (or combining) of signals can be carried out on a regular basis such that all portions of the first signal eventually get mixed in with the second signal.

Figure 61:
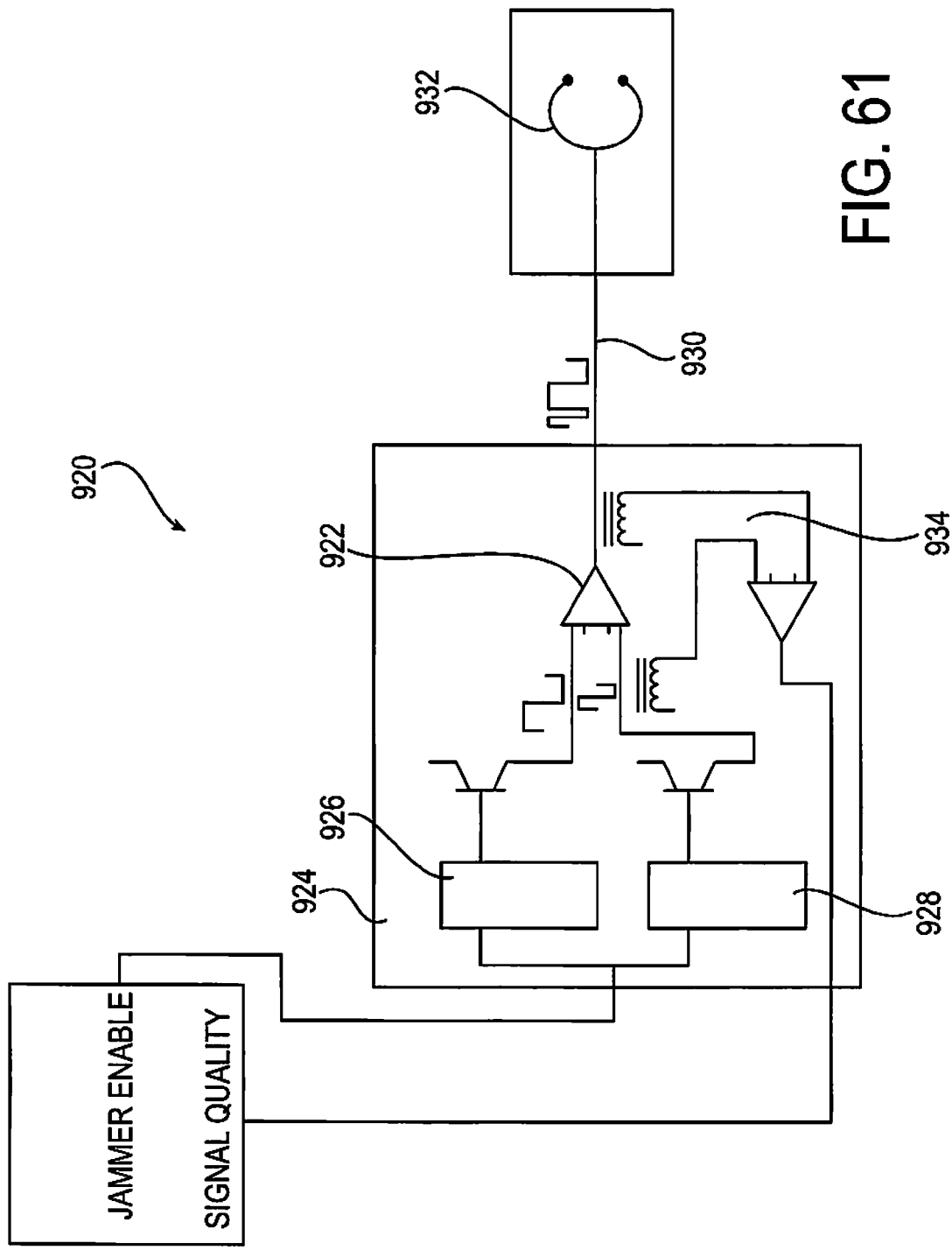
FIG. 61 shows an example of an example jammer.

FIG. 61 shows an example of an example jammer 920. The jammer can cause a summing 922 of multiple (e.g., two) frequencies. A driver circuit card assembly (CCA) 924 includes pulse width modulators (PWM) 926, 928. The PWM signal modulation can cause the widths of pulses to correspond to specific data values. Also shown is a cable 930 and an antenna 932. The antenna may be a differential drive-tuned type of antenna. A voltage standing-wave ratio (VSWR) measurement arrangement 934 can be used to monitor the signal quality and maintain efficient transmission of radio-frequency power to the antenna 932. Again, the interleaved jamming signals also include data that (magnetically) looks like card data to the skimmer. If the jamming can cause the skimming operation to accept one false character in interpreting a customer's PAN, then theoretically the jamming will have succeeded in preventing the valid account number from being known.

In another example embodiment, a jammer session uses (against a skimmer) the skimmer's ability to interpret characters or numbers (0-9) from a magnetic field. That is, a skimmer may be able to view respective numbers (e.g., zero and one) as being represented in respective patterns in a magnetic field. If a magnetic pattern can be sensed by a skimmer, then the pattern can be converted into its corresponding number. Thus, the skimmer can interpret (read) the numbers (0-9).

However, an example jammer can transmit magnetic field signals that comprise data in binary. The combined binary data (0s and 1s) would correspond to actual characters or numbers (e.g., 0 to 9).

The jamming signals can also include start/stop characters that are normally found on a magnetic stripe. A card's data to be read is located between the start and stop characters. Thus, a skimmer operation can be confused as to where data from a single card begins and ends. A skimmer operation's interpretation of when a particular card's data concludes would be premature (or late). Likewise, the interpretation of when the particular card's data starts would be premature (or late).

The example output of false data that corresponds in binary to the actual kinds of card data that would be found on a valid magnetic stripe, will effectively confuse a recording device connected to a skimmer. By transmitting actual values that correspond to false card data, the collected skimmer data (which is commonly recorded as a pulse stream in a type of a recorder device) will include invalid card data that is indiscernible from any captured valid card data. In another example embodiment, a jammer is operable to transmit a varying set of wave forms as a jamming signal. Again, flux reversals may be used as a fairly consistent set of values, which allows them to be interpreted as 0s and 1s. Thus, having various wave forms in a magnetic output will also interfere with any effort to capture the data off the card. Changing the jamming signal wave form and/or frequency also changes the amplitude and frequency of the magnetic pulses that are output by the jamming device. By varying the magnetic pulses across a range during each card reading transaction, the goal is to have the jamming data closely correspond to the frequency of the actual card data as read by a read head during at least part of the reading activity. That is, varying the jamming signal waveform and/or frequency offers a high probability that at least part of the card's pulse shape and frequency will be matched, and thus jammed. Again, this will make it difficult for a skimming operation to discern what obtained data is actually valid card data.

In another example embodiment, a jammer is operable to transmit a random set of frequencies during a jamming session. Random frequencies make it more difficult to process captured card data and recover the flux reversals that were read from the card. One jamming approach is to overwhelm a card skimmer by transmitting (with a same frequency) strong magnetic noise that avoids the card data from being (accurately) read. However, through sophisticated electronic filtering techniques, criminals may be able to filter out noise and recover some valid card data. An example embodiment uses more random types of signal frequencies along with signals that appear to be valid card data, to makes it more difficult for a skimming operation to recover the actual valid signal that corresponds to valid data from the card.

The random sets of magnetic field frequencies might also be harmonically related, such as by being various multiples of previously transmitted random frequencies. The signal frequencies can be made to randomly "hop" (using different sizes of steps) so as not to change in a consistent or detectable manner. Hop enables there to be no predetermined multiple relationship between the current frequency being output and the next frequency that will be output. Because the frequency multiples are random, it becomes difficult for a skimming operation to predict the current jamming frequency, and thus reduces the probability that the actual card data can be recovered by the skimming operation. Again, the example transmitting of magnetic field generating signals at random frequencies renders it unlikely that a skimming operation can recover usable valid card data.

The output of magnetic fields at random frequencies is particularly advantageous to jam a skimmer located adjacent a card reader that depends on the user to insert and remove their card. An example of such a card reader is a "dip" type of reader or a "swipe" type of reader. With such readers, frequencies are influenced by how fast a card is manually moved (dipped) during a card reading direction. For example, with some dip readers the card data can be read while the card is being moved out of the reader (in the exit direction).

Because the card is being manually moved (instead of being moved by a constant mechanical drive), the card may not be moving at a constant (same) speed during reading of the magnetic stripe data. As a result, the example ability to provide jamming signals at different frequencies increases the likelihood that a skimmer will be influenced by at least one jamming frequency.

In another example embodiment, a jammer is operable to transmit a frequency that is matched to the insertion/removal speed of a card relative to the card reader. That is instead of outputting random frequencies, a more precise frequency for the current situation can be calculated for usage. Card speed can be an important factor because the speed at which flux reversals can be read by a card skimmer may depend on how fast the card is moving. Thus, the example jamming embodiment includes an ability to sense the speeds (or relative differences in speeds) of a moving card, and then vary the jamming signal in accordance with sensed card speed so that the signal has a relationship to the card speed. The processor of the jammer can be operated to perform the card speed calculations in real time.

In some types of card readers a card may be mechanically moved, such as in a motorized card reader. The card reading mechanism can include moving members (e.g., belts and/or rollers) that operate to engage and move a card. The mechanical arrangement allows the moving members to be operated at a constant speed. Thus, the (constant) speed of these moving members (e.g., belts and/or drive rollers) can be sensed or determined by the jammer. As previously noted, in other types of card readers the card holder (machine user) manually moves the card. Such reader types include a dip card reader and a swipe card reader. Hence, the card may be moved at various (different) speeds. These speeds can be determined by use of sensors. Contact roller sensors can be used. Likewise, CMOS (complementary metal-oxide semiconductor) sensors can be used. A CMOS sensor can operate (in a manner similar to a computer mouse) to sense object (card) movement by comparing captured images. Different arrangements and methods for sensing with a CMOS sensor may be of the manner described in U.S. Pat. No. 8,225,989, the disclosure of which is herein incorporated by reference in its entirety. A micro/miniature camera may similarly be used to capture images of card movement. The jammer's processor is in operative connection with the sensors, cameras, etc. The speed of a card can be determined from sensed or captured card movement. For example, the processor can use the timing between captured images of a card to determine the speed of the card. As previously discussed, the speed (frequency) of a card may also be magnetically determined by measuring the passing speed of only a few initial bits.

An example embodiment allows for transmitting a frequency that matches the determined insertion and/or removal speed of a card. That is, the jammer can determine a card's insertion and/or exit speed(s) and then generate a transmission frequency that matches the determined speed(s). The generated jamming signal can also be combined with transmitting valid character sets that correspond to false card data. Furthermore, these particular character sets (of false data) can be varied for each card reading transaction.

The example jammer is operable to transmit a frequency that is harmonically related (e.g., matched) to a calculated speed of a card. The calculations and matching can occur in real time. The jammer can output pulse signals that correspond to the actual card speed. These outputted pulse signals include false data that confuses what skimmer data is recorded as a pulse stream in a data recording device. This jamming makes it difficult to recover the actual (valid) data because the false jamming data is so (frequency) close to the real card data. Furthermore, not only can the jamming data be output at the actual speed of the card, but it also can include false card data which is randomly varied. The jamming combinations interfere with criminal ability to eliminate (filter) false card data from real card data.

In another example embodiment, a jammer is operable to transmit magnetic pulses that hide (mask) a card's reversal of direction from a card skimmer. An example card reader utilizes sensed card jitter to indicate reversal of direction and/or speed changes as the card is moved relative to the (motorized) card reader. The valid card reader can use this card jitter data to accurately read the card's data.

If a skimmer is able to gather card jitter data, then this may allow the skimming operation to identify from the gathered jitter data, when a card's direction was reversed and when the card's speed was changed. The effects of the identified jitter can be removed (filtered out) by the skimming operation to recover the actual (good, valid) card data. As a result of being able to use card jitter data, valid card data may be recovered by the skimming operation. Thus, the embodiment tries to prevent a skimmer from similarly sensing and then utilizing card jitter. The example jamming embodiment operates to produce jitter-jamming pulses (magnetic field outputs) that prevent a skimmer from being able to recognize (identify, determine) that a card's direction was actually reversed. That is, the example jammer prevents the skimmer from sensing the reality of the card movement. The jamming prevents the skimmer from recognizing the fact that the user card actually slowed down, then stopped, and then reversed direction. Thus, the jammer can cause the skimming operation to be tricked into a false interpretation that the card is still moving in a same direction and at a same (constant) speed. A further example jamming embodiment operates to produce jitter-appearing pulses that causes a skimmer to obtain data that falsely indicates that a card's direction was reversed. That is, the jammer is operable to transmit magnetic pulses that appear (to a card skimmer) that a card reversed its direction when in reality the card did not change direction. As a result, the skimmer is tricked into obtaining (reading) at least some false data. Thus, the skimmer is at least prevented from obtaining all of the actual (real, valid) card data.

Again, a skimming operation may cause collected skimmer data to be recorded (stored) as a pulse stream in some kind of data recording device. However, because of the example jamming effects, it becomes much more difficult for the skimming operation to properly recover valid card data from this stored pulse stream data. That is, because jamming caused at least some false data to be inserted into (be a part of) the total data obtained by the skimmer, and because the jamming also prevented at least some valid card data from being read by the skimmer, the ability of the skimming operation to determine (reproduce) useable valid card data from the total data obtained is unlikely.

FIG. 62 shows an example of a waveform representation of generated jamming signal(s). FIG. 63 shows magnetic flux reversals that would be read by the magnetic read head of a skimmer. FIG. 64 shows bit interpretation of the false card data that would be gathered and stored in a recording device associated with the skimmer. FIG. 65 shows a magnetic stripe arrangement that would have similarly caused the magnetic flux of FIG. 63. The example makes a skimmer operate as though it were reading the magnetic stripe (of FIG. 65) from a nearby card, when in reality it is reading fictitious data being output in at least one jamming signal that was generated by an example jammer.

As can be seen (e.g., FIGS. 62 and 63), the jamming includes differences in signal strength. The shown pair of Is are in a strong signal that has a relatively high amplitude. The jamming also includes a change in signal frequency. The frequency change is representative of a fictitious increase in card speed from V-1 to V-2 (e.g., FIG. 63). A change in the bit rate clock cycle from L-1 to L-2 is also shown (e.g., FIG. 64).

As previously discussed, the example jammer has an ability to provide many different jamming signals, including jamming operations that follow predetermined signal output patterns. The jammer can also operate to cause (in real time) different or manipulated signals to be output based on information newly sensed or determined. For example, as previously discussed, the jammer can react to a change in card speed to modify signal output to reflect the speed change. That is, the jammer's processor can operate in real time to analyze many variables, determine the most favorable (optimum) jamming signals for the situation, and then cause the optimum jamming signals to be emitted. As can be appreciated, the jammer is not statically operated to repeatedly emit the same jamming signal. Rather, the jammer is dynamically operated (programmed) to emit optimum jamming signals that directly correspond to (best match) the current card reading operation.

Also, upon sensing a card (or a person) adjacent to the machine (e.g., the card entry slot), the processor can begin causing the output of different jamming signals of various frequencies (e.g., random frequencies). However, after the speed of the card is determined then the processor can target (select) a frequency that more closely matches the determined card speed. That is, in an example embodiment the processor first operates (following detection of a card) to present a wide (first) range of jamming frequencies before the speed of the detected card is determined, then the processor operates (switches) to present a narrower (second) range of jamming frequencies that are in better harmony (agreement) with the known card speed. Thus, the processor in a jamming process for an individual card can cause outputs that range from broad frequencies to more exact frequencies as more information about the card is determined by the processor. Again, jamming signals that are based on unknown speed (of a card) can be immediately followed by more accurate jamming signals that are based on known speed (of the card). Thus, different jamming signals based on pre-known speed and post-known speed can be used to provide a more efficient process of jamming unauthorized card reading. As previously discussed, the output of various frequencies can produce various magnetic (jamming) fields. In another example embodiment, resonant antennas are used to transmit the magnetic field jamming signals. A resonant antenna allows a signal to be provided that is more effectively sensed by the magnetic read head of a card skimmer. For example, the example resonant antenna can output reinforced and/or prolonged signals. The signals can continue to resonate for long periods of time. Along with sending valid formats (patterns, lengths) of card data, the resonant jamming operation will make it more difficult for a skimming operation to recover valid card data from the total amount of data collected. The total data may comprise valid card data, but it will be severely mixed (intermingled) with the false jamming data. In a further example embodiment, one or more resonant antennas are used to cause resonating at different frequencies. A further example embodiment causes jamming to begin earlier. Various arrangements and methods of jamming a card skimmer have already been discussed. For earlier initiation of jamming, one or more sensors are used to sense a user card earlier. For example, as previously discussed, a card may be sensed when a card portion enters the card entry slot. Various types of sensors can be used to sense the card. For example, as previously discussed one or more proximity sensors in the form of an optical sensor, a magnetic sensor, and/or a sound (radar) sensor may be used.

Furthermore, a jammer can be operated to send a false start reading signal to a skimmer. This false start signal can be sent upon a pre-reading (early) sensing of a card. This false start signal causes the skimmer to prematurely begin collecting data. Along with emitting the false start signal, the jammer can at the same time also begin emitting false card data. That is, the skimmer can be made to start "reading" (false) stripe data before the magnetic stripe is actually in a position which allows its valid data to be read by the skimmer. Thus, the ability to provide early sensing of a card can be used to cause the skimmer to prematurely collect data, where the data collected constitutes useless false data. As can be appreciated, the embodiment further reduces the risk that the skimmer will recover any useful data.

The processor includes programming (software, firmware, etc.) that allows a logic flow of steps which cause jamming operations to be carried out. As previously discussed, some jamming operations include use of an emitter that is only turned on upon detection of a card, else the emitter is kept off. Sensors can be used to detect: hand movement in an approach channel to the card slot; a card adjacent the slot; and/or movement of a gate to the card reader. The processor receives signals from the sensors. The processor determines whether any of the received signals correspond to a card being inserted. If positive, then the processor causes the emitter to output signals that form a magnetic field. The signals can be emitted in a pattern or a format. The generated magnetic field has a strength which can vary. The pattern has a frequency which can vary. The pattern can be predetermined (known). The processor can obtain different predetermined patterns from the data store. The predetermined jamming pattern that is obtained can include false (fictitious) card data. Alternatively, the processor can produce a random jamming pattern of signals (within a range), which includes random card data. The output of random jamming signals creates a random magnetic field.

As previously discussed, some jamming operations include use of an emitter that is always kept on. The processor can cause the emitter to output different jamming signals that form varying magnetic fields. The outputted signals can follow a predetermined jamming pattern or a random jamming pattern. The fictitious magnetic field that is generated includes false data which a card skimmer may interpret as valid card data. A jamming magnetic field may also be of such high strength that it overwhelms the ability of a card skimmer to accurately read card data. The jammer's processor can determine the operational status of the jamming signal emitter. An example jammer is configured to be operatively connected to a machine's card reader. The connection is configured to provide backup protection to the card reader. Because of the protective configuration, if the emitter (or jammer) becomes inoperable, then the card reader is automatically taken out of service. For example, if any part of the jammer loses power, then the configuration is designed to cause the card reader to also lose power (i.e., shut off power supply to card reader). Similarly, if any part of the jammer gets disconnected (e.g., by a criminal) from the remainder of the jammer, then the card reader is automatically shutdown. Also, if the emitter becomes inoperable then the processor can cause a notification message to be wirelessly communicated to a proper authority, such as a machine servicer.

Thus, the features and characteristics of an example embodiments previously described achieve desirable results, eliminate difficulties encountered in the use of prior devices and systems, solve problems, and may attain one or more of the objectives stated above. In the foregoing description certain terms have been used for brevity, clarity and understanding, however no unnecessary limitations are to be implied therefrom because such terms are for descriptive purposes and are intended to be broadly construed. Moreover, the descriptions and illustrations herein are by way of examples and the invention is not limited to the details shown and described.

In the following claims any feature described as a means for performing a function shall be construed as encompassing any means known to those skilled in the art to be capable of performing the recited function, and shall not be deemed limited to the particular means shown in the foregoing description or mere equivalents thereof.

The term "non-transitory" with regard to computer readable medium is intended to exclude only the subject matter of a transitory signal per se, where the medium itself is transitory. The term "non-transitory" is not intended to exclude any other form of computer readable media, including media comprising data that is only temporarily stored or stored in a transitory fashion. Should the law change to allow computer readable medium itself to be transitory, then this exclusion is no longer valid or binding.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

What is claimed is:
1. A method comprising:
   determining at least one speed of a card being read by a card reader;
   operating the at least one processor to determine at least one jamming pattern for usage, wherein the pattern includes at least one frequency that matches the determined speed of the card; and
   operating the at least one processor to cause the emitter to output jamming signals that correspond to the at least one jamming pattern;
   wherein the jamming signals are configured to prevent accurate reading of card data by at least one read head of a fraudulent card reader located adjacent to the slot.

2. The method according to claim 1 and further comprising operating at least one sensor to sense a card located adjacent to the slot.

3. The method according to claim 1, wherein the at least one processor causes the emitter to output jamming signals that comprises random frequencies.

4. The method according to claim 1, wherein the jamming signals include false card data that is configured to appear as valid card data to the fraudulent card reader.

5. The method according to claim 1, wherein the jamming signals include characters corresponding to card reader instructions to one of a group consisting of start reading and to stop reading.

6. The method according to claim 1, wherein the at least one jamming pattern comprises a predetermined pattern, the method further comprising operating the at least one processor to access the predetermined pattern from the at least one data store.

7. The method according to claim 1, wherein the at least one processor causes the emitter to output jamming signals at random frequencies.

8. The method according to claim 1, wherein the at least one sensor includes a contact roller sensor;
   wherein the at least one processor is in operative connection with the contact roller sensor; and
   wherein the at least one speed is determined based at least in part on at least one sensing by the contact roller sensor.

9. The method according to claim 1, wherein the at least one sensor includes a complementary metal oxide semiconductor ("CMOS") sensor, and wherein the at least one speed is determined based at least in part on at least one sensing by the CMOS sensor.

10. The method according to claim 1, wherein the at least one processor operates the emitter to transmit magnetic signals at least two frequencies.

11. The method according to claim 10, wherein the at least two frequencies are harmonically related to a magnetic field frequency of the fraudulent card reader.

12. The method according to claim 1 wherein the jamming signals produce at least one magnetic field that contains binary data.

13. An apparatus, comprising:
a card reader having a card entry slot; and
a jammer arrangement;
wherein the jammer arrangement comprises a processor, a sensor operable to determine a speed of a card being moved within the card reader, and an emitter;
wherein the processor is operable to operate the emitter to emit a jamming signal that has a frequency that matches the determined speed of the card being moved within the card reader; and
wherein the emitter is operable to emit a jamming signal that is directional magnetic field towards the card reader's card entry slot.

14. The apparatus set forth in claim 13, further comprising a sensor to sense a card located adjacent to the card entry slot.

15. The apparatus set forth in claim 14, wherein the processor is operable to determine a speed of a card located adjacent to the card entry slot.

16. The apparatus set forth in claim 15, wherein the jamming signal is at a frequency that matches one of a group consisting of an insertion speed and removal speed of the card.

17. The apparatus set forth in claim 15, wherein the emitter to outputs a plurality of jamming signals; and
wherein the at least one jamming pattern is determined based on the speed of the card being moved within the card reader.

18. The apparatus set forth in claim 14, wherein the emitter outputs a plurality of magnetic frequencies that are harmonically related to a magnetic field frequency of a fraudulent card reader.

19. The apparatus set forth in claim 13, wherein the sensor includes a contact roller sensor;
wherein the processor is in operative connection with the contact roller sensor; and
wherein the speed of the card is determined based at least in part on at least one sensing by the contact rover sensor.

20. The apparatus set forth in claim 14 wherein the sensor includes a complementary metal oxide semiconductor ("CMOS") sensor, and wherein the speed of the card is determined based at least in part on sensing by the CMOS sensor.

21. The apparatus set forth in claim 14, wherein the emitter outputs a plurality of jamming signals at frequencies that are harmonically related to the speed of the card.

22. The apparatus set forth in claim 13, wherein the emitter to outputs a plurality of jamming signals that comprises random frequencies.

23. The apparatus set forth in claim 14, wherein the emitter to outputs a plurality of jamming signals that include false card data that is configured to appear as valid card data to the fraudulent card reader.

24. The apparatus set forth in claim 14, wherein the emitter to outputs a plurality of jamming signals that include characters corresponding to card reader instructions to one of a group consisting of start reading and to stop reading.

25. The apparatus set forth in claim 14, wherein the jamming signal contains binary data.

26. The apparatus set forth in claim 14, further comprising an automated banking machine coupled with the card reader and the jammer arrangement;
wherein the slot leads to the card reader; and
wherein the automated banking machine is associated with a computer that is operable, responsive at least in part to a determination that user data read by the card reader corresponds to a financial account usable to authorize a cash dispense transaction with the automated banking machine, to cause the cash dispenser to dispense cash, wherein the computer is further operable to cause the financial account to be assessed a value associated with an amount of cash dispensed.

27. The apparatus according to claim 14 wherein the emitter emits a plurality of jamming signals at magnetic field frequencies that are harmonically related to the magnetic field frequencies usable by card readers.

28. The apparatus set forth in claim 14, further comprising a resonant antenna to emit the jamming signals coupled with the emitter.

29. The apparatus set forth in claim 14, wherein the emitter outputs a plurality of jamming signals that are interleaved.

30. The apparatus set forth in claim 14, wherein the processor is operable to change one of a group consisting of wavelength and frequency of the jamming signal.

31. The apparatus set forth in claim 14, wherein the jamming signal is a pulse width modulated signal; and
wherein the processor is operable to change a pulse width of the pulse width modulated signal.

32. The apparatus set forth in claim 14, wherein the processor is operate to insert one of a group consisting of two errors per five bit word and two errors per six bit word.

33. The apparatus set forth in claim 14, wherein the processor is operable to have the jamming signal randomly hop frequencies.

34. A tangible, non-transitory computer readable medium of instructions with instructions encoded thereon for execution by a processor that when executed by a processor are operable to:
determine a speed of a card moving within a card reader;
determine at least one jamming pattern for usage, wherein the pattern includes at least one frequency that matches the determined speed of the card; and
cause a signal emitter to output jamming signals that correspond to the at least one jamming pattern;
wherein the jamming signals are configured to prevent accurate reading of card data by at least one read head of a fraudulent card reader located adjacent to the slot.

* * * * *